Aug. 22, 1961 R. M. HAYES ET AL 2,997,174
CARD PROCESSING SYSTEM AND APPARATUS
Filed May 23, 1958 14 Sheets-Sheet 4

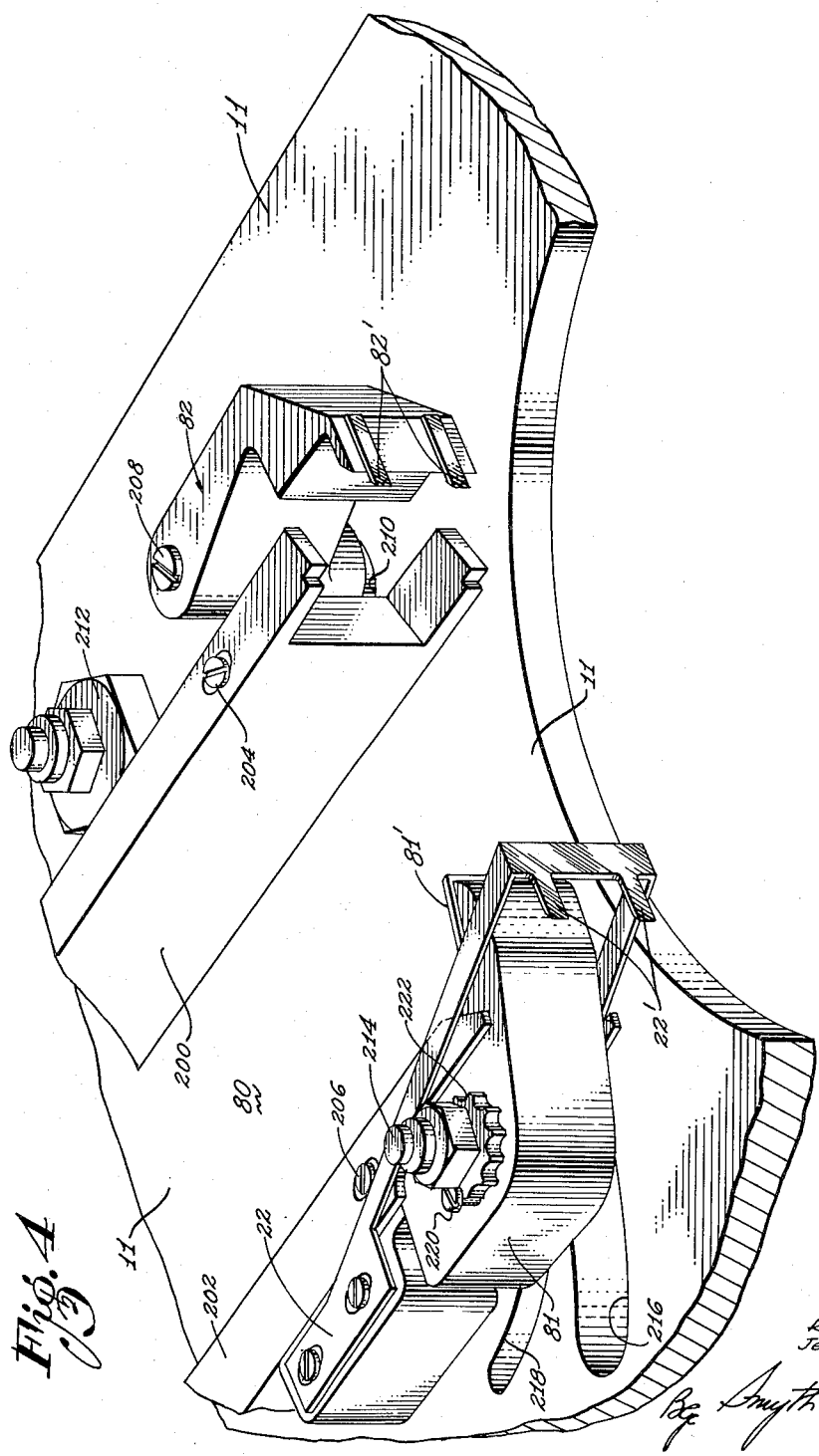

INVENTORS.
Robert M. Hayes
Jerome B. Wiener

By Smyth & Roston
Attorneys

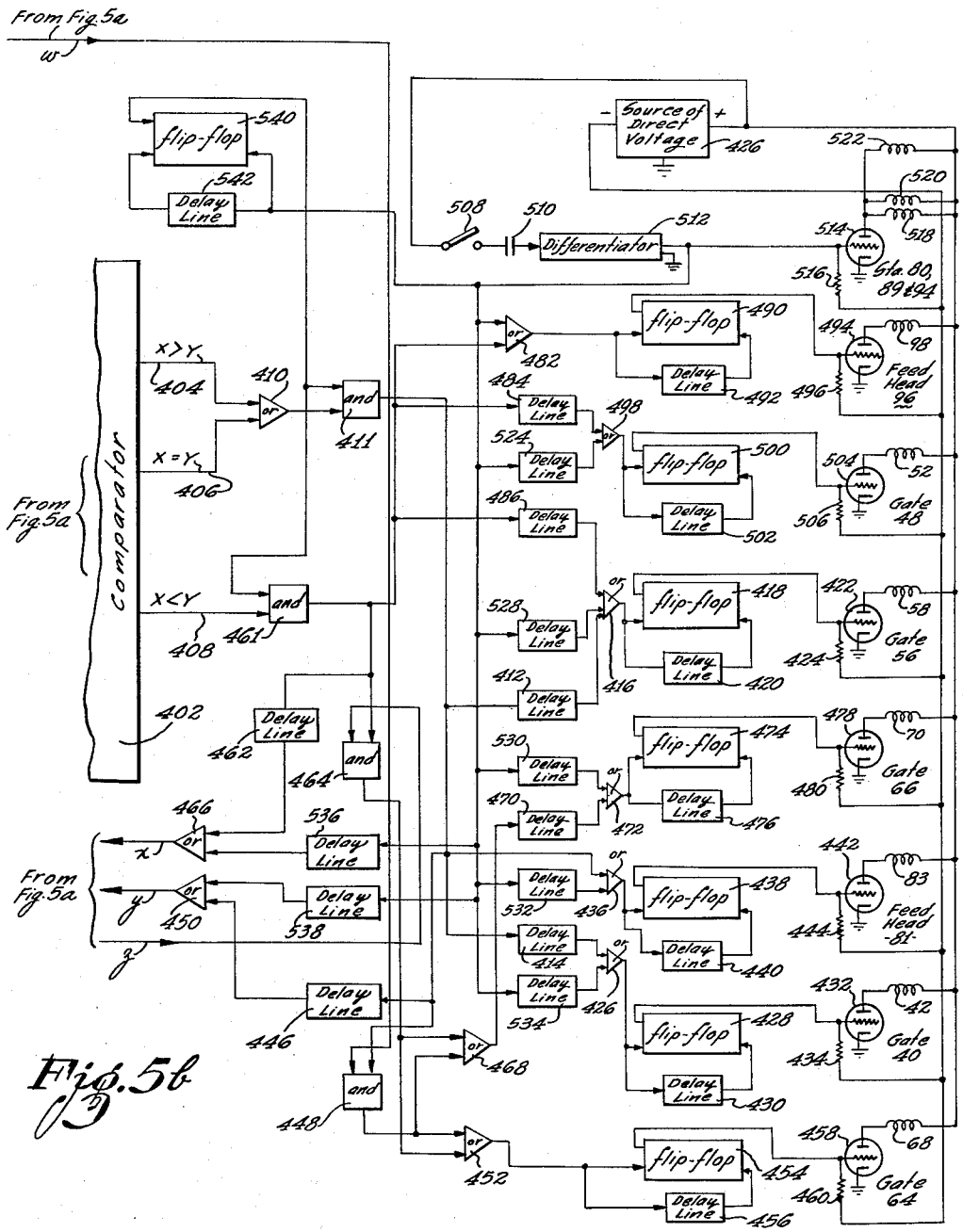

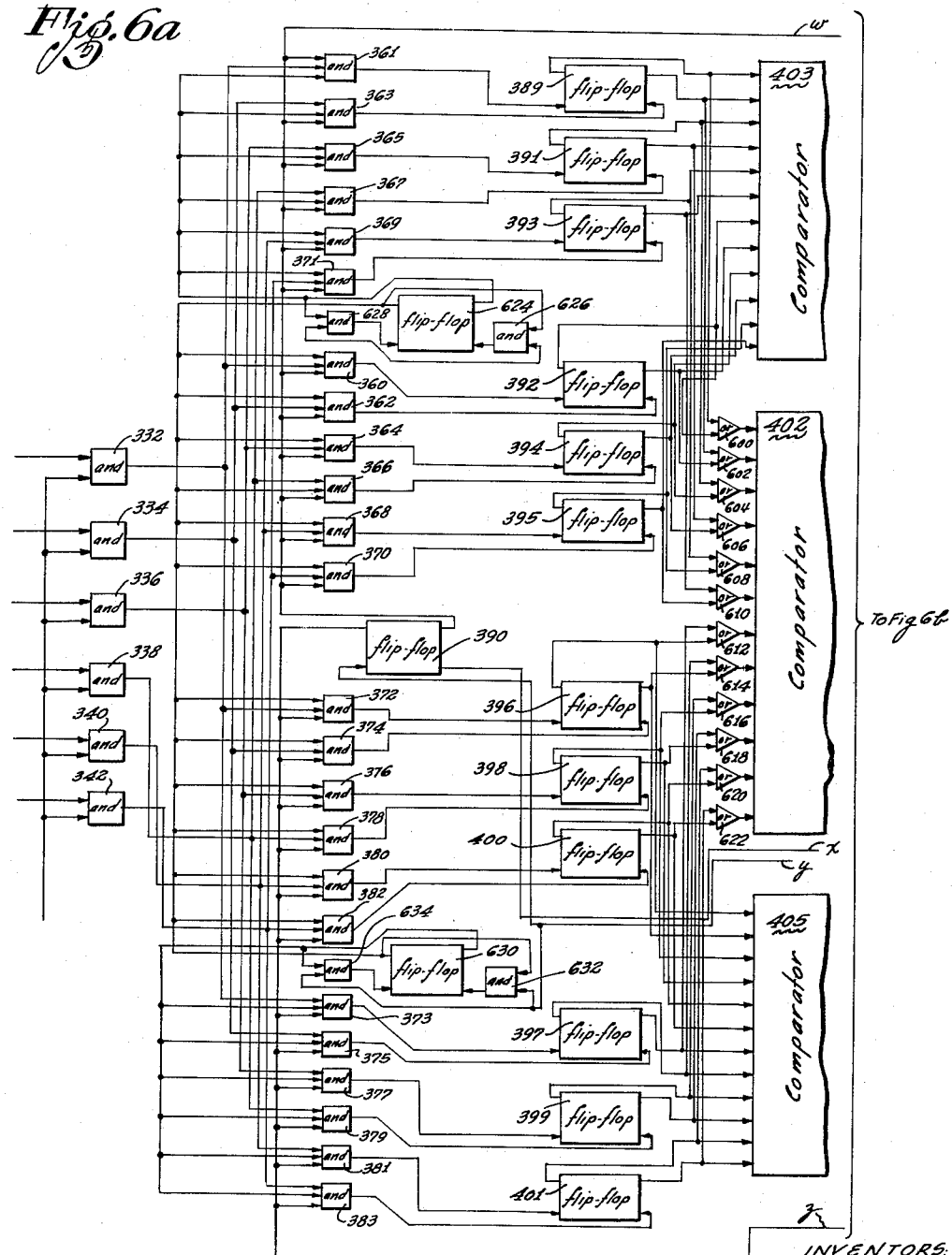

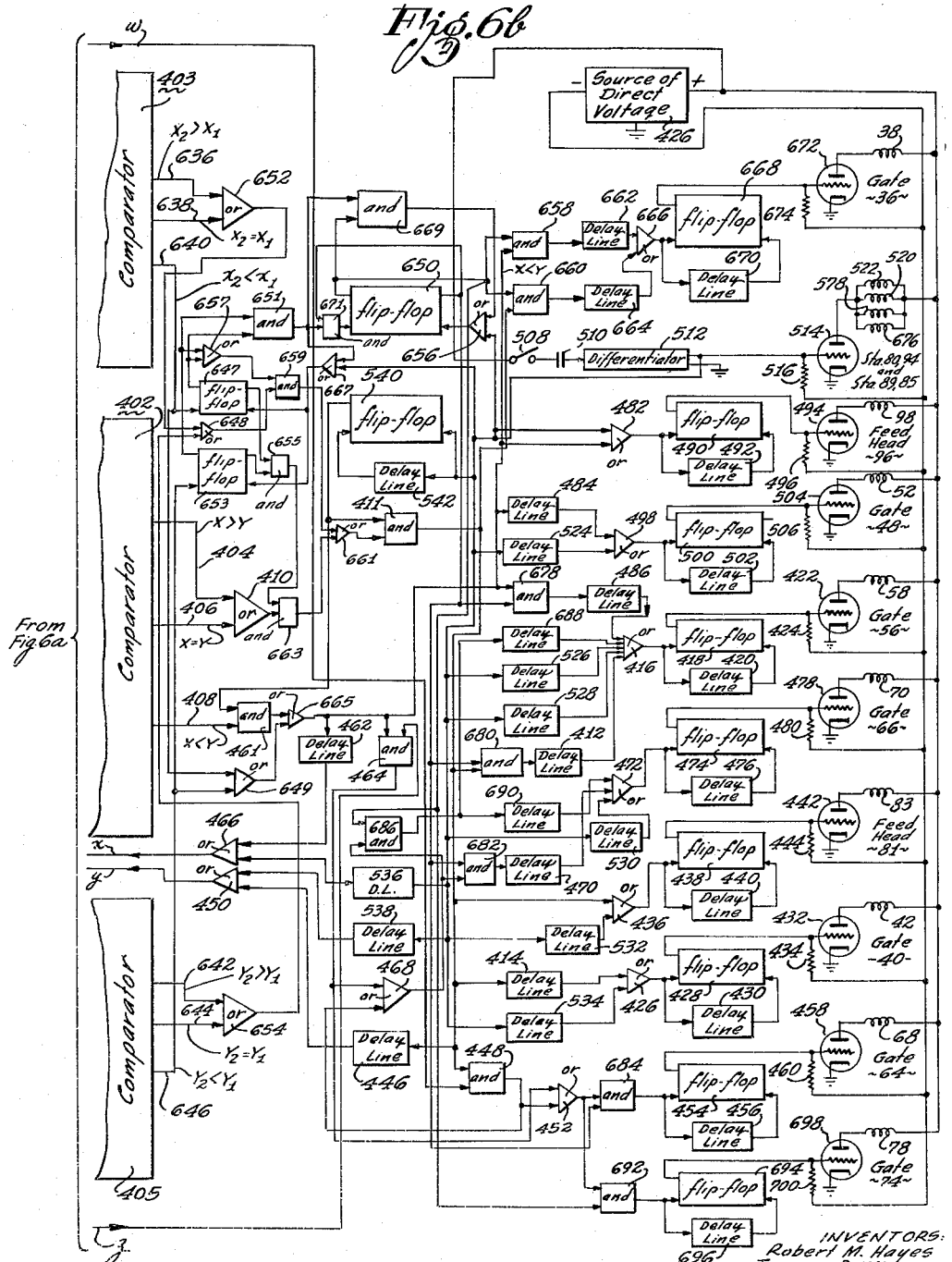

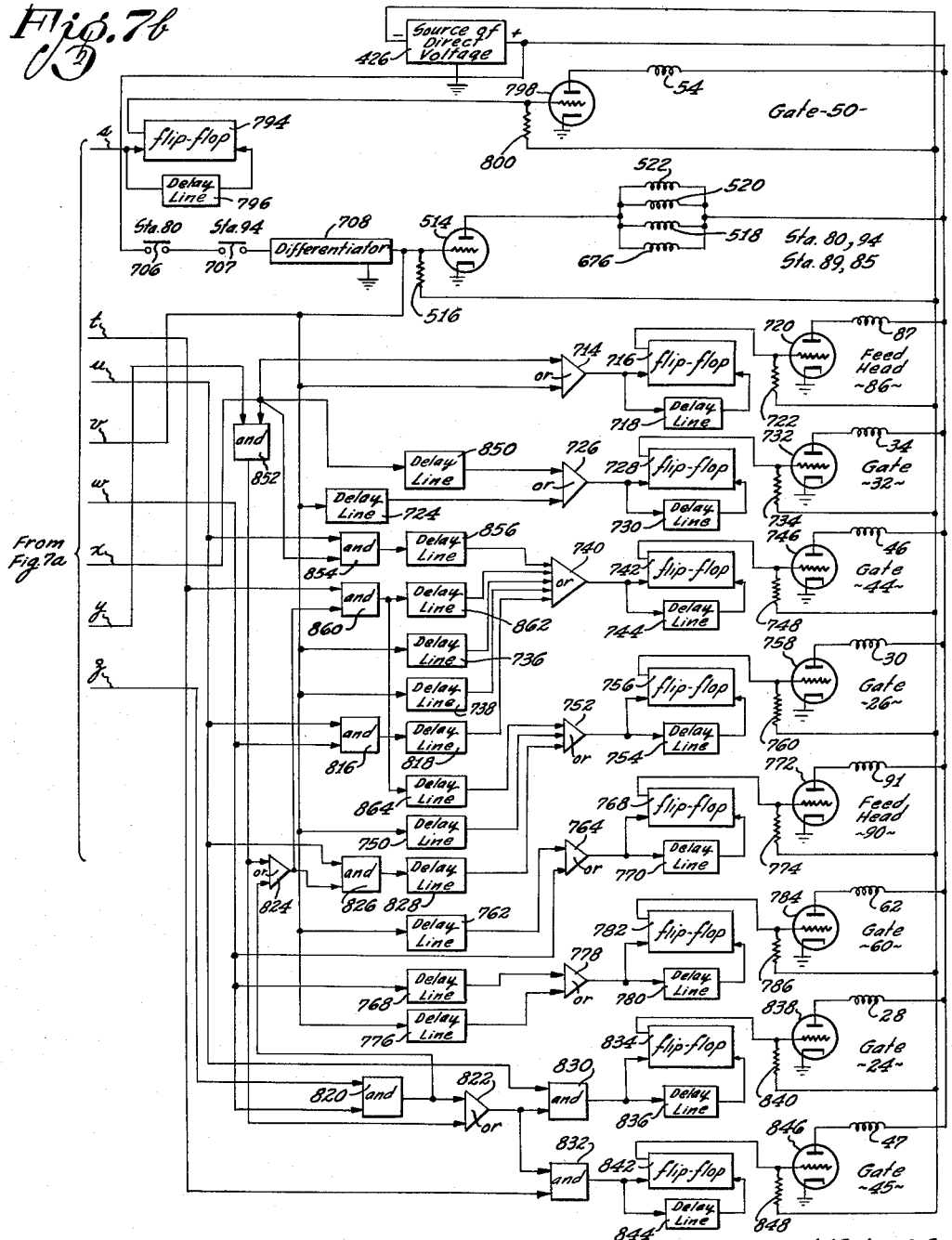

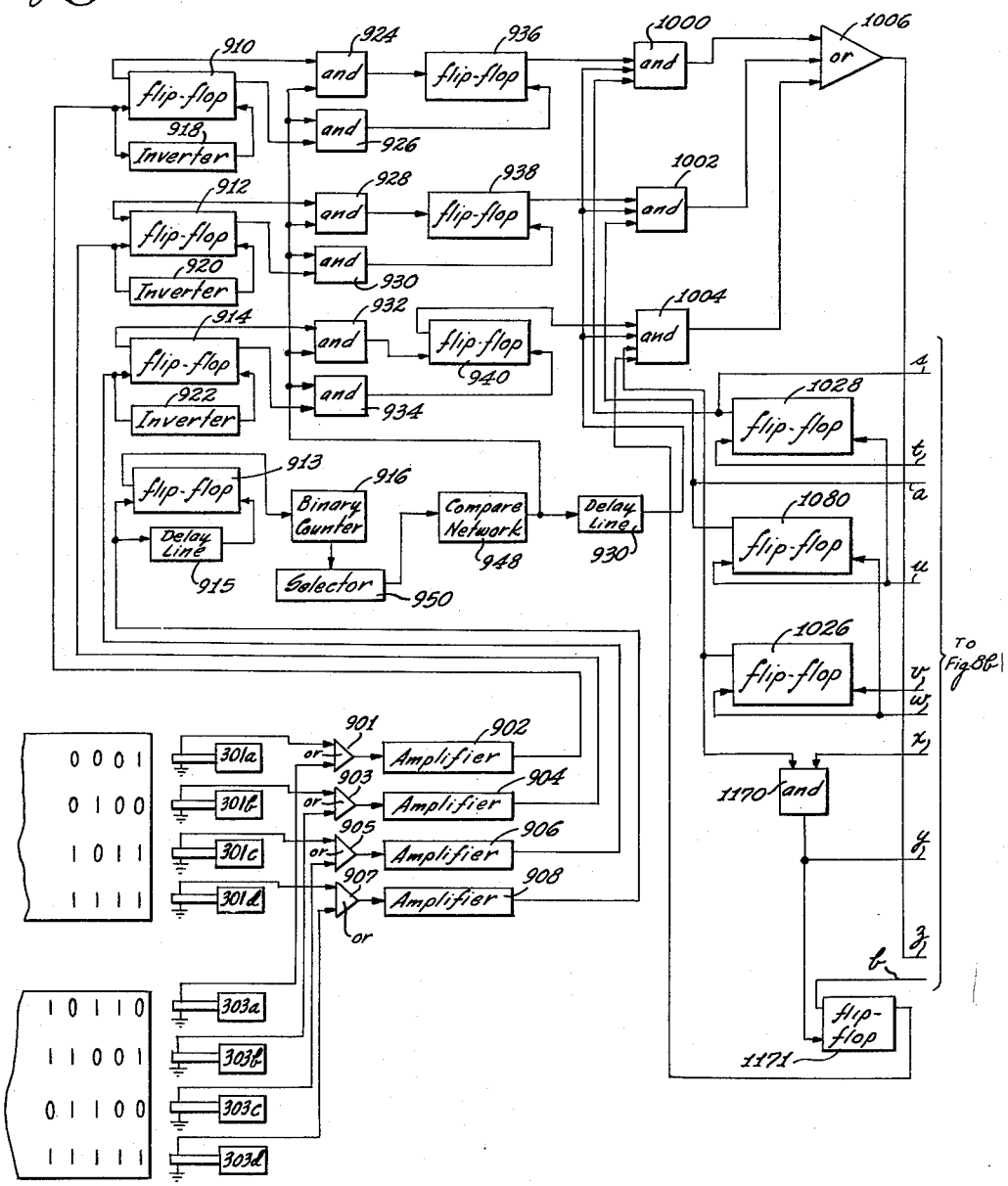

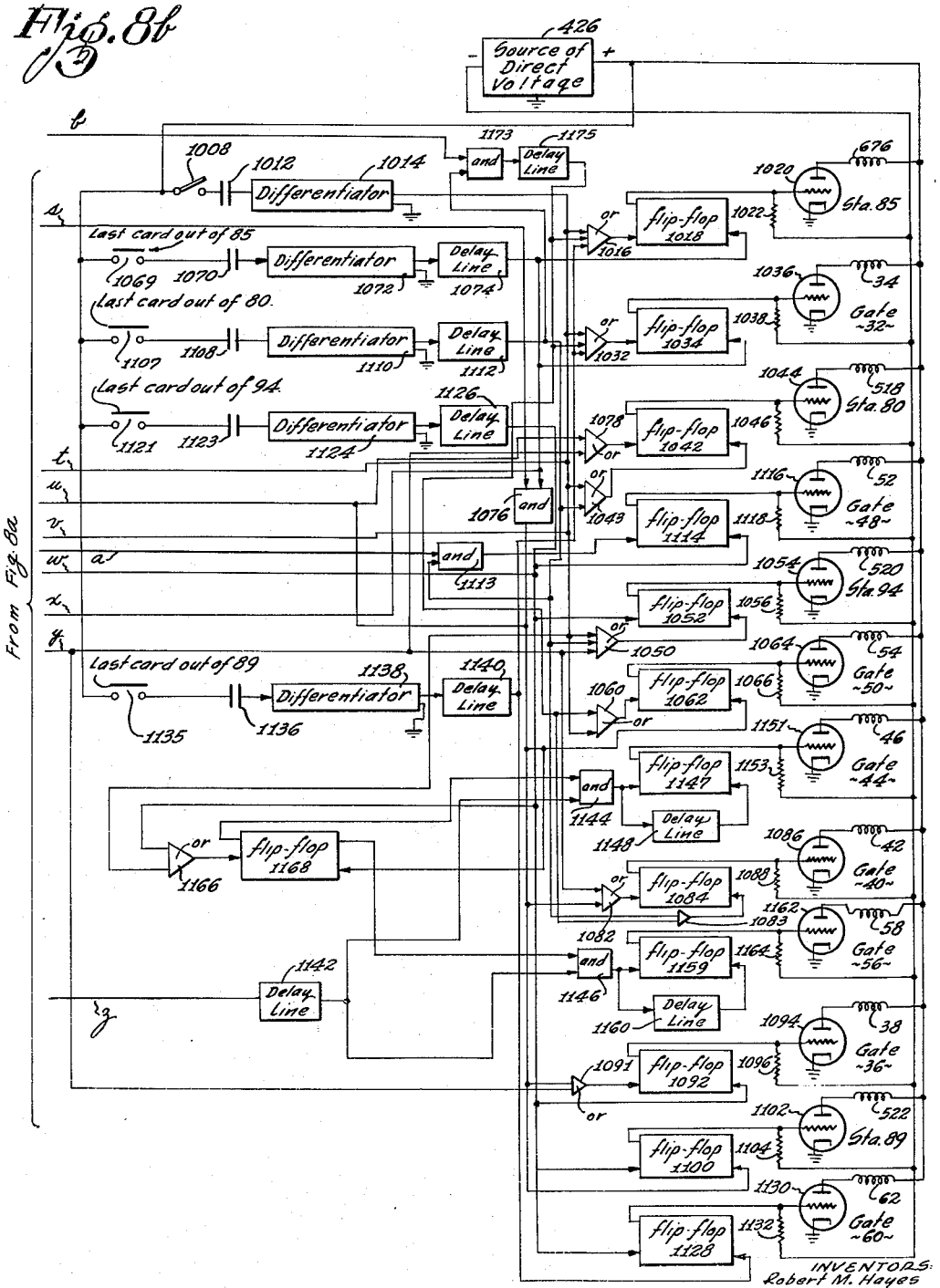

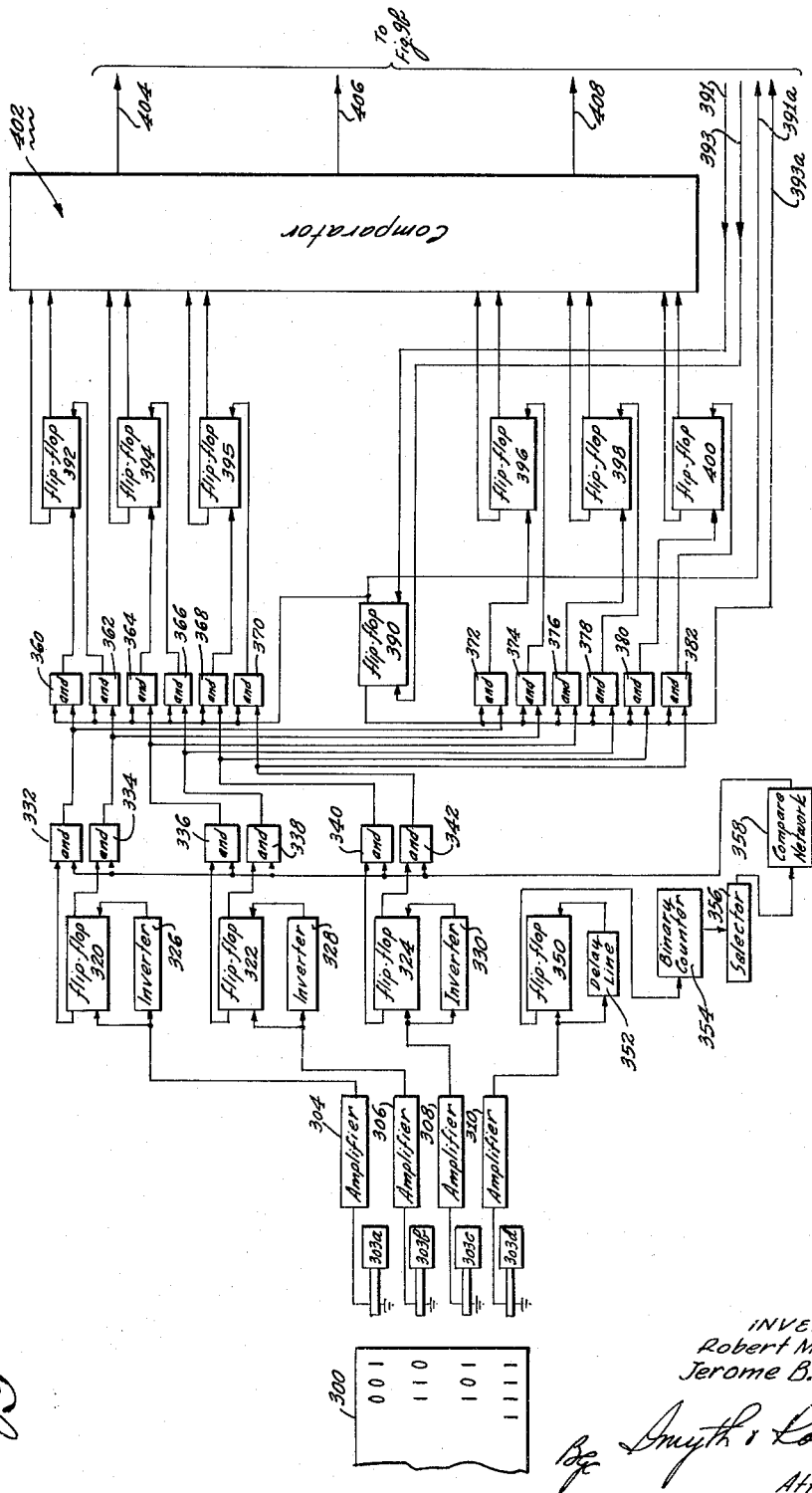

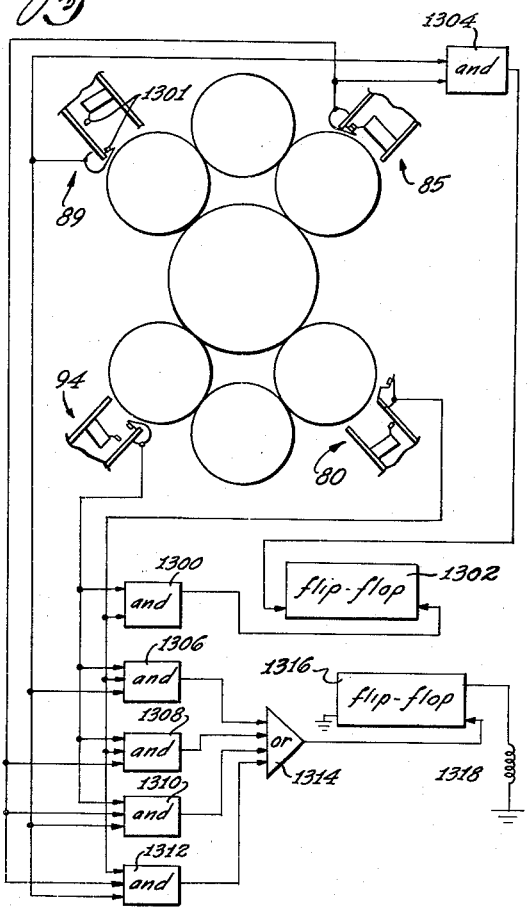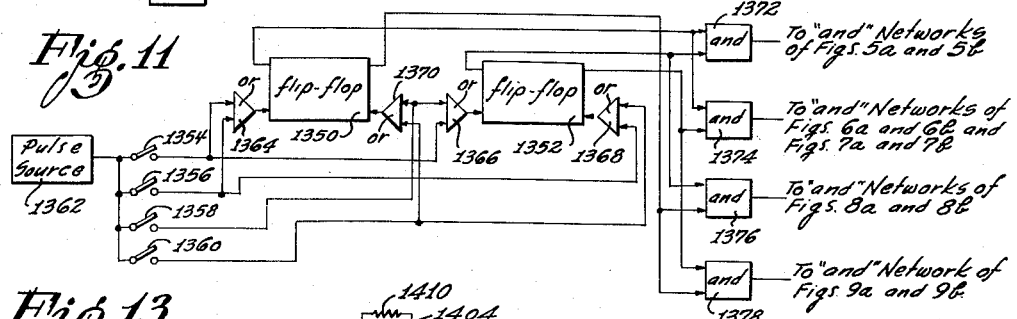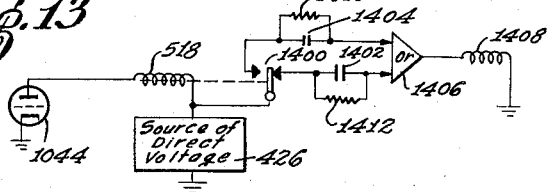

United States Patent Office 2,997,174
Patented Aug. 22, 1961

2,997,174
CARD PROCESSING SYSTEM AND APPARATUS
Robert M. Hayes, Los Angeles, and Jerome B. Wiener, Granada Hills, Calif., assignors to The Magnavox Company, Los Angeles, Calif., a corporation of Delaware
Filed May 23, 1958, Ser. No. 737,439
26 Claims. (Cl. 209—72)

The invention relates to apparatus for processing information storage cards. More particularly, the invention is directed to apparatus having universal application and being capable of performing a plurality of different operations such as collating and sorting on the information cards used in any particular data processing system.

The use of data processing systems has increased to a large extent in recent years. One known type of system uses a multiplicity of information storage cards. Binary data is recorded on each of these cards in the form of patterns or holes or magnetized dots or photographic information or in any other suitable form. The present invention will be described in conjunction with the magnetic type of recording system. It will become evident, however, as the description proceeds that the invention may be used in conjunction with any type of recording scheme.

When magnetized dots are used to record the binary data, each dot represents a binary bit which goes to make up the binary number represented by the group of dots it is associated with. A dot of one magnetic polarity, for example, represents a "true" or unity condition, and a magnetic dot of the other polarity represents a "false" or zero condition.

The magnetized dots are usually arranged in a series of parallel rows extending lengthwise along each card. This enables the dots in each row to be successively scanned by one of a group of transducer heads individual to that particular row. The dots in the respective rows are aligned so as to form transverse columns extending across each card. The recording code is usually such that each column of dots represents a different binary number, and the dots in each column represent binary data with each dot in the column having a different ordinal significance so that the dots across each column are arranged in succesively increasing or decreasing ordinal significance. It is usual for successive ones of such columns to be designated as successive "positions" on the card.

In the more complex data processing systems, many hundreds of thousands of information storage cards may be used and many millions of bits of binary data may be recorded on the cards. The need continually arises in such system for arranging the cards of the system into a plurality of different orders.

For example, the cards in the entire system may be broken down into a multiplicity of individual stacks, with the cards in each of the stacks (for example) being arranged in a numerical or alphabetical order. It is often required that the cards in any particular stack be sorted with respect to the binary data recorded at a selected position or set of positions on each card. That is, the cards are required to be sorted so that the numbers represented by the binary data on the individual cards in the stack may be in ascending or descending order from one card to the next. These numbers, of course, may in turn represent an alphabetical sequence or any other coding scheme.

When the cards in two or more individual stacks are sorted into a desired sequence, it is often required that these cards be merged into a single stack and that they appear in that single stack in an ascending or descending order insofar as the numbers represented by the binary data at the selected position or set of positions on each card is concerned.

In addition to the sorting and merging operations described above, other operations are often required to be performed on the cards. For example, various types of collating operations are often necessary. In one particular collating operation, two stacks of cards are compared. All the cards from a first stack, and those from a second stack having data at the selected position coinciding with corresponding cards from the first stack, are deposited in one receiving station. The remaining cards from the second stack are deposited in a separate receiving station. In another form of collating, for example, the coinciding cards from both stacks are deposited in a separate receiving station, and the remaining cards from both stacks are commingled in another receiving station. These particular collating operations represent but two of many different types that are often required.

Equipment has been devised in the past for performing the sorting, merging and collating operations described above. However, in most prior art systems separate apparatus is required for each of the different described operations. The amount of equipment required in such prior art systems to perform all the desired and essential operations on the cards in the system is, therefore, relatively great.

A major object of the present invention is to provide a single apparatus that has universal application. The apparatus of the invention is capable of performing each and every one of the specific operations enumerated and described above. In addition, the apparatus is capable of performing many other desired operations on the cards which have not been specifically enumerated.

As will become evident, it is merely necessary in the apparatus of the invention to switch in a particular control system so as to condition the apparatus to perform any desired one of a multiplicity of different operations on the cards. Therefore, by the use of the present invention, it is only necessary to incorporate a single apparatus in the data processing system, and the apparatus may be conveniently conditioned to perform any operation on the cards as desired at any particular time.

In the drawings:

FIGURE 1 is a top plan view illustrating in schematic form the improved apparatus of the invention, the illustrated apparatus including a multiplicity of vacuum transporting drums which are rotatably mounted on a supporting table top, and which drums have a plurality of input and output stations associated with them, and which apparatus also includes a plurality of gate mechanisms for transferring cards from one drum to another, and suitable transducer means for processing the cards, the gate mechanisms and the input and output stations being controllable by different electronic control systems so that the apparatus may perform any one of a plurality of operations on the cards transported by it;

Figure 1:
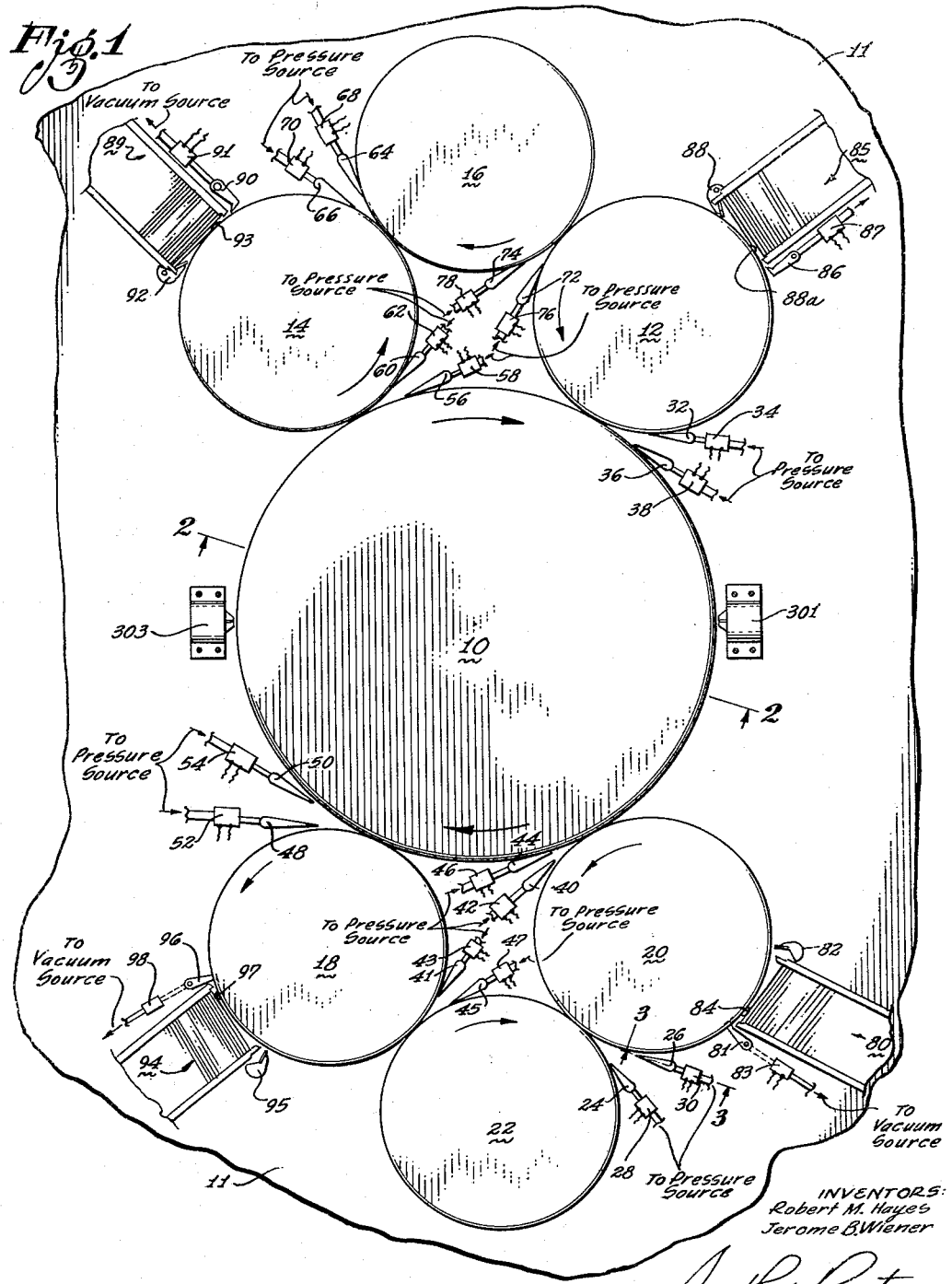
Figure 5A:
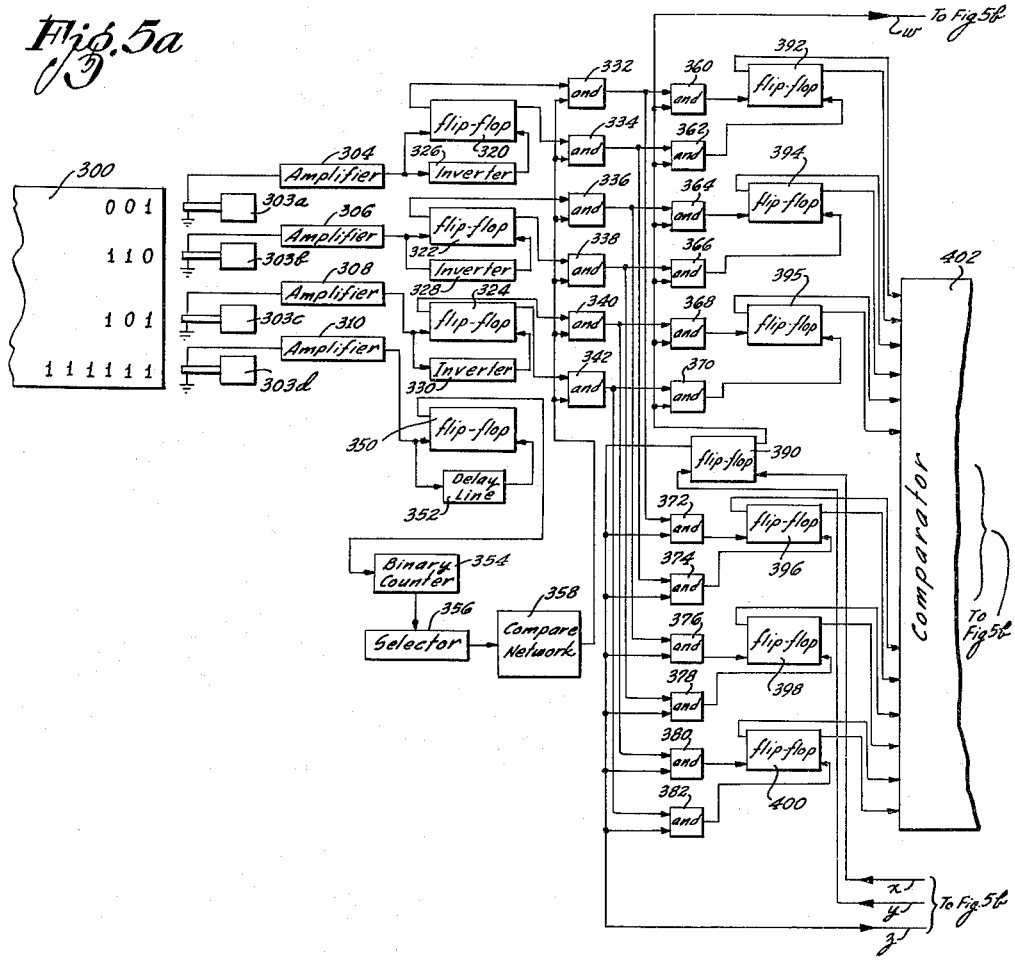
Figure 9B:
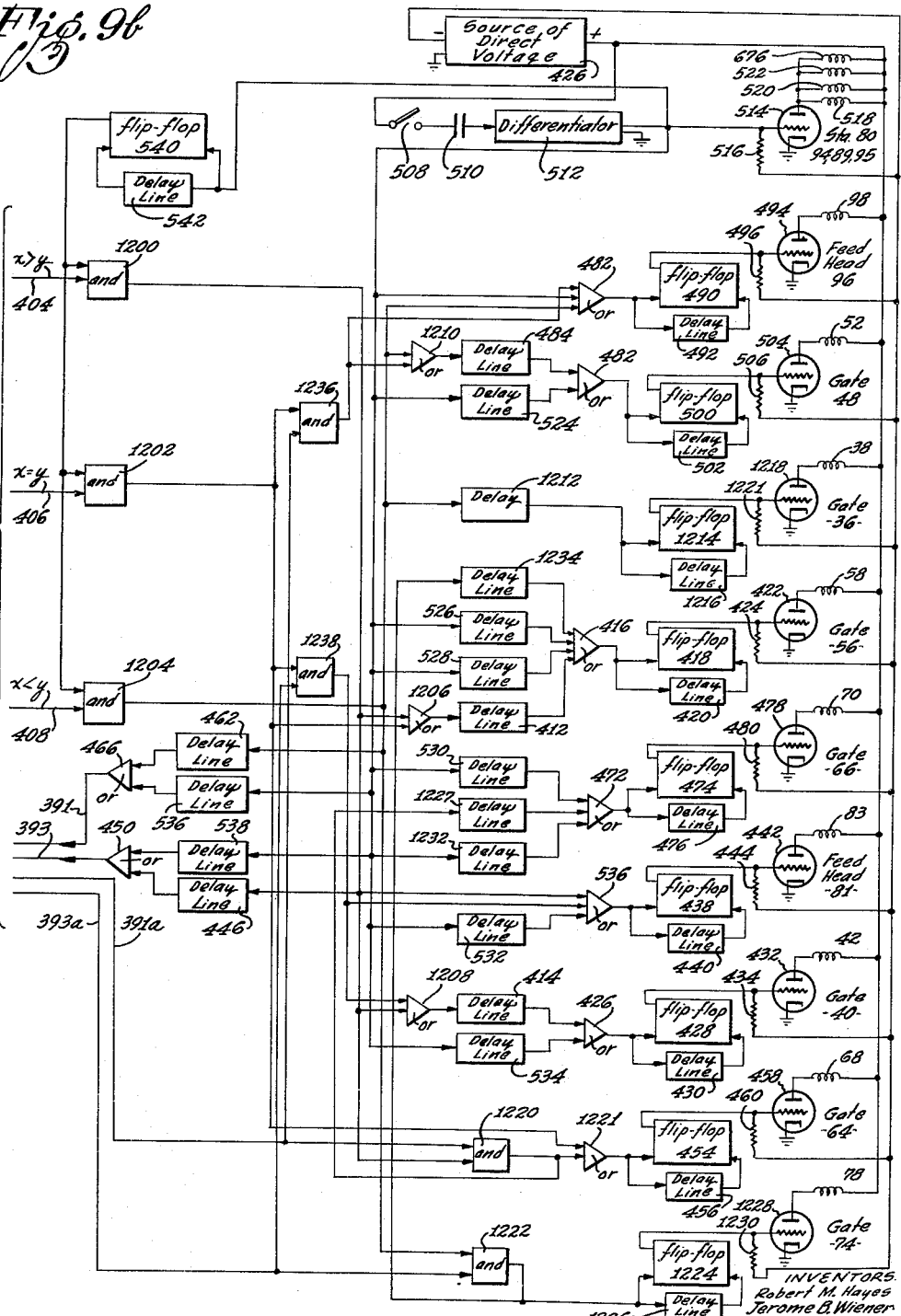

FIGURE 4 is an enlarged perspective view of a reversible card feeding-stacking station which is suitable for use in the apparatus of FIGURE 1, this particular station being controllable to have a first operational mode in which cards may be controllably and sequentially fed from a stacked condition within the station to a corresponding one of the vacuum transporting drums; alternately the station may be conditioned to a stacking mode so that cards transported on the corresponding drum may be sequentially removed from the drum and deposited in a stacked condition into the holding station;

FIGURES 5a and 5b constitute a block diagram of an electrical control system which is appropriate for controlling the apparatus of FIGURE 1 to cause that apparatus to perform a merging operation on a pair of sorted stacks of information storage cards respectively placed in two of the reversible stations, the cards in such stacks being merged into a single stack and appearing in the single stack in a sorted condition with respect to the binary data at a selected position on the cards;

FIGURES 6a and 6b, 7a and 7b are block diagrams of an electrical control system for the apparatus which enables the apparatus to perform a desired sorting operation on the cards by using merging principles such as those referred to in conjunction with FIGURES 5a and 5b;

FIGURES 8a and 8b show a control system for causing the apparatus of FIGURE 1 to perform a binary sort of the cards in a simple straightforward manner, the sorting in the system of these figures proceeding on a continuous basis from one pair of stations to another until full sorting at a selected position on each card has been achieved; and FIGURES 9a and 9b represent a control system for causing the apparatus of FIGURE 1 to perform a particular type of collating;

FIGURE 10 is a somewhat schematic view illustrating the different drums and stations shown in FIGURE 1 and further illustrating electrical circuitry associated with the different stations to obtain a plurality of successive passes of the cards between the different stations as in a sorting operation or in a sort-by-merge operation;

FIGURE 11 is a circuit diagram illustrating a plurality of stages which are used to control the operation of the equipment shown in the previous figures in performing different functions such as merging, sorting, collating and sorting by merging;

FIGURE 12 shows a chart which illustrates the pattern of operation for certain of the stages shown in FIGURE 11 in order to obtain the different functions such as merging, sorting, collating and sorting by merging; and FIGURE 13 is a circuit diagram of electrical components for controlling the operation of the apparatus shown in FIGURE 4 to obtain a stacking of cards in a station at first particular times and to obtain a transfer of cards from the station at second particular times.

The apparatus of FIGURE 1 includes transport means such as a vacuum pressure central transporting drum 10 which is rotatably mounted on a suitable table top 11. Although transport means movable in a closed loop such as a rotatable drum is included as a preferred embodiment, it should be appreciated that any type of transport means may be used and that such transport means may be movable or stationary, stationary drums being described and claimed in co-pending application Serial No. 730,102, filed April 22, 1958, by Eric Azari et al. and in co-pending application Serial No. 731,413, filed April 28, 1958, by Eric Azari. This applies to all of the drums included in the invention. The drum 10, for example, has a 12-inch diameter, and the drums subsequently to be described may all have a 4-inch diameter. The drum 10 is rotatable in a clockwise direction. The constructional details of all the drums may be similar, and for that reason only the drum 10 will be described in detail in conjunction with FIGURE 2.

A pair of auxiliary vacuum pressure rotatable transporting drums 12 and 14 are mounted on the table top 11 to be contiguous to the central drum 10. Each of the vacuum pressure transporting drums 12 and 14 is rotatable in a counter-clockwise direction. A vacuum pressure rotatable circulating transporting drum 16, which is rotatable in a clockwise direction, is rotatably mounted in the table top 11 to be contiguous to both of the auxiliary drums 12 and 14.

A further pair of vacuum pressure rotatable auxiliary transporting drums 18 and 20 are rotatably mounted on the table top 11 contiguous to the central drum 10 and at the other side of the drum 10 from the drums 12 and 14. The drums 18 and 20, like the drums 12 and 14, are rotatable in a counterclockwise direction. Finally, a rotatable vacuum pressure circulating transporting drum 22 is rotatably mounted on the table top 11 to be contiguous to the drums 18 and 20. The circulating drum 22 is rotatable in a clockwise direction.

Figure 3:
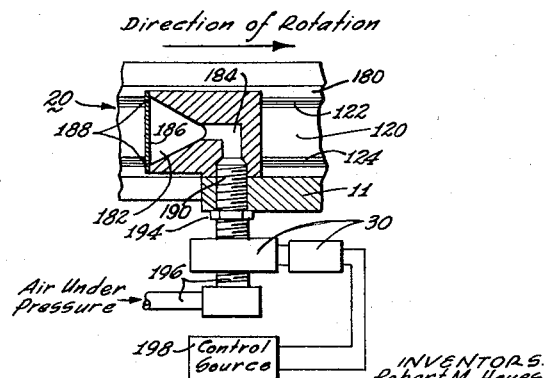
FIGURE 3 is a sectional view substantially on the line 3—3 of FIGURE 1 showing, likewise on an enlarged scale, the constructional details of one of the gate transfer mechanisms used in the apparatus of FIGURE 1 for controllably transferring from one of the drums to another.

A pair of gate transfer mechanisms 24 and 26 are positioned adjacent the contiguous points of the drums 20 and 22. The gate 24 is coupled through a suitable feed line to an air pressure source, and a solenoid actuated valve 28 is interposed in the feed line. A suitable feed line couples the gate transfer mechanism 26 to the air pressure source, and a solenoid valve 30 is interposed in the latter feed line. The construction of the solenoid valves 28 and 30 is shown in FIGURE 3 and is described in some detail hereafter and is described in detail in co-pending application Serial No. 562,154, filed January 30, 1956, by Stuart L. Peck et al.

When the solenoid valve 28 is energized, it is opened to permit an air blast to emit from the gate 24. This air blast is directed tangentially of the drum 22 and, in a manner to be described, causes a card transported by the drum into the influence of the blast to be transferred to the drum 20. Likewise, the gate 26 produces an air blast tangentially of the drum 20 for producing the transfer of cards from the drum 20 to the drum 22. The air blast from the gate 26 occurs whenever the solenoid 30 is energized.

In like manner, a gate transfer mechanism 32 has a solenoid valve 34 in its feed line, and this valve may be controlled to control the transfer of cards from the drum 12 to the drum 10. A gate transfer mechanism 36, having a solenoid valve 38 in its feed line, controls the transfer of cards from the drum 10 to the drum 12.

Similarly, a gate transfer mechanism 40, having a solenoid valve 42 in its feed line, controls the transfer of cards from the drum 20 to the drum 10. A gate transfer mechanism 44 has a solenoid valve 46 interposed in its feed line, and energizing of the valve 46 causes cards to be transferred from the drum 10 to the drum 20. Likewise, a gate 41 having a solenoid valve 43 in its feed line controls the transfer of cards from the drum 18 to the drum 20. A further gate 45 has a solenoid valve 47 in its feed line, and this latter gate controls the transfer of cards from the drum 18 to the drum 20.

A gate transfer mechanism 48 controls the transfer of cards from the drum 18 to the drum 10, and a gate transfer mechanism 50 controls the transfer of cards from the drum 10 to the drum 18. Solenoid valves 52 and 54 are respectively disposed in the respective feed lines from the air pressure source to the gates 48 and 50.

A gate transfer mechanism 56 and its solenoid valve 58 control the transfer of cards from the drum 10 to the drum 14. A similar gate 60 and its solenoid valve 62 control the transfer of cards from the drum 14 to the drum 10.

A pair of gates 64 and 66 respectively control the transfer of cards from the drum 16 to the drum 14 and from the drum 14 to the drum 16. A solenoid valve 68 is interposed in the feed line of the gate 64 and a solenoid valve 70 is interposed in the feed line to the gate 66.

Finally, a pair of gate transfer mechanisms 72 and 74 are positioned on the table top 11 at the contiguous point of the drums 12 and 16. The gate 72 has a solenoid valve 76 interposed in its feed line, and when that valve The bearings 146 and the sleeves 162 are held on the shaft 144 by a nut 166. The nut 166 is screwed on a threaded portion at the bottom of the shaft and a lock washer 164 is interposed between it and the lower bearing. A sealing disk 168 is also screwed on the threaded portion at the bottom of the shaft 144.

The sealing disk 168 operates in conjunction with a bottom plate 170 to resist the movement of air between the interior of the housing 150 and the interior of the hollow shaft 144 when a pressure differential exists between the housing and the shaft. The bottom plate 170 is secured to the housing 150 by a plurality of studs 172. The bottom plate has a central opening, and a hollow conduit 174 extends into that opening in friction-fit with the plate 170. The conduit 174 is axially aligned with the hollow shaft 144 so that air may be exhausted from the hollow interiors of the shaft and of the conduit by a vacuum pump 176. The vacuum pump may be of any suitable known construction and, for that reason, is shown merely in block form.

The vacuum pump 176 draws air in through the orifices 122 and 124, and through the interior of the drum 10 down the shaft 144 and through the conduit 174. This creates a vacuum pressure at the outer peripheral surface of the annular portion 120 of the lower section of the drum 10 to firmly retain the cards on that surface.

As noted above, the gate transfer mechanism 26 is shown in greater detail in FIGURE 3. As also noted, the other gate transfer mechanisms of the apparatus of FIGURE 1 may be constructed in the same manner.

The gate transfer mechanism 24, as shown in FIGURE 3, includes a body portion 180 which has a teardrop configuration when viewed in plan view in FIGURE 1. The body portion 180 tapers towards its forward end, and it encloses a bell-shaped chamber 182 and a passageway 184 which communicates with the chamber. An apertured plate 186 encloses the forward end of the chamber 182 at the tapered end of the body 180. The plate 186 has a pair of apertures 188 formed in it, and these apertures are respectively aligned with the orifices in the drum 20 corresponding to the orifices 122 and 124 in the drum 10.

A fitting 190 is threaded into the body portion 180, and this fitting is in the form of a tubular bushing which communicates with the passageway 184. The fitting 190 extends downwardly from the gate mechanism 26 through an aperture in the table top 11. A nut 194 is threaded to the portion of the fitting protruding down through the bottom of the table top 11. The nut 194 may be tightened to securely hold the body portion on the table top 11 at a desired tangential inclination to the drum 10. A suitable feed line 196 is coupled to the fitting 194, and this line is in turn coupled to a suitable air pressure source. The solenoid valve 30 is interposed in the line 196, and the energizing winding of the solenoid valve is coupled to a control source 198. The solenoid valve 30 may be constructed in a manner similar to that disclosed in detail in co-pending application Serial No. 562,154.

Whenever the control source 198 energizes the solenoid valve 30, air under pressure is introduced through the feed line 196 and the valve 30, and through the fitting 190 into the passageway 184. The air is then passed into the chamber 188, and it emerges as high velocity streams through the apertures 188 in the plate 186. These air streams pass along the periphery of the drum 20 and strip the leading edge of a card transported by the drum into the vicinity of these streams. The streams cause the leading edge of the card to move outwardly from the periphery of the drum into the influence of the vacuum pressure at the periphery of the drum 22. The leading edge of the card is then drawn to the periphery of the drum 22, and the gate mechanism 24 serves to strip the card from the drum 20 and to deposit it on the periphery of the drum 22.

In like manner to that described above, the other gate transfer mechanisms of the apparatus of FIGURE 1 function controllably to transfer cards from one of the drums to the other. In each instance, the gate transfer mechanisms are spaced from the periphery of their respective drums a distance sufficient to permit a card to be transported unimpeded past the gate mechanism, during intervals when the gate mechanism is not activated to emit streams of air.

The gate transfer mechanism described above is similar to the one described in copending application Serial No. 562,154, filed January 30, 1956, in the names of Stuart L. Peck et al.

The reversible station 80 is shown in detail in the perspective view of FIGURE 4. As noted above, the stations 85, 89 and 94 may be similarly constructed. These reversible stations may be all similar to the station shown and claimed in copending application Serial No. 645,639, filed March 12, 1957, by Alfred M. Nelson et al. Moreover, all the stations may be controlled between their stacking mode and their feeding mode by the control arrangement shown in the copending case.

The station 80, as shown in FIGURE 4, includes a pair of guide rails or walls 200 and 202. The guide rail 200 is secured to the table top 11 by a series of screws such as the screw 204, and the guide rail 202 is secured to the table top 11 by a series of screws such as the screw 206.

The two guide rails extend away from the periphery of the drum 12 in a radial direction, and these rails are spaced from one another in parallel relationship. The rails are spaced apart a distance corresponding to the length of the information storage cards, and these cards are supported within the station in a stacked condition, with the lower edges of the cards resting on the table top 11. A resiliently biased pusher member (not shown) is supported within the station, and this pusher member resiliently urges the cards in the stack toward the mouth of the station to maintain the cards in a stacked condition in the station. As fully described in the copending application, the pusher member may have a switch armature mounted on it. This armature short-circuits across a pair of electrical contacts on the feed head 81 when the last card is fed out of the station.

The stack head 82 is secured to a lever under the table top 11 by a screw 208. The screw extends through a slot 210 in the table top and the lever extends across the underside of the table top. The end of the guide rail 200 is bifurcated so that the stack head can move into the end portion of the guide rail when the stack head is operated to its operating position. The stack head 82 has a pair of fingers 82' which extend into the peripheral grooves adjacent the slots corresponding to the slots 122 and 124 of the drum 10, as described in FIGURE 2. Therefore, when the stack head 82 is moved to its operative position, the fingers 82' extend into the peripheral grooves so that a barrier is formed for the cards transported by the drum 20. Such cards, therefore, move against the stack head 82 and their forward motion is arrested by the stack head.

As mentioned above, the stack head 82 is secured to a lever arm on the underside of the table top 11 by the screw 208. This lever is pivoted to the table top by a pivot shaft 210, the shaft being secured to the table top and extending upwardly through the table top.

When the stack head 82 is retracted to its standby position, the cards on the transporting drum 20 are free to move past the stack head. The end of the guide rail 200 is spaced from the transporting drum by a distance corresponding to the thickness of a single card. The guide rail, therefore, defines a throat with the transporting drum when the stack head is retracted so that cards in the station 80 may be released one at a time to the periphery of the drum.

The station in FIGURE 4 is actually illustrated in its feeding mode, and the feed head 81 is illustrated as moved forward through the end portion of the guide rail 202 to its operating position. The feed head 81 has a surface 81' is energized the gate 72 emits streams of air tangentially of the drum 16 to obtain the transfer of cards from the drum 16 to the drum 12. In like manner, a solenoid valve 78 is interposed in the feed line to the gate 74, and when this valve is energized the resulting streams of air from the gate 74 produces a transfer of cards from the drum 16 to the drum 12.

A first reversible card holding station 80 is mounted on the table top 11, and this station is positioned with its mouth adjacent the periphery of the drum 20. The constructional details of the station 80 will be described subsequently in conjunction with FIGURE 4. Other card holding stations to be described may be constructed in a manner similar to the station 80.

The operation of the station 80 may be controlled by input transfer means including a vacuum pressure feed head 81 and output transfer means including a stack head 82. A solenoid valve 83 is interposed in a feed line which couples the feed head 81 to a vacuum pressure source. The station also includes a pick-off member 84 whose function will also be described.

Briefly, it is appropriate at this time to point out that the station 80 supports the information cards in a generally stacked condition. The station has a feeding mode in which the feed head 81 is moved to its illustrated position in FIGURE 1, and the stack head 82 is moved back to its illustrated standby position. When the station is in its feeding mode, the vacuum pressure at the feed head 81 is controlled by the solenoid valve 83. Whenever the solenoid valve is de-energized, the vacuum pressure is established and the feed head 81 prevents the vacuum pressure transporting drum 20 from withdrawing the leading card from the station 80. However, when the solenoid valve 83 is energized it closes to interrupt the vacuum pressure, and the head 81 permits the leading card to be drawn by the drum 20 out of the station. Then, unless the vacuum pressure is reasserted, the next succeeding card in the station is also drawn out. In this manner, whenever the vacuum pressure to the head 81 is interrupted by energizing the solenoid valve 83, the cards in the station 80 may be withdrawn one at a time by the transporting drum 20. The controlled transfer of cards individually by the drum 20 from the station 80 is described in detail in co-pending application Serial No. 645,639 and also in co-pending application Serial No. 552,506, filed December 12, 1955, by Hans M. Stern.

Alternately, when the station 80 is conditioned to its stacking mode, the feed head 81 is withdrawn and the stack head 82 is moved into position. Then, when a card transported by the drum 20 is brought past the mouth of the station 80, such card is arrested by the stack head 82 and has its trailing edge projecting back from the pick-off 84. The next succeeding card transported by the drum 20 then rides up over the pick-off 84 and it also is arrested by the stack head 82. The subsequent card at the same time deposits the preceding card in the station 80. In this manner, the cards transported by the drum 20 to the station 80 are deposited one after another into the station. The controlled transfer of cards from the drum 20 to the station 80 is described in detail in co-pending application Serial No. 645,639.

A similar reversible station 85 is mounted on the table top 11 with its mouth adjacent the periphery of the drum 12. The station 85 has a vacuum pressure feed head 86 associated with it, and a solenoid valve 87 is interposed in the feed line of the feed head 86 to control the vacuum pressure at the feed head. The station 85 also has a stack head 88 and a pick-off member 88a associated with it. In the same manner as the station 80, the station 85 may be conditioned to its illustrated stacking mode, or it may be conditioned to a feeding mode.

Likewise, a reversible station 89 is positioned on the table top 11 with its mouth adjacent the periphery of the drum 14. The station 89 includes a feed head 90, and the feed head has a solenoid valve 91 interposed in its feed line, which feed line couples the feed head to a suitable vacuum pressure source. The station 89 also includes a stack head 92 and a pick-off member 93. In the manner described above, the station 89 may be conditioned either to its illustrated stacking mode, or it may be conditioned to a feeding mode.

A reversible station 94 is also mounted on the table top 11, and this latter station is positioned to have its mouth adjacent the periphery of the drum 18. The station 94 includes a stack head 95, and it also includes a feed head 96 and a pick-off member 97. A solenoid valve 98 is disposed in the feed line which couples the feed head 96 to a suitable vacuum pressure source. The station 94, likewise, may be conditioned either to its illustrated feeding mode, or it may be conditioned to a stacking mode. The solenoid valve 98 may be constructed in a manner similar to that described and shown in co-pending application Serial No. 552,506.

Each of the vacuum pressure transporting drums 10, 12, 14, 16, 18, 20 and 22 may be constructed in a manner similar to the vacuum pressure transporting drum described in copending application Serial No. 600,975 (now patent No. 2,883,189) which was filed July 30, 1956 in the name of Loren R. Wilson. Only the details of the drum 10 are described in FIGURE 2 because the other drums may be similarly constructed.

Figure 2:
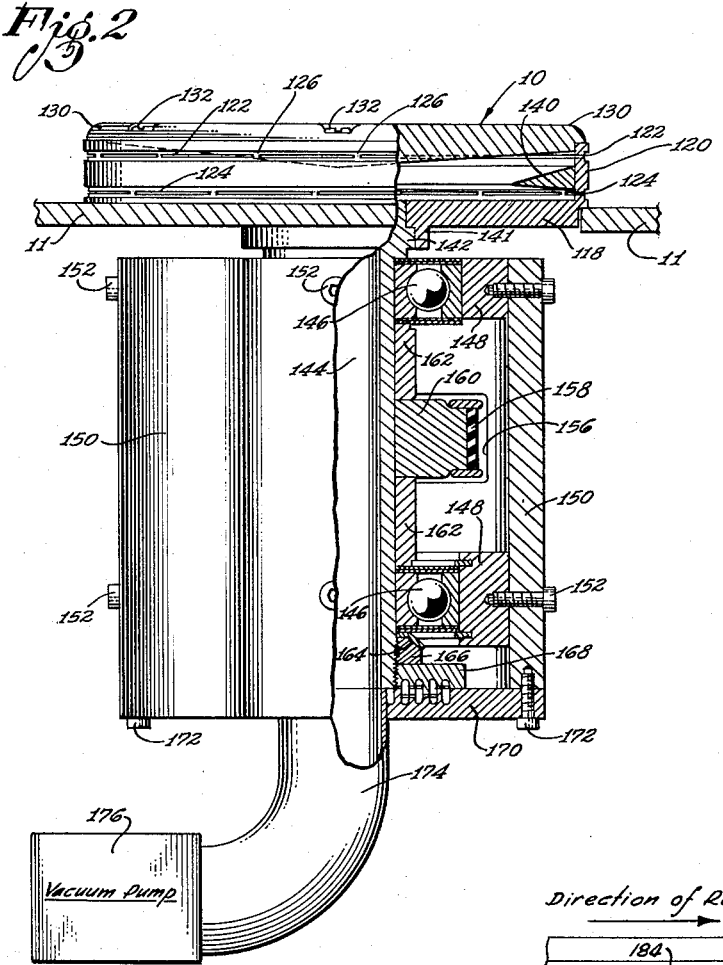
FIGURE 2 is a view, partly in section and partly in elevation and substantially on the line 2—2 of FIGURE 1, showing on an enlarged scale the constructional details of one of the rotatable vacuum pressure transporting drums used in the apparatus of FIGURE 1.

The drum shown in FIGURE 2 is similar to the drum disclosed and claimed in the copending Wilson application referred to above. The drum 10 is made up of a lower section and of an upper section. The lower section of the drum includes a disklike bottom portion 118 and an annular side portion 120 integral with one another. A pair of axially spaced peripheral orifices 122 and 124 extend through the side portion 120. Each of these orifices is discontinuous in that it is interrupted at selected intervals about its periphery by ribs 126 integral with the side portion 120.

The upper section of the drum 10 is in the form of a disk-like member 130 which engages the annular side member 120 of the lower section. The upper section 130 forms an enclosure with the lower section of the drum, with the upper section being parallel to the bottom portion 118 of the lower section. The upper section 130 is held in place on the side portion 120 by a series of screws 132.

A deflector ring 140 is supported within the interior of the drum 10 in press-fit with the inner surface of the annular side portion 120. This deflector ring is tapered toward the center of the drum to prevent turbulence and to provide a streamlined path for air that is drawn in through the orifices 122 and 124.

The portion 118 of the lower section of the drum 10 contains a central opening surrounded by an annular collar 141. The collar 141 surrounds a collar 142 provided at one end of a hollow shaft 144. The drum 10 is supported on a shoulder formed by the collar 142, and the end of the shaft 144 extends into the opening of the portion 118 in friction-fit with that portion. Therefore, rotation of the hollow shaft 144 causes the drum 10 to rotate. Also, the hollow interior of the shaft 144 communicates with the interior of the drum. Bearings 146 are provided at opposite ends of the shaft 144. The inner races of the bearings 146 are mounted on the shaft 144, and the outer races of the bearings are disposed against bushings 148 secured to a housing 150 by a plurality of studs 152.

An arcuate opening 156 is provided in the housing 150 between the bearings 146. This opening enables a drive belt 158 to extend into the housing and around a pulley 160. The pulley 160 is keyed to the shaft 144 between the bearings 146, and it is held against axial movement on the shaft by a pair of sleeves 162. In this way, the shaft 144 and the drum 116 can be rotated by a suitable motor (not shown) coupled to the pulley 160 by the drive belt 158.

at which the vacuum pressure is exerted and which, when the feed head is in its operating position, engages the leading card in the stack held in the station. The surface 81' coacts with a part of the face of the leading card, and the forward portion of that face engages the periphery of the transporting drum 20. The pusher member referred to above urges the stack of cards forwardly in the drum so that the leading card is rigidly maintained in that position.

So long as the solenoid valve 83 (FIGURE 1) is not energized, a vacuum pressure is established at the face 81' of the feed head 81. This vacuum pressure is made sufficient to overcome the vacuum pressure exerted by the drum so that the cards are maintained in the station. However, when the solenoid valve 83 is energized to interrupt the vacuum pressure at the face 81', the leading card is released from the station to the periphery of the drum 20. So long as the vacuum pressure to the head 81 is interrupted, cards are withdrawn by the drum 20 one after another through the throat formed between the guide rail 200 and the periphery of the drum. The solenoid valve 83 may be constructed in a manner similar to that described in detail in co-pending application Serial No. 552,506.

The feed head 81 is pivotally coupled to a lever arm (not shown) which extends under the table top 11. The feed head 81 is mounted on a pivot shaft 214. The pivot shaft 214 extends down through a slot 216 in the table top 11 and is mounted at the end of the lever arm (not shown) which extends under the table top 11. A second slot 218 is formed in the table top 11, and an actuating member 220 extends down from the feed head 81 through the slot 218. The disposition of the actuating member 220 in the slot 218 controls the pivotal movement of the feed head 81. The actuating member 220 engages a toothed member 222 which is secured to the feed head 81. The pivotal movement of the feed head 81 between an operative position and a standby position is fully described in copending application Serial No. 645,639.

The net result is that when the feed head is retracted back to its standby position, the actuating member 220 rides in the slot 218 to rotate the feed head a slight amount about its shaft 214. This rotation of the feed head closes an internal mechanical valve to cut off the vacuum pressure to the surface 81'. This action is fully and completely described in the co-pending case Serial No. 645,639, the purpose of the internal valve being to preclude any necessity for the continual energizing of the solenoid valve 83 when the feed head is in its standby position.

The lever arm associated with the stack head 82 and the lever arm associated with the feed head 81 are disposed on opposite sides of a cam, and they are actuated in a manner fully described in the copending application Serial No. 645,639.

The control is such that when the cam moves through a first 180 degrees the stack head 82 is moved to its operating position and the feed head 81 is retracted to its standby position. Then, when the cam rotates through a second 180 degrees the feed head 81 is moved to its illustrated operating position and the stack head 82 is retracted to a standby position. Successive pulsing of a solenoid-controlled over-riding clutch, in the drive to the cam and as fully described in the copending application, causes the station alternately to be conditioned to a feeding mode and to a stacking mode.

Because the actual details of the reversible stations are not a part of the present invention and because such stations are fully and completely described in the copending application, and further because other types of reversible stations may also be used, a more detailed description of the reversible station is believed to be unnecessary.

A first transducer means 301 is mounted on the table top 11, and this transducer means is positioned in operative engagement with the drum 10 between the drums 12 and 20. Similarly, a transducer means 303 is mounted on the table top 11, and this latter transducer means is positioned in operative relationship with the drum 10 between the drums 14 and 18. The transducer means 301 and 303 are well known in the art or they may be constructed in a manner similar to that described in detail in co-pending application Serial No. 550,296, filed December 1, 1955, by Alfred M. Nelson et al. As will be described, each of the transducer means 301 and 303 may comprise a series of electromagnetic transducer heads. Each such series is arranged to individually process different rows of data on each card transported by the drum past respective ones of the heads in each series.

The control system of FIGURE 5a conditions the apparatus of FIGURE 1 to perform certain operations such as merging and collating on a pair of individual stacks of cards. The control system shown in FIGURE 5b cooperates with the system shown in FIGURE 5a to obtain a merging operation. These individual stacks are placed, for example, respectively in the stations 80 and 94, and they are subsequently deposited in a single stack in the station 89.

The cards in the individual stacks are sorted in accordance with the numbers represented by the binary data at a selected position on each card. These numbers, for example, may be in an ascending sequence from one card to the next in each of the individual stacks. The control of the apparatus of FIGURE 1 by the control system of FIGURES 5a and 5b is such that all the cards are merged into the station 89, with the binary numbers at the selected position occurring in a sorted ascending or descending sequence from one card to the next in the common stack.

In FIGURE 5a, the card 300 represents an information storage card from either the station 80 or from the station 94, the card being transferred from either the drum 20 or from the drum 18 to the central drum 10 and carried by the central drum past the transducer means 303. The transducer means 303 is represented in FIGURE 5a by a series of electromagnetic transducer heads 303a, 303b, 303c and 303d.

The data is recorded on the card 300 in a series of rows which extend lengthwise across the card, as mentioned above. Each of these rows is scanned by a different one of the heads 303a, 303b, 303c and 303d. The heads 303a, 303b and 303c respectively scan three rows of data. It should be evident that more or less rows could be used depending upon the complexity of the binary numbers recorded at each position on each card, and that a corresponding number of heads would be provided for scanning the various rows. The data in the individual rows is represented by magnetic dots of one polarity or the other. The information is preferably recorded in binary form so that the various magnetic areas represent different bits of binary information as determined by the polarities of these areas.

In one particular type of information storage card, the bits of binary information in the various rows may be disposed so that they extend in transverse columns across the card. Each transverse column represents a different binary number and corresponds, as mentioned above, to a different position along the length of the card. Each position on the card is represented by a clock recording, and these clock recordings extend along the bottom row of the card so that these recordings may be scanned by the transducer head 303d. The clock recordings, for example, are of a single polarity, and the head 303d produces an electric pulse for each position of the card scanned.

The transducer heads 303a, 303b, 303c and 303d are respectively connected to a series of amplifiers 304, 306, 308 and 310. The amplifiers 304, 306, 308 and 310 are well known in the art and may be constructed in a manner similar to that set forth on page 111 of "Digital Computer Components and Circuits" by R. K. Richards (published by D. Van Nostrand Company, Inc. of Princeton, New Jersey, in 1957. The amplifiers 304, 306 and 308 are respectively connected to the left input terminal of each of a series of flip-flops 320, 322 and 324 and to each of a series of associated inverters 326, 328 and 330. The inverters may be conventional single-stage vacuum tube circuits and they function in the usual manner to invert the polarity or phase of the pulse signals translated thereby. For example, a binary "1" read by the head 303c becomes inverted by the inverter 330 to a binary "0" and a binary "0" read by the head 303c becomes inverted by the inverter 330 to a binary "1." The construction and operation of inverters is well known in the art. The inverters may be constructed in a manner similar to that shown and described on page 111 or page 67 of the Richards' book. The output terminals of these inverters are respectively connected to the right input terminals of respective ones of the flip-flops 320, 322 and 324.

By way of illustration, a binary "1" read by the head 303c is amplified by the stage 308 and is introduced to the left input terminal of the flip-flop 324 to trigger the flip-flop to the true state. However, a binary "0" is read by the head 303c, is amplified by the stage 308 and is inverted to a binary "1" by the stage 330. The binary "1" signal from the stage 330 is introduced to the right input terminal of the flip-flop 324 to trigger the flip-flop to the false state.

The flip-flops may be constructed in a manner similar to that described on pages 164–166 inclusive of volume 19 entitled "Wave Forms" of the Radiation Laboratories Series published in 1949 by the Massachusetts Institute of Technology.

These flip-flops are bi-stable relaxation circuits. Each of the flip-flops is provided with two input terminals designated for convenience as the left and right input terminals, and each is provided with two output terminals designated for convenience as the left and right output terminals. The input terminals are shown at the bottom of the block representing the flip-flop and the output terminals are shown at the top of the block. A negative input signal introduced to a particular one of the input terminals such as the left input terminals produces a relatively high voltage at the corresponding output terminal of the flip-flop such as the left output terminal of the flip-flop. A relatively high voltage on the left output terminal of a flip-flop represents a true state for the flip-flop. Similarly, a false state of operation for a flip-flop is indicated by a relatively high voltage on the right output terminal of the flip-flop.

The left and right output terminals of the flip-flop 320 are connected respectively to an "and" network 332 and to an "and" network 334. The left and right output terminals of the flip-flop 322 are connected respectively to an "and" network 336 and to an "and" network 338. Likewise, the left and right output terminals of the flip-flop 324 are connected respectively to an "and" network 340 and to an "and" network 342.

The "and" networks may be constructed in a manner similar to that shown in FIGURE 3 of Patent 2,723,080, and FIGURE 12 of Patent 2,609,143. Each of the "and" networks is provided with a plurality of input terminals, and each is constructed in known manner so that a signal passes through the network only when positive signals are simultaneously impressed on all the input terminals of the network.

Certain networks will be referred to in the subsequent description as "or" networks. Such networks are well known to the art. An "or" network is usually made up of a series of interconnected diodes and is designed to pass to a common output terminal any one of a plurality of signals that might be introduced to different ones of a plurality of input terminals.

The amplifier 310 is connected to the left input terminal of a flip-flop 350 and to the input terminal of a delay line 352. The delay line 352 is well known in the art and may be constructed in a manner similar to that described and shown on page 287 of "Digital Computer Components and Circuits" by R. K. Richards (published by D. Van Nostrand Company, Inc. of Princeton, New Jersey, in 1957). The output terminal of the delay line is connected to the right input terminal of the flip-flop 352. The left output terminal of the flip-flop 350 is connected to a binary counter 354. The binary counter is connected to a manually adjustable selector 356 which, in turn, is connected to compare network 358.

The arrangement of the binary counter 354, the selector 356 and the compare network 358 is fully described on pages 31 and 32 of copending application Serial No. 566,404, filed February 20, 1956, by Jerome B. Wiener and is fully shown in FIGURE 9 of co-pending application Serial No. 566,404. It should be appreciated that this arrangement constitutes only one embodiment of the invention and that other arrangements may also be used to select particular information from each card for processing. Actually, the information may be selected in other ways than by counting successive positions on the cards.

In brief, the delay line 352 imparts a delay to each pulse from the amplifier 310 so that the pulse first triggers the flip-flop 350 from a true state to a false state, and then the delayed pulse returns the flip-flop to its original true state before the next pulse from the amplifier 310 triggers the flip-flop to its false state. The flip-flop 350, and the other flip-flops to be described, are said to be in a true state when a relatively high voltage appears at the left output terminal, and are said to be in a false state when a relatively high voltage appears at the right output terminal.

A series of pulses therefore appear at the left output terminal of the flip-flop 350 corresponding to the clock recordings scanned by the head 303d. These recordings, in turn, correspond to successive positions on the card 300. The pulses from the flip-flop 350 are applied to the binary counter 354. The binary counter comprises a series of flip-flops connected in known manner to be successively triggered from one state to another in response to pulses from the flip-flop 350 and in a binary sequence.

The selector 356 comprises a series of switches which are connected to the various flip-flops in the binary counter 354. These switches selectively connect one or the other of the output terminals of these flip-flops to the compare network 358. These switches are individually adjustable so that the flip-flops in the binary counter are required to assume a selected pattern before the compare network 358 will translate a signal to its output terminal. This pattern corresponds to a selected count of the binary counter 354 which, in turn, corresponds to a selected position on the card 300.

Therefore, by the manual adjustment of the selector 356, the compare network 358 may be made to produce an output pulse for a particular selected position on the card 300 and only for that position. The compare network may actually constitute an "and" network which passes a signal when the count in the counter 354 corresponds to the count in the selector 356. Such an "and" network may be constructed in a manner similar to that set forth on pages 32 of "Arithmetic Operations in Digital Computers" by R. K. Richards (published by D. Van Nostrand Company, Inc. of Princeton, New Jersey, in 1955). The pulse from the compare network 358 is introduced to each of the "and" networks 332, 334, 336, 338, 340 and 342. These "and" networks, therefore, are conditioned for conduction only for the selected position on the card 300.

The "and" networks 332, 334, 336, 338, 340 and 342 are respectively connected to a plurality of "and" networks 360, 362, 364, 366, 368 and 370. The "and" networks 332, 334, 336, 338, 340 and 342 are additionally respectively connected to individual ones of a series of "and" networks 372, 374, 376, 378, 380 and 382.

A flip-flop 390 has its left output terminal connected to each of the "and" networks 372, 374, 376, 378, 380 and 382. The right output terminal of the flip-flop 390 is connected to each of the "and" networks 360, 362, 364, 366, 368 and 370.

The "and" networks 360 and 362 are connected respectively to the left and right input terminals of a flip-flop 392. The "and" network 364 and 366 are connected respectively to the left and right input terminals of a flip-flop 394. Whereas, the "and" networks 368 and 370 are connected respectively to the left and right input terminals of a flip-flop 395.

The "and" network 372 is connected to the left input terminal of a flip-flop 396, and the "and" network 374 is connected to the right input terminal of that flip-flop. The "and" networks 376 and 378 are connected respectively to the left and right input terminals of a flip-flop 398. Finally, the "and" networks 380 and 382 are connected respectively to the left and right input terminals of the flip-flop 400.

The output terminals of the flip-flops 392, 394, 395, 396, 398 and 400 are all connected to respective input terminals of a comparator 402. The comparator 402 is shown in block form for purposes of simplicity. The comparator is formed from a plurality of "and" and "or" networks interrelated in a logical pattern.

The comparator 402 may be constructed and operated in a manner similar to that described in Knutsen Patent 2,712,898, or Kouzmine Patent 2,501,821. The comparator 402 may also be constructed in accordance with the "and" and "or" networks shown on page 32 of "Arithmetic Operations in Digital Computers" by R. K. Richards (published by D. Van Nostrand Company, Inc. of Princeton, New Jersey, in 1955), and in accordance with the discussion on pages 33 to 80, inclusive, of that book. The discussion on pages 33 to 80, inclusive, of the book by Richards indicates how various "and" and "or" networks may be combined in accordance with complex logical equations.

In a manner to be described, the flip-flops 392, 394 and 395 are triggered into a pattern of operational states which represent a decimal number in binary form. In like manner, the flip-flops 396, 398 and 400 are triggered to a pattern of operational states which also represent a decimal number in binary form. The comparator 402 functions to compare the first binary number with the second binary number. Should the first number exceed the second number, the comparator develops a pulse on its output lead 404. Should the first number equal the second number, the comparator develops a pulse on its output lead 406. Finally, should the first number be less than the second number, the comparator develops a pulse on its output lead 408. The comparator accomplishes this result in a manner understood in the art, and as described in the patents referred to above.

The operation of the comparator 402 may be expressed as:

$$X = i_3 j_3' + (i_3 j_3 + i_3' j_3')[i_2 j_2' + (i_2 j_2 + i_2' j_2')(i_1 j_1')] \quad (1)$$

where $j_1$ = a relatively high voltage on the left output terminal of the flip-flop 395;

$j_1'$ = a relatively high voltage on the right output terminal of the flip-flop 395;

$j_2$ and $j_3$ = relatively high voltages on the left output terminals of the flip-flops 394 and 392, respectively;

$j_2'$ and $j_3'$ = relatively high voltages on the right output terminals of the flip-flops 394 and 392, respectively;

$i_1$, $i_2$ and $i_3$ = relatively high voltages on the left output terminals of the flip-flops 400, 398 and 396, respectively;

$i_1'$, $i_2'$ and $i_3'$ = relatively high voltages on the right output terminals of the flip-flops 400, 398 and 396, respectively;

"+" = an "or" proposition in which a signal is produced when any of the two or more positions covered by the "or" proposition is true; and $X$ = a signal on the line 404 to indicate that the number stored in the flip-flops 400, 398 and 396 is greater than the number stored in the flip-flops 395, 394 and 392.

The output from the flip-flops 395, 394 and 392 may sometimes have a greater value than the output from the flip-flops 400, 398 and 396. At such times a signal is produced by the comparator 402 for introduction to the line 408. The introduction of signals from the comparator 402 to the line 408 may be logically expressed as:

$$Y = j_3 i_3' + (j_3 i_3 + j_3' i_3')[j_2 i_2' + (i_2 j_2 + i_2' j_2') j_1 i_1'] \quad (2)$$

where $Y$ = a signal on the line 408 to indicate that the number stored in the flip-flops 395, 394 and 392 is greater than the number stored in the flip-flops 400, 498 and 396; and the other terms have previously been defined.

At other times, the output from the flip-flops 395, 394 and 392 may be equal to the output from the flip-flops 400, 398 and 396. Upon the occurrence of equal outputs from the flip-flops 395, 394 and 392 and from the flip-flops 400, 398 and 396, an output signal is introduced from the comparator 402 to the line 406. This signal may be produced in accordance with the logical equation:

$$Z = (i_3 j_3 + i_3' j_3')(i_2 j_2 + i_2' j_2')(i_1 j_1 + i_1' j_1') \quad (3)$$

where $Z$ = a signal on the line 406 to indicate that the number stored in the flip-flops 395, 394 and 392 is equal to the number stored in the flip-flops 400, 398 and 396; and the other terms have been previously defined.

The leads 404 and 406 from the comparator 402 are connected to an "or" network 410. The "or" network 410 is connected to an "and" network 411 which, in turn, is connected to a delay line 412 and to a delay line 414. The output terminal of the delay line 412 is connected to an "or" network 416, and the "or" network 416 is connected to the left input terminal of a flip-flop 418 and to the input terminal of a delay line 420. The output terminal of the delay line 420 is connected to the right input terminal of the flip-flop 418.

The left output terminal of the flip-flop 418 is connected to the control grid of a triode 422. A resistor 424 is connected between the control grid and the negative terminal of a source of direct voltage 426. This source has a grounded common terminal and it also has a positive terminal. The cathode of the triode 422 is grounded, and the anode of this tube is connected to one terminal of the energizing winding of the solenoid valve 58 associated with the gate 56 of FIGURE 1. The other terminal of this energizing winding is connected to the positive terminal of the source 426.

The delay line 414 is connected to an "or" network 426, and the output terminal of this "or" network is connected to the left input terminal of a flip-flop 428 and to the input terminal of a delay line 430. The output terminal of the delay line 430 is connected to the right input terminal of the flip-flop 428.

The left output terminal of the flip-flop 428 is connected to the control grid of a triode 432. The cathode of the triode 432 is grounded, and the control grid is connected to one terminal of a resistor 434. The other terminal of the resistor 434 is connected to the negative terminal of the source of direct voltage 426.

The anode of the triode 432 is connected to one terminal of the energizing winding of the solenoid valve 42 associated with the gate 40 of FIGURE 1. The other terminal of this winding is connected to the positive terminal of the source of direct voltage 426.

The "and" network 411 is also connected to an "or" network 436. The "or" network 436 may be constructed in a manner similar to that set forth on page 32 of "Arithmetic Operations in Digital Computers" by R. K. Richards. The output terminal of the "or" network 436 is connected to the left input terminal of a flip-flop 438 and to the input terminal of a delay line 440. The flip-flop 438 may be constructed in a manner similar to that described and shown on pages 164, 165 and 166 of Volume 19 entitled "Waveforms" of the Radiation Laboratories Series. The output terminal of the delay line 440 is connected to the right input terminal of the flip-flop 438. The left output terminal of the flip-flop 438 is connected to the control grid of a triode 442. A resistor 444 is connected between the control grid and the negative terminal of the source 426. The cathode of the triode 442 is grounded. The anode of the triode 442 is connected to one terminal of the energizing winding of the solenoid valve 83 associated with the feed head 81 of the card holding station 80. The other terminal of this energizing winding is connected to the positive terminal of the source 426.

The "and" network 411 is also connected to a delay line 446 and to an "and" network 448. The delay line 446 is connected to the input terminal of an "or" network 450, the output terminal of this "or" network being connected to the left input terminal of the flip-flop 390. Another terminal of the "and" network 448 is connected to the right output terminal of the flip-flop 390.

The output terminal of the "and" network 448 is connected to an "or" network 452. The output terminal of the "or" network 452 is connected to the left input terminal of a flip-flop 454 and to the input terminal of a delay line 456. The output terminal of the delay line 456 is connected to the right input terminal of the flip-flop 454.

The left output terminal of the flip-flop 454 is connected to the control grid of a triode 458, and a resistor 460 is connected between this control grid and the negative terminal of the source 426.

The cathode of the triode 458 is grounded, and the anode of this triode is connected to one terminal of the energizing winding of the solenoid valve 68 associated with the gate 64. The other terminal of this energizing winding is connected to the positive terminal of the source 426.

The output lead 408 from the comparator 402 is connected to an "and" network 461. The output terminal of the "and" network 461 is connected to a delay line 462 and to an "and" network 464. The delay line is connected to an "or" network 466, and the output terminal of the "or" network 466 is connected to the right input terminal of the flip-flop 390.

A second input terminal of the "and" network 464 is connected to the left output terminal of the flip-flop 390. The output terminal of the "and" network 464 is connected to the "or" network 452 and to an "or" network 468.

The output terminal of the "or" network 468 is connected to a delay line 470, and the delay line 470 is connected to an "or" network 472. The "or" network 472 is connected to the left input terminal of a flip-flop 474 and to the input terminal of a delay line 476. The left output terminal of the flip-flop 474 is connected to the control grid of a triode 478. A resistor 480 is connected between the control grid of the triode 478 and the negative terminal of the source 426. The cathode of the triode 478 is grounded, and the anode of this triode is connected to one terminal of the energizing coil of the solenoid valve 70 associated with the gate transfer mechanism 66. The other terminal of the energizing coil of this solenoid valve is connected to the positive terminal of the source 426.

The output terminal of the "and" network 461 is also connected to an "or" network 482, to a delay line 484 and to a delay line 486. The "or" network 482 and the other "or" network shown in Figure 5b may be constructed in a manner similar to that shown and described on page 32 of "Arithmetic Operations in Digital Computers" by R. K. Richards. The output terminal of the delay line 486 is connected to an input terminal of the "or" network 416. The delay line 484 and the other delay lines shown in FIGURE 5b may be constructed in a manner similar to that shown and described on page 287 of "Digital Computer Components and Circuits" by R. K. Richards.

The "or" network 482 is connected to the left input terminal of a flip-flop 490 and to the input terminal of a delay line 492. The output terminal of the delay line 492 is connected to the right input terminal of the flip-flop 490. The flip-flop 490 and the other flip-flops shown in FIGURE 5b may be constructed in a manner similar to that described and shown on pages 164, 165 and 166 of volume 19 entitled "Waveforms" of the Radiation Laboratories series published by the Massachusetts Institute of Technology. The left output terminal of the flip-flop 490 is connected to the control grid of a triode 494. The cathode of this triode is grounded, and a resistor 496 is connected from the control grid of the triode to the negative terminal of the source 426. The anode of the triode 494 is connected to one terminal of the energizing coil of the solenoid valve 98 associated with the feed head 96 of the station 94. The other terminal of this energizing winding is connected to the positive terminal of the source 426.

The delay line 484 is connected to an "or" network 498, and this "or" network is connected to the left input terminal of a flip-flop 500 and to the input terminal of a delay line 502. The output terminal of the delay line 502 is connected to the right input terminal of the flip-flop 500.

The left output terminal of the flip-flop 500 is connected to the control grid of a triode 504. The cathode of this triode is grounded, and a resistor 506 is connected between the control grid of the triode and the negative terminal of the source 426. The anode of the triode 504 is connected to one terminal of the energizing winding of the solenoid valve 52 associated with the gate transfer mechanism 48. The other terminal of this energizing winding is connected to the positive terminal of the source 426.

The positive terminal of the source 426 is also connected to a single-pole single-throw switch 508. This switch may be of the push-button type, and it is manually operable to initiate the operation of the control system. The switch 508 is connected to a capacitor 510 which in turn, is connected to the input terminal of a differentiator 512. The differentiator 512 may be constructed in a manner similar to that described and shown on pages 2–27 of "Principles of Radar" by the staff of the Massachusetts Institute of Technology (published by the McGraw-Hill Book Company, Inc. of New York, New York, in 1946). The output terminal of the differentiator 512 is connected to the control grid of a triode 514. A resistor 516 is connected to the control grid of the triode 514 and to the negative terminal of the source 426.

The cathode of the triode 514 is grounded, and the anode is connected to one terminal of each of a group of parallel-connected energizing windings 518, 520 and 522. The other terminal of each of these windings is connected to the positive terminal of the source 426. The winding 518 is associated with the card holding station 80 to condition that station alternately to a feeding mode and to a stacking mode when the triode 514 is successively pulsed. Likewise, the winding 520 is associated with the card holding station 94 to condition that station alternately to a feeding mode and to a stacking mode when the triode 514 is successively pulsed. In like manner, the winding 522 is associated with the card holding station 89 to condition the latter station alternately to a stacking mode and to a feeding mode when the triode 514 is successively pulsed. Each of the windings 518, 520 and 522 is associated with its respective station in the manner fully described in the copending application Serial No. 645,639 referred to above. These windings actuate corresponding solenoids which in turn operate suitable clutch mechanisms to cause the respective stations to be conditioned to one or the other of the particular modes referred to above. This is described in some detail hereafter, especially with reference to FIGURE 13, and is described in detail in co-pending application Serial No. 645,639.

The output terminal of the differentiator 512 is also connected to an input terminal of the "or" network 482 and to a delay line 524. The output terminal of the delay line 524 is connected to an input terminal of the "or" network 498.

The output terminal of the differentiator 512 is also connected to a series of delay lines 526, 528, 530, 532 and 534. The delay line 528 is connected to an input terminal of the "or" network 416. The delay line 530 is connected to an input terminal of the "or" network 472. The delay line 532 is connected to an input terminal of the "or" network 436, and the delay line 534 is connected to an input terminal of the "or" network 426. The output terminal of the differentiator 512 is also connected to a pair of delay lines 536 and 538, and these delay lines are connected respectively to the "or" networks 466 and 450. The delay lines 526, 528, 530, 532, 534, 536 and 538 may be constructed in a manner similar to that set forth on page 287 of "Digital Computer Components and Circuits" by R. K. Richards.

Finally, the differentiator 512 is connected to the right input terminal of a flip-flop 540 and to the input terminal of a delay line 542. The output terminal of the delay line 542 is connected to the left input terminal of the flip-flop 540. The left output terminal of the flip-flop is connected to the "and" network 411 and to the "and" network 461.

To place the control system of FIGURES 5a and 5b in operation, the switch 508 is depressed and released. This causes a current pulse to flow into the capacitor 510, and the differentiator 512 produces a positive output pulse having a steep negative-going edge for triggering certain ones of the flip-flops referred to above from one operational state to another. It will be appreciated that the switch 508, the capacitor 510 and the differentiator 512 are intended to illustrate only one possible way of obtaining a starting pulse and that a number of other circuits may also be used.

The positive pulse from the differentiator 512 causes a pulse of current to flow through the triode 514 and through the station conditioning windings 518, 520 and 522. This pulse of current through these windings causes both the stations 80 and 94 to assume a feeding mode, and causes the station 89 to assume a stacking mode. The station 85 is not used for this operation of the apparatus. Only a pulse of current through the windings 518, 520 and 522 is necessary to obtain a feeding mode of operation for the windings 518, 520 and 522 as will be described in some detail subsequently, especially with reference to FIGURE 13, and as described in detail in co-pending application Serial No. 645,639. Furthermore, flip-flops responsive only to the negative-going edge of a pulse are shown and described on page 74 of "Digital Computer Components and Circuits" by R. K. Richards.

The pulse from the differentiator 512 passes through the "or" network 482 and triggers the flip-flop 490 to its true state. This causes the triode 494 to become conductive so that a current flows through the energizing winding of the solenoid valve 98. Such a current causes the solenoid valve to close and interrupt the vacuum pressure at the feed head 96. This enables the drum 18 to withdraw the leading card from the station 94 in the previously described manner. The pulse also passes through the delay line 492, and the pulse from the delay line returns the flip-flop 490 to its false state. This interrupts the current flow through the energizing winding of the solenoid valve 98 after one card has been released from the station 94, the vacuum pressure at the feed head 96 is established before any further cards are released.

The card so released from the station 94 is transported on the drum 18 to the gate 48. After a delay produced by the delay line 524 and which is sufficient to permit the card to be transported to the gate 48, the flip-flop 500 is triggered to its true state so that the triode 504 becomes conductive to energize the solenoid valve 52. This causes the gate 48 to be activated and transfer the card to the drum 10. After the card has been transferred, the delayed output pulse from the delay line 502 returns the flip-flop 500 to its false state to deactivate the gate 48.

The card from the station 94 is now transported on the drum 10 past the transducer means 303. The output pulse from the differentiator 512 is translated through the delay line 536 and through the "or" network 466 to be introduced to the right input terminal of the flip-flop 390. The flip-flop 390 is therefore triggered to a false state as represented by a relatively high voltage on the right output terminal of the flip-flop and by a relatively low voltage on the left output terminal of the flip-flop. When the flip-flop 390 is in its false state, the "and" networks 360, 362, 364, 366, 368 and 370 are conditioned for translation, whereas the "and" networks 372, 374, 376, 378, 380 and 382 are blocked.

Therefore, as the card from the station 94 is transported on the drum 10 past the transducer heads 303a, 303b and 303c, the flip-flops 320, 322 and 342 assume different operational states for each position on the card. Also, the "and" networks 332, 334, 336, 338, 340 and 342 translate signals corresponding to the operational states of the flip-flops 320, 322, 324 at the selected position on the card only, because these "and" networks are conditioned for translation only for the selected position. These signals are then translated through the conditioned "and" networks 360, 362, 364, 366, 368 and 370 to the flip-flops 392, 394 and 395; no signals being translated to the flip-flops 396, 398 and 400 because of the non-conductive condition of the "and" networks 372, 374, 376, 378, 380 and 382. Therefore, for the first card transported by the drum 10 past the transducer means 303, the flip-flops 392, 394 and 395 assume operational states corresponding to the binary data at the selected position on that card.

A short time later, the delay line 538 produces an output pulse which passes through the "or" network 450 to the left input terminal of the flip-flop 390. This latter pulse triggers the flip-flop 390 to its true state so that the "and" networks 372, 374, 376, 378, 380 and 382 are conditioned to translate signals from the succeeding card transported past the transducer means 303, the "and" networks 360, 362, 364, 366, 368 and 370 now being blocked.

Any pulses developed by the comparator 402 due to the triggering of the flip-flops 392, 394 and 395 by the first card are not translated into the system because the "and" networks 411 and 461 are rendered non-conductive. These "and" networks are non-conductive because the flip-flop 540 is triggered to its false state by the output pulse from the differentiator 512 as the switch 508 is actuated to start the system. However, the flip-flop 540 is subsequently returned to its true state after a time determined by the time delay of the line 542, and the "and" networks 411 and 461 are rendered conductive.

The first card from the station 94, after being processed by the transducer means 303, continues to be transported by the drum 10, and the card is so transported to the gate 56. The start pulse from the differentiator 512 is introduced through the delay line 528 and through the "or" network 416 to the left input terminal of the flip-flop 418. This triggers the flip-flop to a true state so that the triode 422 is rendered conductive and the solenoid valve 58 is opened to activate the gate 56. The delay of the delay line is made such that the activation of the gate occurs as the card is transported by the drum in the vicinity of the gate. The gate 56, therefore, transfers the card from the drum 10 onto the drum 14.

The card is now transported with the drum 14 to the gate 66. The output pulse from the differentiator 512 is passed through the delay line 530 and through the "or" network 472 to the left input terminal of the flip-flop 474. This pulse triggers the flip-flop 474 to its true state and renders the triode 478 conductive to open the solenoid valve 70 and activate the gate 66. The delay line 530 is made such that the activation of the gate 66 occurs as the card is brought by the drum 14 to the gate 66. The first card from the station 94 is, therefore, transferred to the drum 16. The delay line 420 causes the flip-flop 418 to be returned to its false state to deactivate the gate 56 after the card becomes transferred to the drum 14. In like manner, the delay line 476 causes the gate 66 to be de-activated after the card becomes transferred to the drum 16.

The condition now exists in which the first card from the station 94 has been processed by the transducer means 303 to set the register made up of the flip-flops 392, 394 and 395 to an operational state corresponding to the binary data at a selected position on that card. The card is now being circulated by the drum 16.

The start pulse from the differentiator 512 is passed through the delay line 532. This delay line imposes a delay on the pulse sufficient to permit the first card from the card holder 94 to be processed and passed to the drum 16. The output pulse from the delay line 532 then passes through the "or" network 436 to trigger the flip-flop 438 to its true state. This causes the triode 442 to become conductive which activates the solenoid valve 83 associated with the feed head 81 of the card holding station 80.

The delay line 440 assures that the solenoid valve 83 is activated to cut off the vacuum pressure to the head 81 just long enough to permit the first card only to be withdrawn from the station 80 to the periphery of the drum 20.

This first card from the station 80 is transported by the drum to the gate 40. The start pulse from the differentiator 512 now passes through the delay line 534 and through the "or" network 426 to trigger the flip-flop 428. This activates the gate 40 at the proper time to cause the card to be transferred from the drum 20 to the drum 10. After this has been achieved, the delay line 430 produces an output pulse which returns the flip-flop 428 to its false state to de-activate the gate 40.

The first card from the station 80 is now transported on the drum 10 past the transducing means 303. Now, and as noted above, the "and" networks 372, 374, 376, 378, 380 and 382, rather than the "and" networks 360, 362, 364, 366, 368 and 370, are conditioned for translation. Therefore, the register made up of the flip-flops 396, 398 and 400 assumes an operational state corresponding to the data on the card at the selected position.

The comparator 402 compares data from the register mentioned immediately above with the data stored in the register represented by the flip-flops 392, 394 and 395. Assuming that the stored number represented by the binary data on the first card from the station 80 is less than the number represented by the binary data on the first card from the station 94, and further assuming that the cards are to be merged in the output station 89 in an ascending order of the numbers represented by the binary data at the selected position on each card, the comparator 402 will produce an output pulse on the lead 404. This pulse passes through the "and" network 411 to the delay line 412, the "and" network having been prepared for activation by the relatively high voltage on the left output terminal of the flip-flop 540.

The first card from the station 80 now circulates on the drum 10 to the gate 56. The delay line 412 now translates the start pulse to the "or" network 416. The pulse passes through this "or" network to trigger the flip-flop 418 at the proper time and long enough to transfer the card to the drum 14. This card will now be carried by the drum 14 to the station 89. It will be remembered that this station has been conditioned to its stacking mode by the start pulse from the differentiator 512. The output pulse produced on the lead 408 by the processing of the first card from the station 80 passes through the "or" network 410, through the "and" network 411, and through the "or" network 436 to the left input terminal of the flip-flop 438. The "and" network 411, as it will be remembered, is now conditioned for translation because the delay line 542 has now produced an output pulse to trigger the flip-flop 540 to its true state.

In the previously described manner, the triggering of the flip-flop 438 releases a second card from the station 80 to the periphery of the drum 18. The output pulse on the lead 406 is also translated through the delay line 534 and through the "or" network 426 to trigger the flip-flop 428 and activate the gate 40 at the proper time to transfer this second card from the drum 18 to the drum 10. This second card from the station 80 is then processed by the transducer means 303.

The output pulse from the "and" network 411 is also translated through the delay network 446 and through the "or" network 450 to the left input terminal of the flip-flop 390. This does not trigger the flip-flop 390 because it already is in its true state, so that the "and" networks 372, 374, 376, 378, 380 and 382 remain conditioned for translation. Therefore, the data at the selected position of the second card from the station 80 is set up in the register of the flip-flops 396, 398 and 400.

As long as the binary numbers represented by successive ones of the cards from the station are less than the card from the station 94 which is being circulated on the drum 16, a pulse will continue to be developed on the lead 404 so that cards will continue to be drawn from the station 80 and fed in an ascending sequence in the output station 89. This will continue until a card is reached as the cards are successively drawn from the station 80 whose binary data exceeds the binary data on the first card from the station 94 which is being circulated by the drum 16. When this latter condition occurs, a pulse is developed on the output lead 408 from the comparator 402, instead of on the other output leads. This pulse passes through the "and" network 461 because that network is conditioned for translation due to the false state of the flip-flop 540. The pulse from the "and" network 461 is passed through the delay line 486 at the proper time to activate the gate 56 and transfer the last card from the drum 10 to the drum 16.

When the pulse due to the last card from the station 80 first appears on the lead 408, the pulse is translated by the "and" network 461 and by the "and" network 464. This latter "and" network is conditioned for translation because the flip-flop 390 is still in its true state. Immediately thereafter, the pulse from the "and" network appears at the output terminal of the delay line 462 and passes through the "or" network 466 to trigger the flip-flop 390 to its false state.

The pulse from the "and" network 464 passes through the "or" network 452 to the flip-flop 454 to trigger that flip-flop to its true state so as to open the solenoid valve 68 associated with the gate 64. The gate 64 is activated therefore, and such activation continues until the card circulated on the drum 16 has a chance to pass within its influence and to be transferred to the drum 14 so as to be deposited in the output station 89. Immediately after, the card from the station 80 whose data exceeded the data on the circulated card approaches the gate 66.

The output pulse from the "and" network 464 then passes through the "or" network 468 to the delay line 470, and the latter delay line produces an output pulse. This output pulse passes through the "or" network 472 to trigger the flip-flop 474 to its true state and to activate the gate 66 at the proper time to transfer the card from the station 80 to the drum 16. The condition now arises in which the card from the station 80 is circulated on the drum 16 in the place of the original card from the station 94.

The pulse on the lead 408 also passes through the "and" network 461 and through the "or" network 482 to trigger the flip-flop 490 to its true state so that a further card is fed from the station 94 to the drum 18. The pulse from the "and" network 461 is also introduced to the delay line 484 so that the gate 48 may be activated at the proper time to transfer that card to the drum 10. The card is then processed by the transducer means 303.

So long as the data on a card released from the station 94 is less than the data on the card from the station 80 being circulated on the drum 16, pulses continue to be produced on the output lead 408 from the comparator. Such pulses cause new cards to be released one after the other from the station 94 and to be transferred to the drum 10 for processing by the transducer means 303. The pulses also pass through the delay line 486 to activate the gate 56 at the proper time to transfer the cards to the drum 14 so that they may be deposited in the station 89. Therefore, cards are continually deposited in the output station 89 in an ascending order of numbers from card to card as represented by the binary data at a selected position on each card.

It will be remembered that the cards stacked in the stations 80 and 94 are stacked in an ascending order with respect to the binary data at the selected position. Now, when the number represented by the data on the cards fed from the station 94 to the output station 89 equals or exceeds the number represented on the card circulated on the drum 16, an output pulse appears on the lead 404 or on the lead 406 from the comparator 402. This output pulse is translated by the "or" network 410 and through the "and" network 411. Because the flip-flop 390 is in its true state for this first pulse, the "and" network 448 is conditioned for translation. Immediately thereafter, however, the delay line 446 translates this output pulse to the "or" network 450, and the "or" network passes the pulse to the left input terminal of the flip-flop 390. The pulse then triggers the flip-flop 390 to its true state so that the "and" networks 372, 374, 376, 378, 380 and 382 are conditioned for translation, and the "and" networks 360, 362, 364, 366, 368 and 370 are blocked. This also blocks the "and" network 448.

The pulse originally passed by the "and" network 448 is introduced through the "or" network 452 to activate the gate 64 so the card from the station 80 now being circulated on the drum 16 is transferred to the drum 14 to be deposited in the station 89. A short time after, and after the pulse from the "and" network 448 has passed through the "or" network 468, it is introduced by the delay line 470 through the "or" network 472 to the left input terminal of the flip-flop 474 to activate the gate 66. The timing is such that the gate 66 is activated just as the last card from the station 94 processed by the transducer means 303 approaches that gate. This last card is then transferred to the drum 16 and it is now circulated on that drum.

As indicated above, the apparatus of FIGURE 1 can also be used to sort a stack of cards with respect to the numbers represented by the binary data at a selected position or set of positions on each card. This sorting is achieved in a manner somewhat similar to the merging by the control system of FIGURES 5a and 5b. For the sorting operation, the cards to be sorted are divided into two stacks, and one stack is placed in the station 80 and the other in the station 94. As before, the cards from the two stations 80 and 94 are merged into the station 89, and into the station 85. Merging into the stations 89 and 85 in alternation is continued until the stations 80 and 94 are exhausted. Then the operation is reversed, and the cards from the stations 89 and 85 are merged back to the stations 80 and 94 in alternation. This is continued until the stations 85 and 89 are exhausted. These operations are continued back and forth until all the cards become merged in a single station and in a sorted condition.

Figure 7A:
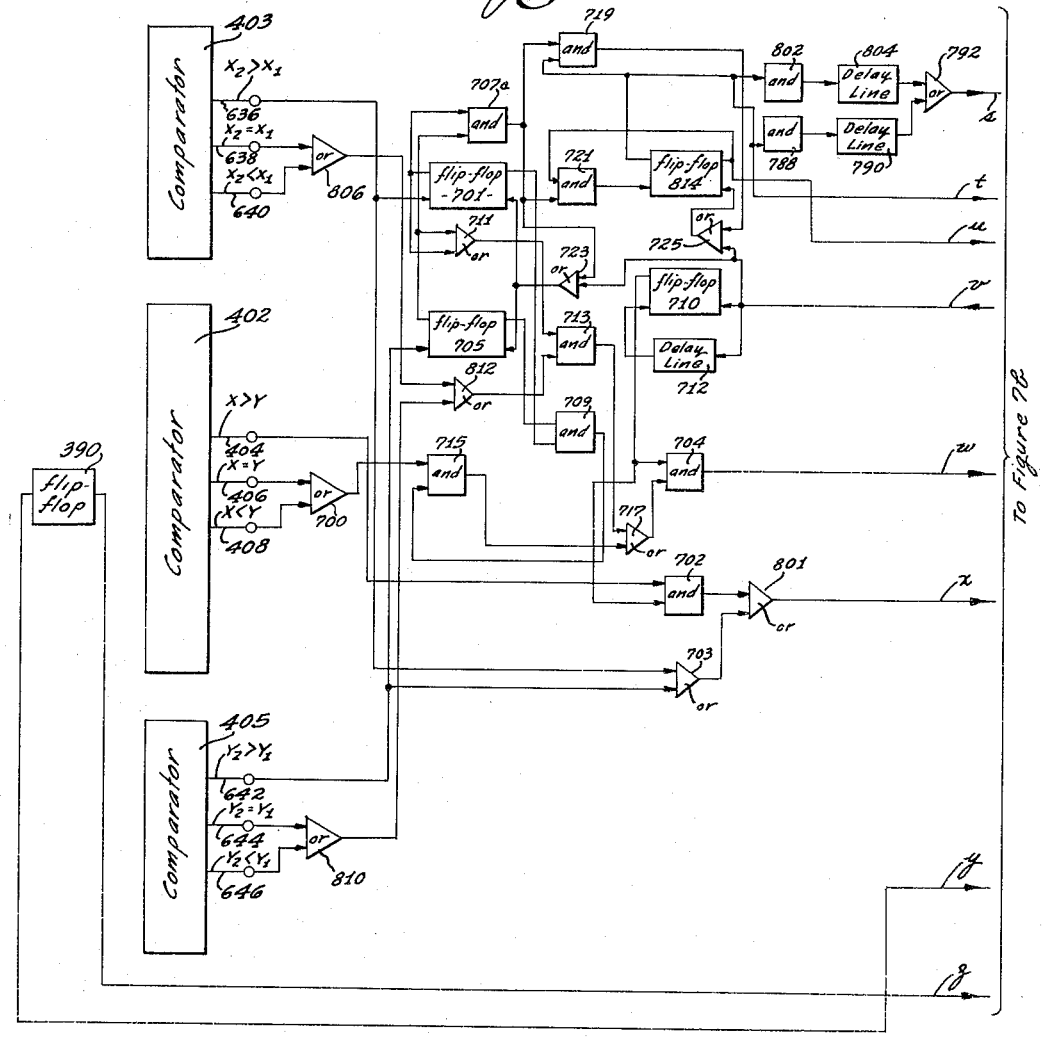

The sorting sequences described above can be carried out by the use of the control system of FIGURES 6a and 6b, and by the use of the control system of FIGURES 7a and 7b.

The control system shown in FIGURES 6a and 6b has many components which are similar to those of FIGURES 5a and 5b. In the several figures, like components have been designated by the same numbers. In the control system of FIGURE 6a, the "and" networks 332, 334, 336, 338, 340 and 342 are connected to the units shown to the left of these networks in FIGURE 5a. That is, the "and" networks 332, 334, 336, 338, 340 and 342 are conditioned to pass the binary data represented by the flip-flops 320, 322 and 324 of FIGURE 5a at the selected position on each card being processed.

As in the preceding system, the "and" networks 360, 362, 364, 366, 368 and 370 are connected to the flip-flops 392, 394 and 395, and the flip-flops in turn are connected to the comparator network 402. Also, these "and" networks are connected to the "and" networks 372, 374, 376, 378, 380 and 382 respectively, and the latter networks are connected to the flip-flops 396, 398 and 400. Also as in the preceding embodiment, the flip-flops 396, 398 and 400 are connected to the comparator 402. Unlike the preceding embodiment, however, a plurality of "or" networks 600, 602, 604, 606, 608, 610, 612, 614, 616, 618, 620 and 622 are interposed in the respective connections to the comparator 402.

The control system of FIGURE 6a also incorporates a plurality of "and" networks 361, 363, 365, 367, 369 and 371. The "and" networks 332, 334, 336, 338, 340 and 342 are respectively connected to the "and" networks 361, 363, 365, 367, 369, 371. The right output terminal of a flip-flop 624 is also connected to each of these latter flip-flops, as is the right output terminal of the flip-flop 390. The left output terminal of the flip-flop 624 is connected to each of the "and" networks 360, 362, 364, 366, 368 and 370.

The left output terminal of the flip-flop 624 is connected to an "and" network 626, and the right output terminal of the flip-flop 624 is connected to an "and" network 628. The output terminal of the "and" network 626 is connected to the right input terminal of the flip-flop 624, and the output terminal of the "and" network 628 is connected to the left input terminal of the flip-flop 624. The "or" network 466 which is connected to the right input terminal of the flip-flop 390, is also connected to another input terminal of the "and" network 626 and to another input terminal of the "and" network 628.

The control system of FIGURE 6a also includes a plurality of "and" networks 373, 375, 377, 379, 381 and 383 to which the "and" networks 332, 334, 336, 338, 340 and 342 are respectively connected. The left output terminal of the flip-flop 390 is additionally connected to each of the flip-flops 373, 375, 377, 379, 381 and 383. The right output terminal of a flip-flop 630 is connected to each of the "and" networks 373, 375, 377, 379, 381 and 383. The left output terminal of the flip-flop 630 is connected to each of the "and" networks 372, 374, 376, 378, 380 and 382. Input terminals of the "and" networks 372, 374, 376, 378, 380 and 382 are also connected to the left output terminal of the flip-flop 390.

The left output terminal of the flip-flop 630 is connected to an "and" network 632, and the right output terminal of this flip-flop is connected to an "and" network 634. The "and" network 632 is connected to the right input terminal of the flip-flop 630, and the "and" network 634 is connected to the left input terminal of that flip-flop. The "or" network 450, which is connected to the left input terminal of the flip-flop 390, is also connected to the "and" network 632 and to the "and" network 634.

The "and" networks 361 and 363 are connected respectively to the left and right input terminals of a flip-flop 389. The "and" networks 365 and 367 are connected respectively to the left and right input terminals of a flip-flop 391. Also, the "and" networks 369 and 371 are connected respectively to the left and right input terminals of a flip-flop 393.

The left and right output terminals of each of the flip-flops 389, 391 and 393 are all connected to a comparator 403. The comparator 403 may be constructed in a manner similar to the construction of the comparator 402. Each of these flip-flops are also connected to respective ones of the "or" networks 600, 602, 604, 606, 608 and 610. The flip-flops 392, 394 and 395 further have their respective output terminals connected to individual input terminals of the comparator 403.

The "and" networks 373 and 375 are connected respectively to the left and right input terminals of a flip-flop 397. The "and" networks 377 and 379 are connected respectively to the left and right input terminals of a flip-flop 399. Likewise, the "and" network 381 is connected to the left input terminal of a flip-flop 401, and the "and" network 383 is connected to the right input terminal of the flip-flop 401.

The output terminals of the flip-flops 397, 399 and 401 are connected to respective input terminals of a comparator 405. The comparator 405 may be similarly constructed to the comparators 402 and 403. The output terminals of the flip-flops 397, 399 and 401 are further connected to respective ones of the "or" networks 612, 614, 616, 618, 620 and 622. The output terminals of the flip-flops 396, 398 and 400 are also connected to respective input terminals of the comparator 405.

In a manner to be described, the comparator 403 compares the binary data at the selected position of successive cards from the card holding station 94. When the cards happen to fall in the stack in this station in such a manner that the binary data on a subsequent card is higher than that on a preceding card, a comparator 403 develops an output pulse on its output lead 636. When the binary data on the subsequent card happens to be equal to that on a preceding card, the comparator 403 develops an output pulse on the lead 638. However, when the binary data on a subsequent card happens to be less than that on a preceding card the comparator 403 then develops an output pulse on the lead 640.

In like manner, and as will also be described, the comparator 405 compares the binary data on successive cards from the station 80 and develops an output pulse on its leads 642 when the data on a subsequent card is greater than that on an immediately preceding card. Likewise, the comparator 405 develops an output pulse on its lead 644 when the data on the subsequent card is equal to that on the preceding card and it develops an output pulse on the lead 646 when the data on a subsequent card happens to fall below the data on an immediate preceding card.

The lead 640 from the comparator 403 is connected to the left input terminal of a flip-flop 647 and to an "or" network 649. The left output terminal of the flip-flop 647 is connected to an "and" network 651. The "and" network 651 is connected to an "and" network 671 which, in turn, is connected to the left input terminal of a flip-flop 650. The right output terminal of the flip-flop 650 is connected back to a second input terminal of the "and" network 671. The "and" network 651 is also connected to an "or" network 667, the "or" network being connected to the right input terminal of the flip-flop 647 and to the right input terminal of a flip-flop 653. The right output terminal of the flip-flop 647 and of the flip-flop 653 are connected to different input terminals of an "and" network 655. The differentiator 512 is connected to a second input terminal of the "or" network 667.

The "and" network 651 is also connected to an "and" network 669. The "and" network 669 is connected to an "or" network 656, as is the differentiator 512.

The leads 636 and 638 from the comparator 403 are connected to an "or" network 652, and the leads 642 and 644 from the comparator 405 are connected to an "or" network 654. The "or" networks 652 and 654 are connected to respective input terminals of an "or" network 648. The output terminal of the "or" network 656 is connected to the right input terminal of the flip-flop 650.

The lead 646 from the comparator 405 is connected to the "or" network 649, and this lead is also connected to the left input terminal of the flip-flop 653. The left output terminal of the flip-flop 653 is connected to the "and" network 651 and to an "or" network 657, as is the left output terminal of the flip-flop 647. The "or" networks 648 and 655 are connected to an "and" network 659 which, in turn, is connected to an "or" network 661. The "and" network 655 is connected to an "and" network 663 which is interposed between the "or" networks 410 and 661. The "or" network 661 is connected to the "and" network 411. The "or" network 649 is connected to an "or" network 665 which is interposed between the "and" network 461 and the delay line 462.

The left output terminal of the flip-flop 650 is connected to an "and" network 658 and to an "and" network 660. The "and" network 658 is connected to a delay line 662, and the "and" network 660 is connected to a delay line 664. The delay lines 662 and 664 are connected to respective input terminals of an "or" network 666. The "or" network 666 is connected to the left input terminal of a flip-flop 668 and to the input terminal of a delay line 670. The output terminal of the delay line is connected to the right input terminal of the flip-flop 668.

The left output terminal of the flip-flop 668 is connected to the control grid of a triode 672. The cathode of the triode is grounded, and a resistor 674 is connected to the control grid and to the negative terminal of the source 426. The anode of the triode 672 is connected to one terminal of the energizing winding of the solenoid valve 38 associated with the gate 36. The other terminal of this winding is connected to the positive terminal of the source of direct voltage 426.

A further solenoid coil 676 is also connected in the anode circuit of the triode 514. This latter coil controls the card holding station 85. The control is such that when the triode 514 is pulsed by the closure of the start switch 508, the station 85 is conditioned to a stacking mode. Therefore, in the system of FIGURES 6a and 6b, both the stations 85 and 89 are conditioned to a stacking mode, and both the stations 80 and 94 are conditioned to a feeding mode, when the system is first placed in operation.

In the control system of FIGURES 6a and 6b, an "and" network 678 is interposed between the "and" network 461 and the delay line 486. Likewise, an "and" network 680 is interposed between the "and" network 411 and the delay line 412, and an "and" network 682 is interposed between the "or" network 468 and the delay line 470. Furthermore, an "and" network 684 is interposed between the "or" network 452 and the left input terminal of the flip-flop 454. The right output terminal of the flip-flop 650 is connected to the "and" networks 678, 680, 682 and 684.

The left output terminal of the flip-flop 650 is further connected to an "and" network 686, as is the output terminal of the "or" network 468. The output terminal of the "and" network 686 is connected to a pair of delay lines 688 and 690. The delay line 688 is connected to one of the input terminals of the "or" network 416, and the delay line 690 is connected to an input terminal of the "or" network 472.

The left output terminal of the flip-flop 650 is also connected to an input terminal of an "and" network 692, as is the output terminal of the "or" network 452. The "and" network 692 is connected to the left input terminal of a flip-flop 694 and to the input terminal of a delay line 696. The output terminal of the delay line 696 is connected to the right input terminal of the flip-flop 694. The left output terminal of the flip-flop 694 is connected to the control grid of a triode 698. This control grid is connected to one terminal of a resistor 700, the other terminal of the resistor being connected to the negative terminal of the source 426. The cathode of the triode 698 is grounded, and its anode is connected to one terminal of the energizing winding of the solenoid valve 78 associated with the gate 74. The other terminal of this winding is connected to the positive terminal of the source 426.

As mentioned briefly above, the control system of FIGURES 6a and 6b controls the apparatus of FIGURE 1 so that a stack of randomly arranged cards which is divided into a pair of stacks placed into the stations 80 and 94 may be merged into the stations 89 and 85.

The merging is first into the station 89. First a card from the station 94 is selected and this card is compared with a card from the station 80. Whichever card happens to have the lower number at the selected position is deposited in the station 89. Then, and as long as the successive cards from each of the individual stations 94 and 80 happen to have binary data at the selected position representing ascending numbers, the merged cards continue to be fed in an ascending order into the station 89. However, as soon as a subsequent card in either of the stations 94 or 80 has a number at its selected position which is less than that of the immediately preceding card from that station, the cards are successively fed from the other station and stacked in the station 89 until a similar situation is obtained in the second station. That is, until a subsequent card in the other station has a number at the selected position which is less than the immediately preceding card from that station. When this occurs, an automatic switch-over occurs and the cards are then merged in ascending order in the station 85 rather than in the station 89.

The merging into the station 85 then continues until a card in each of the stations 80 or 94 represents a lower number at the selected position than its immediate preceding card in its station. Then, the merging operation is switched back to the station 89.

The net result is that any cards that happen to fall in an ascending order in each of the stacks 94 or 80 are merged into a larger group of ascending cards in the stacks 89 and 85. The operation is continued until both the stations 80 and 94 are exhausted. It will be appreciated, that the two stacks of cards merged into the stations 85 and 89 at this time will be in a more nearly sorted condition than the cards originally in the stations 80 and 94.

Then, and as will be described in conjunction with FIGURES 7a and 7b, the cards are merged from the stations 89 and 85 back into the stations 94 and 80, but this time in a descending sequence. Again, a more nearly complete sorting is achieved. These operations are continued until all the cards fall into a merged sequence in a single station, at which time the cards will be completely sorted as to the numbers represented by the binary data at the selected position on the cards. These operations can then be carried out for other positions on the cards until a complete desired sorted condition is obtained.

In the control system of FIGURES 6a and 6b, and like the control system of FIGURES 5a and 5b, the system is placed in operation by closing the start switch 508. Upon the closure of the switch 508, a signal is produced by the differentiator 512 and is introduced to the tube 514 to make the tube conductive. The conductivity of the tube 514 causes a current pulse to flow through the solenoid windings 520, 522, 578 and 676. This, as mentioned above, places the stations 94 and 80 in a feeding condition and places the stations 85 and 89 in a stacking condition. The start pulse from the differentiator 512 also passes through the "or" network 656 to trigger the flip-flop 650 false, and through the "or" network 667 to trigger the flip-flops 647 and 653 false. The false states of operation of the flip-flops 650, 647 and 653 are represented by relatively high voltages on the right output terminals of the flip-flops and by relatively low voltage on the left output terminals of the flip-flops.

As previously, a card is first released from the station 94 by the activation of the flip-flop 490 and of the triode 494. After being released from the station 94, the card becomes transferred from the drum 18 to the drum 10 as a result of the activation of the gate 48. This card is transferred to the drum 10 by the subsequent activation of the triode 504 after a time delay determined by the delay line 524. The card is then carried by the drum 10 past the transducer heads 303a, 303b, 303c and 303d, which read the information at the successive positions on the card. The "and" networks 360, 362, 364, 366, 368 and 370 then pass the information from the card at the selected position to the flip-flops 392, 394 and 395 so that these latter flip-flops assume operational states corresponding to the data on the first card at the selected position. These flip-flops are activated because the flip-flop 390 is triggered to its false state by a pulse through the delay line 536 and through the "or" network 466 when the start switch 508 is depressed. The flip-flop 390 in its false state conditions the "and" networks 360, 362, 364, 366, 368 and 370 for conduction as in the previous embodiment. Also, at the start of the operation, the flip-flop 624 is triggered to its true state so that the above-enumerated "and" networks, rather than the "and" networks 361, 363, 365, 367, 369 and 371 are conditioned for conduction. After such processing, the first card from the station 94 is carried to the gate 56, and this gate is activated through the delay line 526 to transfer the card to the drum 14. Then, the gate 66 is activated through the delay line 530 so that this first card is transferred to the drum 16 to be circulated on that drum.

Now, the first card from the station 80 is released by the output pulse from the delay line 532 which activates the solenoid valve 83 in the described manner. As will be apparent, the line 532 is provided with a longer delay than the line 538 so that the flip-flops 392, 394 and 395 can be set to the proper pattern of operation in accordance with the information on the first card from the station 94 before the first card becomes released from the station 80. This first card from the station 80 then circulates on the drum 20 to the gate 40. This gate is activated at the proper time through the delay line 534 to transfer that card to the drum 10.

The card from the station 80 is now carried to the transducer heads 303a, 303b, 303c and 303d. Just prior to this, however, the delay line 538 produces an output pulse which passes through the "or" network 450 and triggers the flip-flop 390 to its true state to render the "and" networks 372, 374, 376, 378, 380 and 382 conductive, rather than the "and" networks 360, 362, 364, 366, 368 and 370. This output pulse from the delay line 538 also triggers the flip-flop 630 to a true condition to render the "and" networks 372, 374, 376, 378, 380 and 382 conductive, rather than the "and" networks 373, 375, 377, 379, 381 and 383.

Therefore, the data at the selected position on the card from the station 80 which is processed by the transducer heads is registered on the flip-flops 396, 398 and 400. As before, the comparator 402 compares the data represented by the flip-flops 392, 394 and 395 with the data represented by the flip-flops 396, 398 and 400.

Assuming that the data on the card from the station 94 was greater than that on the card from the station 80, a pulse is developed on the output lead 404. This pulse, as before, is translated through the "or" network 410 and through the "and" network 663, the "or" network 661, and the "and" network 411. The "and" network 663 conducts because both the flip-flops 647 and 653 are now false, rendering the "and" network 655 conductive. Because the flip-flop 650 is triggered to its false state by the start pulse from the differentiator 512, the "and" network 680 is conditioned for translation. This causes the pulse from the "and" network 411 to activate the gate 56 after an appropriate delay in the delay line 412. The gate 56 in turn operates to obtain a transfer of the card from the drum 10 to the drum 14 and permit the card to be carried to the output station 89 and deposited in that station. Also, the pulse from the "and" network 411 is translated through the "or" network 436 to the left input terminal of the flip-flop 438 to release a second card from the station 80. After a suitable delay by the delay line 414, the same pulse triggers the flip-flop 428 to activate the gate 40 so that this second card may be transferred to the drum 10 for processing by the transducer means 303.

After a delay imparted by the delay line 446, the pulse from the "and" network 411 is introduced through the "or" network 450 to the left input terminal of the flip-flop 390. It has no effect on that flip-flop because it is already in its true state. However, it is also introduced to the flip-flop 630, and is translated by the "and" network 634 to trigger the latter flip-flop to its true state. This causes the "and" networks 373, 375, 377, 379, 381 and 383 to be conductive, rather than the "and" networks 372, 374, 376, 378, 380 and 382. Therefore, the data at the selected position on the second card from the input station 80 is registered on the flip-flops 397, 399, 401, and the data on the preceding card from this station continues to be registered on the flip-flops 396, 398 and 400.

The comparator 405 compares the data on the second card with the data on the first card from the station 80. If the data on the second card is greater than that on the first card, or if the data on the second card is equal to the data on the first card, a pulse appears on the lead 642 or on the lead 644. The "or" network 654 passes the pulse from these leads and introduces it to the "and" network 659 through the "or" network 648. The pulse is not translated by the "and" network 659 because both the flip-flops 651 and 653 are triggered false by the start pulse through the "or" network 667 from the differentiator 512.

The sysem, therefore, continues to operate as previously with cards being merged into the output station 89.

In like manner, the comparator 403 compares each subsequent card from the card holding station 94 with the preceding card. So long as the data on the subsequent card from the station 94 is greater or equal to that on the preceding card from that station, the "or" network 652 introduces pulses through the "or" network 648 to the "and" network 659. These latter pulses, likewise, are not passed by the "and" network 659 because of the states of the flip-flops 647 and 653. These pulses, therefore, have no effect on the system.

Therefore, as long as the binary data at the selected position of the cards fed from the stations 80 and 94 are in an ascending progression, there is no change in the system, and cards are merged into the output station 89. As described, a card from the input station 94 is first placed on the circulating drum 16, and cards are fed from the station 80 and compared with the circulating card. As long as the binary data at the selected position of these cards fed from the station 80 is less than the binary data at the selected position on the circulating card, the cards from the station 80 are stacked in an ascending progression in the output station 89.

Now, should a card from the station 80 be greater than the circulated card from the station 94, a pulse appears on the lead 408 from the comparator 402. This pulse is translated through the "and" networks 461 and 464, and through the "or" network 468 and the "and" network 686. After an appropriate delay on the delay line 688, the gate 56 is activated to transfer the card from the drum 10 to the drum 14. Then, after the proper delay in the delay line 690, the flip-flop 474 is triggered to activate the gate 66 and transfer the card to the drum 16. The pulse on the lead 408 is also previously translated through the "or" network 452, and through the "and" network 684, to activate the gate 64 and remove the previously circulated card from the drum 16. This causes the previously circulated card to be transferred to the drum 14 and deposited in the station 89. The pulse on the lead 408 also triggers the flip-flop 490 to release a new card from the station 94. Subsequent cards from the station 94 are now compared with the card from the station 80 now being circulated on the drum 16. As long as these subsequent cards have data at the selected position which is less than the corresponding data on the circulating card, they are stacked in the station 89.

The procedure described in the preceding paragraphs continues, so long as the comparators 403 and 405 respectively associated with the individual input stations 80 and 94 indicate an ascending progression in the cards fed from those stations, insofar as the binary data at the selected position is concerned. However, should a subsequent card in either of the stations 80 or 94 have data which is less than the preceding card from the same station, a pulse will appear on the output lead 646 from the comparator 405 or on the output lead 640 from the comparator 403. The first pulse to appear on either of these leads 640 or 646 is translated through the "or" networks 649 and 665 to the "and" network 464. The "and" network 464 passes the pulse, and this causes the card being processed to replace the previously circulating card on the drum 16 in the manner described above, the previously circulating card being deposited in the station 89 and a card from the alternate input stations 80, 94 being released.

The first pulse appearing on the lead 640 or 646 also triggers one of the flip-flops 647, 653 to a true state. This causes the "and" network 695 to become non-conductive, and the "and" network 663 is no longer able to translate pulses from the leads 404 and 406 of the comparator 402. Instead, the "and" network 659 becomes conductive, and subsequent pulses from the "or" networks 652 or 654 of the comparator 403 or 405 other than the one which produced the first pulse are passed to the "and" network 411. These latter pulses are passed by the "and" network 411 and through the "and" network 660. After a proper delay by the delay line 664, each of these pulses triggers the flip-flop 418 to activate the gate 56 so that each of the corresponding cards producing these pulses is transferred to the drum 14 and deposited in the station 89. This action permits all the cards in the same station as the previously circulating card and which have an ascending progression of the binary data at the selected position to be deposited in sequence in the output station 89 after the previously circulating card has been deposited.

The action described in the preceding paragraph continues as long as each card now being released from the input stations 80 or 94 exhibits an ascending progression of its binary data at the selected position. However, when a card is reached which has data at the selected position representing a binary number less than the number represented by the preceding card from that station, a pulse appears on the other one of the leads 640, 646. This latter pulse triggers the other of the flip-flops 651, 653 to a true state, and the "and" network 651 becomes conductive. Because the flip-flop 650 is in a false state, the "and" network 671 is conditioned for conduction, so that the flip-flop 650 is now triggered to a true state.

When the flip-flop 650 is triggered to a true state, the "and" networks 658, 660, 686 and 692 are conditioned for conduction, and the previously conditioned "and" networks 678, 680, 682 and 684 are cut off. The flip-flops 647 and 653 are returned to their false state when the "and" network 651 passes a pulse, this pulse being introduced to the right input terminals of the flip-flops 647 and 653 through the "or" network 667.

The operation of the system now proceeds as it did originally, except that now the cards are deposited in ascending order in the station 85, rather than in the station 89. For example, should the processed card from the station 80 or 94 now happend to represent a binary number less than the card being circulated on the drum 16, the resulting pulse on the output lead 404 from the comparator 402 is passed through the "or" network 410 and through the "and" networks 411 and 660. After the proper delay by the delay line 664, this pulse triggers the flip-flop 668 to activate the gate 36 so that such card is transferred to the drum 12 and deposited in the output station 85.

Likewise, should the card from the stations 80 or 94 happen to have a binary number at its selected position which is greater than the number at the selected position of the card circulated on the drum 16, the resulting output pulse on the leads 408 is translated through the "and" networks 461 and 464, as before; and now through the "or" network 468 and through the "and" network 686. After an appropriate delay in the delay line 688, the gate 56 is activated to transfer the card from the drum 10 to the drum 14. Then, after the proper delay by the delay line 690, the flip-flop 474 is triggered to activate the gate 66 and transfer the card from the drum 14 to the drum 16. The control is such that the pulse is previously translated through the "or" network 452, and through the "and" network 692, to activate the gate 74 and remove the preceding card from the drum 16. This causes the preceding card to be transferred to the drum 12 and deposited in the station 85.

Because the flip-flop 650 is now in a true state, the "and" network 669 rather than the "and" network 671 is conditioned for conduction. Therefore, the next time that the flip-flops 647 and 653 are both triggered to a true state, the flip-flop 650 is triggered false, rather than true. This causes the system to revert to its original condition, with the cards being stacked in an ascending order in the output station 89.

When either of the stations 80 or 94 becomes empty, an appropriate switch is closed in the emptied station. This switch may comprise a switch armature on the pusher member in the station, as mentioned above, the armature making contact across a pair of fixed contacts on the corresponding feed head in the emptied station.

The closure of the switch in the first emptied station may cause a simple control circuit to insert a fixed number in the comparator 402, by known means, which number is greater than the largest number on any of the cards being processed as represented by the binary data at any position on these cards. This will cause each succeeding card from the other station to cause a pulse to be produced on the lead 404 so that cards will continue to be fed out of the other station until it too is empty.

When both of the stations 80 and 94 are empty, indicating that all of the cards originally stacked in each of the stations have been merged in groups of ascending order into either the station 89 or into the station 85 in the manner described above, the switches will close at each of the stations 80 and 94.

When both of the stations 80 and 94 are empty, such closures of the switch contacts in both of these stations may be made to produce a pair of simultaneous signals. These switch contacts are shown somewhat schematically in FIGURE 10 and are designated as 1301 in FIGURE 10. Upon the simultaneous production of these signals, a signal passes through an "and" network 1300 in FIGURE 10 to trigger a flip-flop 1302 from one state of operation to another—for example, from a true state to a false state. The flip-flop 1302 may be connected to all of the "and" networks shown in FIGURE 6b so as to prepare all of these networks for passage of signals in the true state of the flip-flop. Similarly, the flip-flop 1302 may be connected to all of the "and" networks shown in FIGURES 7a and 7b so as to prepare all of these networks for the passage of signals in the false state of the flip-flop. The connections from the flip-flop 1302 to the different stages in FIGURE 6b and in FIGURES 7a and 7b are not shown for purposes of simplification but are believed to be apparent to a person skilled in the art. When the flip-flop 1302 becomes triggered to the false state, the stations 80 and 94 become converted to stacking stations and the stations 85 and 89 become connected to feeding stations, as described in copending application Serial No. 699,132 filed November 26, 1957, by Robert M. Hayes et al., and as will be described in some detail hereafter.

The activation of the circuits shown in FIGURES 7a and 7b causes the cards to be fed back from the stations 85 and 89 and merged into the stations 80 and 94 in somewhat the same manner as with the system of FIGURES 6a and 6b. The latter merging, however, will be with respect to the descending sequence of the data at the selected position on each card.

It will be appreciated that when this latter operation is completed, the cards will appear in the stations 80 and 94 in a still more nearly sorted condition, with the binary data on succeeding cards being arranged in groups of ascending order from one card to the next in each station. At the end of this cycle, both of the stations 85 and 89 become empty to produce signals for passage through an "and" network 1304. This causes the control flip-flop 1302 to become triggered back to the true state so that the "and" networks in FIGURE 6b again become prepared for activation. This causes a new cycle of operation to be initiated by converting the stations 85 and 89 to stacking stations and the stations 80 and 94 to feeding stations. This has been fully described in copending application Serial No. 699,132, filed November 26, 1957, by Robert M. Hayes et al.

In like manner, successive cycles of operation can be initiated as described above until a completely sorted condition is attained, which is indicated by the fact that all of the cards are merged into a single station. The stations, of course, have physical dimensions capable of handling the entire stack of merged and sorted cards. When this final merge occurs, three stations become empty at one time such that a signal passes through an "and" network such as one of the "and" networks 1306, 1308, 1310 and 1312 in FIGURE 10. The particular "and" networks activated for the passage of the signals is dependent upon which three stations become simultaneously empty. The signal passing through this "and" network then passes through an "or" network 1314 to a flip-flop 1316 which becomes triggered from one state of operation to the other to operate a suitable circuit breaker 1318 for stopping the operation and turning off the system.

In the control circuit of FIGURES 7a and 7b, the operation of the flip-flop 390 is controlled by stages corresponding to those shown in FIGURES 6a and 6b. These stages are not shown in FIGURES 7a and 7b for purposes of simplification. In addition, the output leads 406 and 408 of the comparator 402 are connected to an "or" network 700, and the output lead 404 of the comparator is connected to an "and" network 702. The "or" network 700 is connected to an input terminal of an "and" network 704.

A switch 706 and a switch 707 are connected in series between the source of direct voltage 426 and a differentiator 708. The switches 706 and 707 may be of the type referred to above which are actuated when respective ones of the stations 80 and 94 become empty. By connecting the switches 706 and 707 in series, the passage of a signal through the differentiator 708 is obtained only when both of the stations 80 and 94 are simultaneously empty.

The output terminal of the differentiator 708 is connected to the control grid of the triode 514, as described previously, so that an output pulse from the differentiator now passes through the windings 518, 520, 522 and 676 to condition the stations 80 and 94 to a stacking mode and to condition the stations 85 and 89 to a feeding mode.

The output terminal of the differentiator 708 is connected to the right input terminal of a flip-flop 710 and to the input terminal of a delay line 712. The output terminal of the delay line 712 is connected to the left input terminal of the flip-flop 710. The left output terminal of the flip-flop 710 is connected to each of the "and" networks 702 and 704.

The output terminal of the differentiator 708 is also connected to an "or" network 714. The output terminal of the "or" network 714 is connected to the left input terminal of a flip-flop 716 and to the input terminal of a delay line 718. The output terminal of the delay line is connected to the right input terminal of the flip-flop 716.

The left output terminal of the flip-flop 716 is connected to the control grid of a triode 720. A resistor 722 is connected between this control grid and the negative terminal of the source 426. The cathode of the triode is grounded, and the anode is connected to one terminal of the energizing winding of the solenoid valve 87 associated with the feed head 86 of the station 85. The other terminal of this winding is connected to the positive terminal of the source 426.

The differentiator 708 is also connected to the input terminal of a delay line 724. The output terminal of this delay line is connected to an "or" network 726, the output terminal of the "or" network being connected to the left input terminal of a flip-flop 728 and to the input terminal of a delay line 730. The output terminal of the delay line is connected to the right input terminal of the flip-flop 728.

The left output terminal of the flip-flop 728 is connected to the control grid of a triode 732. The cathode of the triode is grounded, and the control grid is connected to one terminal of a resistor 734. The other terminal of the resistor is connected to the negative terminal of the source 426, and the anode of the triode is connected to one terminal of the energizing winding of the solenoid valve 34 associated with the gate 32, the other terminal of this winding being connected to the positive terminal of the source 426.

The differentiator 708 is further connected to a delay line 736 and to a delay line 738. The output terminals of these delay lines are connected to separate input terminals of an "or" network 740. The output terminal of the "or" network 740 is connected to the left input terminal of a flip-flop 742 and to the input terminal of a delay line 744. The output terminal of the delay line 744 is connected to the right input terminal of the flip-flop 742.

The left output terminal of the flip-flop 742 is connected to the control grid of a triode 746, and a resistor 748 is connected between this control grid and the negative terminal of the source 426. The cathode of the triode 746 is connected to ground, and the anode of this triode is connected to one terminal of the energizing winding of the solenoid valve 46 associated with the gate 44. The other terminal of this energizing winding is connected to the positive terminal of the source 426.

The output terminal of the differentiator 708 is also connected to a delay line 750. The output terminal of the delay line is connected to an "or" network 752 which, in turn, is connected to a delay line 754 and to the left input terminal of a flip-flop 756. The output terminal of the delay line is connected to the right input terminal of the flip-flop 756.

The left output terminal of the flip-flop 756 is connected to the control grid of a triode 758. A resistor 760 has one terminal connected to the control grid and has its other terminal connected to the negative terminal of the source 426. The cathode of the triode 758 is grounded, and the anode of the triode is connected to the energizing winding of the solenoid valve 30 associated with the gate 26. This winding, like the others, being connected to the positive terminal of the source 426.

The output terminal of the differentiator 708 is also connected to a delay line 762. The delay line 762 is connected to an "or" network 764 which, in turn, is connected to the left input terminal of a flip-flop 768 and to the input terminal of a delay line 770. The output terminal of the delay line 770 is connected to the right input terminal of the flip-flop 768. The left output terminal of the flip-flop 768 is connected to the control grid of a triode 772. This control grid is connected to a resistor 774, and the resistor is connected to the negative terminal of the source 426. The cathode of the triode 772 is grounded, and its anode is connected to the energizing winding of the solenoid valve 91 associated with the feed head 90 of the station 89. This winding of the solenoid valve 91 is connected to the positive terminal of the source 426.

Finally, the differentiator 708 is connected to the input terminal of a delay line 776. This delay line has its output terminal connected to an "or" network 778, and the "or" network is connected to a delay line 780 and to the left input terminal of a flip-flop 782. The output terminal of the delay line is connected to the right input terminal of the flip-flop.

The left output terminal of the flip-flop 782 is connected to the control grid of a triode 784, and a resistor 786 is connected between this control grid and the negative terminal of the source 426. The cathode of the triode 784 is grounded, and its anode is connected to the energizing winding of the solenoid valve 62 associated with the gate transfer mechanism 60. The other side of this solenoid winding is connected to the positive terminal of the source 426.

The output terminal of the "and" network 704 is connected to an input terminal of an "and" network 788. This latter "and" network is connected to a delay line 790 which, in turn, is connected to an "or" network 792. The "or" network 792 is connected to the left input terminal of a flip-flop 794 and to the input terminal of a delay line 796. The output terminal of the delay line 796 is connected to the right input terminal of the flip-flop 794. The left output terminal of the flip-flop 794 is connected to the control grid of a triode 798. This control grid is connected to a resistor 800 which is connected to the negative terminal of the source 426. The cathode of the triode 798 is grounded, and its anode is connected to one side of the energizing winding of the solenoid valve 54 associated with the gate 50. The other side of this winding is connected to the positive terminal of the source 426.

The output terminal of the "and" network 702 is connected to an "or" network 801 wihch, in turn, connects with an "and" network 802. The latter "and" network is connected to a delay line 804 which, in turn, is connected to one input terminal of the "or" network 792.

The output leads 638 and 640 of the comparator 403 are connected to an "or" network 806, and the output leads 644 and 646 of the comparator 405 are connected to an "or" network 810. The "or" network 810 is connected to an "or" network 812, and the "or" network 806 is also connected to the "or" network 812.

The output terminal of the "and" network 704 is connected to an "and" network 816. This "and" network is connected to a delay line 818 which, in turn, is connected to an individual input terminal of the "or" network 740. The "and" network 704 is further connected to the "or" network 764 and to a delay line 768. The delay line 768 is connected to the "or" network 778.

The lead 636 of the comparator 403 is connected to the right input terminal of a flip-flop 701 and to an input terminal of an "or" network 703. The lead 642 from the comparator 405, on the other hand, is connected to the left input terminal of a flip-flop 705 and to a second input terminal of the "or" network 703. The output terminal of the "or" network 703 is connected to a second input terminal of the "or" network 801.

The left output terminal of the flip-flop 701 and the left output terminal of the flip-flop 705 are connected to respective input terminals of an "and" network 707a. The right output terminal of the flip-flop 701 and the right output terminal of the flip-flop 703, on the other hand, are connected to respective input terminals of an "and" network 709. The left output terminal of the flip-flop 701 is further connected to an "or" network 711, as is the left output terminal of the flip-flop 705. The "or" networks 711 and 812 are connected to respective input terminals of an "and" network 713. The "or" network 700 and the "and" network 709 are connected to respective input terminals of an "and" network 715. This "and" network, and the "and" network 713 are connected to an "or" network 717 which, in turn, connects with the "and" network 704.

The output terminal of the "and" network 707a is connected to an "and" network 709, to an "and" network 721, and to an "or" network 723. The left output terminal of the flip-flop 814 is connected to the "and" network 719, and the right output terminal of this flip-flop is connected to the "and" network 721. The "and" network 721 connects with the left input terminal of the flip-flop 814, and the "and" network 719 connects with an "or" network 725. The differentiator 708 connects with the "or" networks 723 and 725.

In addition, the "and" network 704 is connected to an input terminal of an "and" network 820. The "and" network 820 is connected to an "or" network 822 and to an "or" network 824. The "or" network 824 is connected to an "and" network 826, and a delay line 828 is connected between the output terminal of the latter "and" network and an input terminal of the "or" network 752.

The "or" network 822 is connected to an "and" network 830 and to an "and" network 832. The "and" network 830 is connected to the left input terminal of a flip-flip 834 and to the input terminal of a delay line 836. The output terminal of the delay line 836 is connected to the right input terminal of the flip-flop 834.

The left output terminal of the flip-flop 834 is connected to the control grid of a triode 838. A resistor 840 has one side connected to the control grid of the triode 838, and has its other side connected to the negative terminal of the source 426. The cathode of the triode 838 is grounded, and its anode is connected to one side of the energizing winding of the solenoid valve 28 associated with the gate transfer mechanism 24. The other side of this energizing winding is connected to the positive terminal of the source 426.

The "and" network 832, on the other hand, is connected to the left input terminal of a flip-flop 842. The "and" network 832 is also connected to a delay line 844 whose output terminal is connected to the right input terminal of the flip-flop 842. The left output terminal of the flip-flop 842 is connected to the control grid of a triode 846. A resistor 848 is connected to this control grid and to the negative terminal of the source 426. The cathode of the triode 846 is grounded, and its anode is connected to the activating coil of the solenoid valve 47 associated with the gate 45. The other side of this coil is connected to the positive terminal of the source 426.

The output terminal of the "and" network 702 is connected to an input terminal of an "or" network 801, the output terminal of which is connected to an input terminal of the "or" network 714 and to a delay line 850. This delay line is connected to an input terminal of the "or" network 726.

The output terminal of the "or" network 801 is also connected to an "and" network 852 and to an "and" network 854. The "and" network 854 is connected to a delay line 856 which, in turn, is connected to the "or" network 704. The "and" network 852 is connected to the "or" network 824 and to the "or" network 822. The left output terminal of the flip-flop 390 is connected to the "and" network 852, so that the "and" network 852 is conditioned for translation only when the flip-flop 390 is in its true state. Also, the right output terminal of the flip-flop 390 is connected to the "and" network 820, so that the "and" network 820 is conditioned for translation only when the flip-flop 390 is in a false state.

The left output terminal of the flip-flop 814 is connected to each of the "and" networks 788 and 802. This left output terminal is further connected to an "and" network 860 and to the "and" network 832. The "and" network 860 is connected to a delay line 862 and to a delay line 864. The delay line 862 is connected to the "or" network 740 and the delay line 864 is connected to the "or" network 752. The "or" network 824 is also connected to the "and" network 860.

The right output terminal of the flip-flop 814 is connected to the "and" network 854, to the "and" network 816, to the "and" network 826 and to the "and" network 820.

As noted above, the control system of FIGURES 7a and 7b is connected to the apparatus of FIGURE 1 after the control system of FIGURES 6a and 6b has emptied the cards from the stations 80 and 94, and stacked them in ascending groups in the stations 89 and 85. As also noted, this also results in the switches 706 and 707 closing to cause the differentiator 708 to develop an output pulse which pulses the triode 514. Pulsing of the triode 514, as pointed out, conditions the stations 80 and 94 to their stacking modes and conditions the stations 85 and 89 to the feeding modes. As pointed out above, the system of FIGURES 7a and 7b functions in a manner similar to the system of FIGURES 6a and 6b. The latter system, however, causes the cards from the stations 80 and 94 to be stacked in groups of descending order in the stations 85 and 89, rather than in groups of ascending order as was the case with the systems of FIGURES 6a and 6b.

The output pulse from the differentiator 708 also triggers the flip-flop 710 to a true state so that both the "and" networks 702 and 704 are blocked. This continues until the data on the first card has been set up in its register so that there is no effect on the system until the data on the second card has been set up in its register and the two are compared in the comparator 402. The flip-flop 710 is held in its false state for a length of time determined by the delay line 712. The delay line 712 then returns the flip-flop 710 to a true state so that both the "and" networks 702 and 704 are conditioned for translation.

The start pulse from the differentiator 708 is also introduced through the "or" network 812 to the flip-flop 814 to place that flip-flop initially in a false state. This provides that the "and" networks 854, 816, 826 and 820 are all conditioned for translation. Also, and as in the previous system of FIGURES 6a and 6b, the start pulse from the differentiator 708 conditions the flip-flop 390 to one mode so that the data on the first card may be stored in a first register. Subsequently, the start pulse triggers the flip-flop 390 to a second state so that the data on the second card may be stored in a second register and compared with the data on the first card in the comparator 402. When the flip-flop 390 is in a true state, the "and" network 852 is conditioned for translation, and when the flip-flop 390 is in a false state the "and" network 820 is conditioned for translation.

The start pulse from the differentiator 708 now triggers the flip-flop 716 to its true state so that the feed head 86 may be controlled to cause the station 85 to release its first card to the periphery of the drum 12. A short time thereafter, and when this first card reaches the gate 32, the start pulse is translated by the delay line 724 to trigger the flip-flop 728 to its true state so that the solenoid valve 34 may be activated. This causes the card to be transferred to the drum 10.

By a suitable switching operation, the transducer means 301, instead of the transducer means 303, is connected into the circuit. The transducer means 301 may comprise a like number of individual electromagnetic transducer heads, and these heads develop individual control signals in exactly the same manner as the heads 303a, 303b, 303c and 303d. Therefore, in exactly the same manner as that previously described, the control signals developed by the transducer means 301 are translated into the control system.

After processing by the transducer means 301, the card is carried to the gate 44. At this time, the delay line 738 passes the start pulse to the left input terminal of the flip-flop 742 so that the gate 44 is activated to transfer the card from the drum 10 to the drum 20. The card is now circulated on the drum 20 to the gate 26. At this time, the start pulse is translated by the delay line 750 to trigger the flip-flop 756 to its true state. This activates the gate 26 long enough to transfer the card from the drum 20 to the drum 22.

The first card from the station 85, therefore, circulates on the drum 22. Now, the start pulse is translated by the delay line 762 to the left input terminal of the flip-flop 768 to activate the feed head 90 associated with the station 89 so that a card is released by the latter station to the drum 14. This card is carried by the drum until it reaches the gate 60. When this occurs, the delay line 776 passes a pulse to the left input terminal of the flip-flop 782 to activate the gate 60. The card from the station 89 is therefore transferred to the drum 10 and is carried by the drum past the transducer means 301 so that its information may be stored in its own register and compared with the information previously stored in its register by the card from the station 85.

The card from the station 89 after processing is carried to the gate 44. It will be remembered that the cards are to be stacked in the stations 80 and 94 in a descending order. Assume now that the binary data on the card from the station 89 is greater than that on the card from the station 85 and circulating on the drum 22. Then, the comparator 402 will develop a pulse on its output lead 408. This pulse will be translated by the "or" network 700 and by the "and" networks 715 and 704. The "and" network 715 is conductive because the flip-flops 701 and 705 are both triggered false by the start pulse, the "and" network 704 is conductive because the flip-flop 710 has also been returned to its true state by the translation of the start pulse by the delay line 712.

The pulse from the "and" network 704 is translated by the "and" network 816 because the "and" network 816, as noted above, is conditioned for translation by the flip-flop 814 in its true state. The translated pulse is delayed by the delay line 818 and introduced to the flip-flop 742 so that the gate 44 is activated at the proper time to transfer the card from the station 89 and which is now being carried on the drum 10 to the drum 20. That card is then deposited in the station 80 because the station is in its stacking condition. This is desired because the binary data on the card from the station 89 was assumed to be greater than the binary data on the card from the station 85 which is now being circulated on the drum 22.

The pulse from the delay line 704 is also passed by the "or" network 764 to the left input terminal of the flip-flop 768. This causes the feed head 90 to be actuated so that a second card is released from the station 89 to the periphery of the drum 14.

The pulse from the "and" network 704 is also passed through the delay line 768 and through the "or" network 778 to the flip-flop 782. This causes the gate 60 to be activated at the proper time to transfer the second card from the station 89 to the drum 10. That card may now be processed by the transducer means 301.

The pulse from the "and" network 704 is also introduced to the "and" network 820. However, that network is blocked because the flip-flop 390 is in its true state, under the controls explained in conjunction with the system of FIGURE 6a. In this manner, as long as the cards in the station 89 represent successive binary data which is greater than the binary data represented by the card on the drum 22, the cards from the station 89 will be deposited one after another and in descending order in the station.

However, when a card is reached in the station 89 whose data is less than the card from the station 85 which is being circulated on the drum 22, the comparator 402 will develop an output pulse on its lead 404. This latter pulse is translated by the "and" networks 702 and 854 and is passed by the delay line 856 through the "or" network 740 to the flip-flop 742 at the proper time to activate the gate 44 to transfer the card from the drum 10 to the drum 20.

Also, and because the "and" network 852 is still conductive, the pulse from the "and" network 702 is translated through the "or" network 824 and the "and" network 826 to the delay line 828. The subsequent output pulse from the delay line 828 is passed through the "or" network 752 to trigger the flip-flop 756. This causes the gate 26 to be activated at the proper time to transfer this card from the drum 20 the circulating drum 22. Prior to that, however, the pulse through the "and" network 852 is translated through the "and" network 830 to the flip-flop 834. This activates the gate 24 to transfer the original card from the circulating drum 22 to the drum 20 so that the original card may be deposited in the proper order in the station 80. Now, the card from the station 89 is being circulated on the drum 22 and the flip-flop 390 assumes its false operational state to condition the proper register, as before, to receive the data for the cards now to be fed from the station 85.

Therefore, and in the same manner as before, the cards are fed from the station 89 and from the station 85 into the station 80, except that the cards are now being stacked in descending order in the station 80.

As long as each succeeding card from either the station 85 or the station 89 exhibits binary data which is less than the data of its immediately preceding card from the same station, the flip-flop 814 remains in its false state, so that the "and" networks 816, 826, 830 and 854 are conditioned for conduction so that the system proceeds to stack the cards in the station 80. However, when a card is reached in one of the stations 85 or 89 whose binary data is greater than its immediately preceding card from the same station, the comparator 403 or the comparator 405 develops an output pulse on the output lead 636 or on the output lead 642. As in the system of FIGURES 6a and 6b, the first of such output pulses on one of these leads triggers the flip-flop 701, or the flip-flop 705, to a true state. Then, the first output pulse on the other of these leads triggers the other of these two flip-flops to a true state. When both the flip-flops are triggered to a true state, the "and" network 707a becomes conductive so that the flip-flop 814 is triggered true, and the cards are stacked into the station 94 rather than the station 80.

When the first of the flip-flops 701 and 705 is triggered true, the "and" network 709 is no longer conductive, and this cuts off the "and" network 715. Therefore, the comparator 402 is no longer effective in the system. Also, when either one of the flip-flops 701 or 705 is triggered true, the "and" network 713 is conditioned for conduction. This permits output pulses on either the leads 638 or 640 of the comparator 403 or the leads 644 or 646 of the comparator 405 to be passed by the "and" network 713 and the "and" network 704 to control the stacking of the cards.

Therefore, in a manner similar to the function of the system of FIGURES 6a and 6b, the control system of FIGURES 7a and 7b causes cards from the stations 85 and 89 to be stacked first in the station 80 in a descending order with respect to the binary data recorded at a selected position on the cards. Such stacking continues until a successive card from any one of the two stations 85 or 89 exhibits binary data which is less than its preceding card from the same station. As soon as this occurs, the card being circulated on the drum is deposited in the station 80 and is replaced by the lower card just compared. At the same time, a comparison is made between successive cards from the other station, and as long as these still occur in descending order, they continue to be stacked in the station 80. However, as soon as a card is reached which is less than the preceding card, this card completes the triggering of the flip-flops 701 and 705 to trigger the flip-flop 814 to its true state. The stacking now proceeds into the station 94, and again in a descending sequence. A similar happening of events, then causes the stacking of the cards to return to the station 80.

Therefore, the process continues with cards being fed from the stations 85 and 89 in descending groups in each of the stations 80 and 94 with respect to the binary data at the selected position. When this operation is completed, and when both of the stations 85 and 89 are emptied, the system may be automatically or manually reconditioned to the circuits of FIGURES 6a and 6b. This permits a return of the cards from the stations 80 and 94 into the stations 85 and 89, with the sorting becoming more complete for each of these cycles. This automatic return to the circuit of FIGURES 6a and 6b is accomplished by triggering the flip-flop 1302 in FIGURE 10 to a true state in a manner similar to that described above. In this state, the flip-flop 1302 prepares all of the "and" networks in FIGURE 6b by leads (not shown) to become opened upon a proper introduction of signals to the "and" networks. At the same time, a signal passes through a circuit including a pair of series switches corresponding to the switches 706 and 707 in FIGURE 7b to obtain a conversion of the stations 85 and 89 to the stacking mode and the stations 80 and 94 to the feeding mode.

Processing of the cards in successive passes continues until all of the cards appear in one of the stations 80, 85, 89 or 94 in an ascending or descending sorted condition with respect to the binary data at a selected position on each card. As such a time, three of the stations 80, 85, 89 and 94 become empty. This causes a signal to pass through one of the "and" networks 1306, 1308, 1310 and 1312 in FIGURE 10 to trigger the flip-flop 1316 to a false state. Upon such a triggering, a relay 1318 becomes operative to open a master switch (not shown) controlling the operation of the circuitry shown in FIGURES 6a, 6b, 7a and 7b. Instead of this master switch, the left output terminal of the flip-flop 1316 may be connected to all of the "and" networks in FIGURES 6a, 6b, 7a and 7b to obtain an operation of these "and" networks only when the flip-flop 1316 is in a true state.

It should be pointed out that when the sorting at a selected position of the cards is completed, the system may be automatically adjusted so that the sorting may proceed to another position. For example, each position may represent a different decimal digit, and the sorting may continue from position to position until the cards are all sorted with respect to a multidigit decimal designation on the cards. In general, the position chosen on the cards for any set of operations is merely a group of binary bits chosen in accordance with any defined control field. The field may change from pass to pass or from card to card. Also, it may change in significance from one pass to another. The simple control field, as represented by a selected position on each card, has been selected for purposes of simplifying the description of the invention.

The control system of FIGURE 1 can also be conditioned to perform a binary sorting operation on the cards in a manner similar to that described in copending application Serial No. 669,132 filed November 26, 1957 in the name of Hayes et al. and entitled "Card Processing System."

The binary sorting operation to be described in conjunction with FIGURES 8a and 8b is carried out with respect to a particular series of bits in a control field, with different bits being sensed in each pass. As previously, this control field may change from card to card or from pass to pass, depending upon the sort required. For purposes of the present explanation, however, the control field will be chosen to correspond to a selected position on each card, and the binary sort will be controlled to proceed by sensing the least significant bit at that position, and proceeding from bit to bit in ascending order for each subsequent pass.

In the particular system to be described, the cards to be sorted are placed in a first input station, and these cards are fed in succession to a transport medium for processing with respect to the binary data at the selected position on each card. The least significant (or other predetermined) binary bit in the selected control field is read in a first pass, and the binary zeros are deposited in a first receiving station and the ones are deposited in a second receiving station.

For the next pass, the cards previously placed in the first receiving station are fed in succession to the transport medium and the next least significant (or other predetermined) bit in the selected control field of each of these cards is examined. The cards are then stacked in a third receiving station when a binary one is read, or in a fourth receiving station when a binary zero is read. When all the cards from the first receiving station have been processed, the cards from the second receiving station are then fed in succession to the transport medium and are similarly dealt with.

Now, the cards appear in the third and fourth receiving stations. The cards in the third receiving station which represented the zeros at the second bit level are first returned to the transport medium in succession, and the third preselected bits in the selected control field are examined. As before, the zeros are returned to the first receiving station and the ones to the second receiving station. When the third station has been emptied, the cards from the fourth station are returned to the transport medium so that they too may be processed with respect to their preselected third bits and likewise deposited in the first or second receiving stations.

The operations described above are continued from bit level to bit level, with the cards being fed back and forth between the four stations until a complete sort of the binary numbers in the selected control field is realized. Then the operations may be carried on into other control fields until a complete sort has been realized.

The processing of the cards is accomplished by feeding the cards in succession from the station 85 to the auxiliary drum 12. In the first pass or cycle of operations, and as determined by the first binary bit in the selected control field on each card, the cards are selected by either the gate 44 or the gate 50 to be subsequently stacked in either the station 80 or in the station 94. Then, for the next pass, the cards are fed first from the station 80 and then from the station 94 to be stacked in either of the stations 89 or 85, this latter stacking being carried out in accordance with the second binary bit on the cards in the selected control field. This feeding and stacking of the cards is continued from one pair of stations to the next until each bit of binary information in the control field from the least significant to the most significant (or in any other ordinal sequence) on each card has been processed.

For the first pass, therefore, the cards in the station 85 are successively fed to the drum 12 and from there to the drum 10. The least significant bit of binary information in the top row is first read by the transducer means 301 and if this is "0" at the selected position, the corresponding card is transferred to the drum 20 to be deposited in the station 80. On the other hand, all the cards whose least significant binary bit in the top row at the selected position is "1" are transferred to the drum 18 and are deposited in the station 94.

When the first pass is completed, the second pass is automatically initiated. The cards from the station 94 are now returned to the drum 10 in sequence for processing by the transducer means 303. During the second pass, the next least significant bit of binary information in the second row of each card is read by the transducer means 303. The "0's" at the selected position are now transferred to the drum 14 to be deposited in the station 89, whereas the "1's" are transferred to the drum 12 to be deposited in the station 85.

After all of the cards have been fed from the station 94, the cards from the station 80 are fed in sequence to the drum 18 to be returned to the central drum 10. These cards from the station 80 are also deposited either in the station 89 or in the station 85 depending upon whether their binary bits at this next least significant level and at the selected position are zero or one.

These passes continue, with the cards being fed from one pair of reversible stations to another, and with the system being automatically controlled so that for each pass a different level of significance insofar as the binary bits are concerned, is read. The passes continue until all the levels of binary significance are processed. Then the cards are all returned to a single station and they appear in that station in a sorted condition insofar as the binary information at a particular selected position is concerned.

As noted above, the control system for effecting the sorting operation described above is shown in FIGURES 8a and 8b. The transducer means 301 of FIGURE 1 is represented in FIGURE 8a by the group of electromagnetic transducer heads 301a, 301b, 301c and 301d. Likewise, the transducer means 303 of FIGURE 1 is represented in FIGURE 8a by the group of electromagnetic transducer heads 303a, 303b, 303c and 303d.

As in previous embodiments, the heads 301a and 303a, 301b and 303b, and 301c and 303c, scan successive rows of binary bits on the cards such as the cards 300a and 300b. Of course, as mentioned above, more or less heads can be used depending upon the number of rows of binary bits recorded on each card. The heads 301a and 303a scan the top row which has been assumed to be the least significant, the heads 301b and 303b scan the row of next-to-least significance, and so on. The heads 301d and 303d scan the lowermost row of the cards. This row, as in the previous embodiment, has a series of "1's" recorded on it at the respective positions on each card, and this row constitutes the clock channel.

The heads 301a and 303a, 301b and 303b, 301c and 303c, and 301d and 303d are respectively connected to a series of "or" networks 901, 903, 905 and 907. The "or" networks 901, 903, 905 and 907 in turn are connected respectively to a series of amplifiers 902, 904, 906 and 908. The output terminals of the amplifiers 902, 904 and 906 are connected to the left input terminals of a series of flip-flops 910, 912 and 914. The output terminal of the amplifier 908 is connected to the left input terminal of a flip-flop 913 and to the input terminal of a delay line 915. The output terminal of the delay line 915 is connected to the right input terminal of the flip-flop. The left output terminal of the flip-flop 913 is connected to a binary counter 916. The output terminals of the amplifiers 902, 904 and 906 are also respectively connected to a series of inverters 918, 920 and 922. The output terminals of the inverters are connected to the respective right input terminals of the flip-flops 910, 912 and 914.

The left and right output terminals of the flip-flop 910 are connected respectively to a pair of "and" networks 924 and 926. The left and right output terminals of the flip-flop 912 are connected respectively to a pair of "and" networks 928 and 930. The left and right output terminals of the flip-flop 914 are connected respectively to an "and" network 932 and to an "and" network 934.

The "and" network 924 is connected to the left input terminal of a flip-flop 936, and the "and" network 926 is connected to the right input terminal of that flip-flop. In similar manner, the "and" network 928 is connected to the left input terminal of a flip-flop 938, whereas the "and" network 930 is connected to the right input terminal of this flip-flop. In like manner, the "and" network 932 is connected to the left input terminal of a flip-flop 940 and the "and" network 934 is connected to the right input terminal of this flip-flop.

The arrangement of the binary counter 916, the selector 950 and the compare network 948 is similar to the arrangement of the corresponding elements 354, 356 and 358 in the control system of FIGURE 5. The construction and operation of the counter 916, the selector 950 and the compare network 948 are described and shown in detail in co-pending application Serial No. 566,404. As described in the co-pending application, the compare network 948 may be an "and" network, and this "and" network may be constructed in a manner similar to that described and shown in detail on page 32 of "Arithmetic Operations in Digital Computers" by R. K. Richards. The selector 950 in like manner can be set to a selected position so that the compare network 948 conditions the "and" networks 924, 926, 928, 930, 932 and 934 for conduction only at the selected position on each card. Now, as the cards are transported on the drum 10 past either the transducer means 301 or past the transducer means 303, each card is scanned by these transducer means and the flip-flops 910, 912 and 914 are triggered into operational states corresponding to the columns of data on each card. However, the triggering of the flip-flops 910, 912 and 914 is ineffective insofar as the rest of the system is concerned except for the selected position on each card, as established by the manual adjustment of the selector 950. At this selected position, the "and" networks 924, 926, 928, 930, 932 and 934 are conditioned so that information is passed to the flip-flops 936, 938 and 940. The latter flip-flops form a register, and the information at the selected position on each card is stored in that register.

The flip-flops 936, 938 and 940 are controlled, therefore, to assume individual operating conditions or states corresponding to the columns of data on each card at the selected position. The flip-flop 936 represents the least significant binary bits, the flip-flop 938 represents the bits of the next higher significance, and the flip-flop 930 represents the bits of the next higher significance. The right output terminals of flip-flops 936 and 938 and the left output terminal of the flip-flop 940 are respectively connected to respective ones of a series of "and" networks 1000, 1002 and 1004. The output terminals of these "and" networks are all connected to an "or" network 1006.

The system includes a manually operated start switch 1008. The armature of the switch 1008 is connected to the positive terminal of the source 426. The fixed contact of the switch 1008 is connected to a capacitor 1012 which, in turn, is connected to the input terminal of a differentiator 1014. The output terminal of the differentiator is connected to an input terminal of an "or" network 1016. The output terminal of the "or" network 1016 is connected to the left input terminal of a flip-flop 1018. The left output terminal of this flip-flop is connected to a control grid of a triode 1020. A resistor 1022 is connected between this control grid and the negative terminal of the source 426.

The cathode of the triode 1020 is grounded, and the anode is connected to one terminal of the energizing winding 676. The other terminal of this winding is connected to the positive terminal of the source 426. In a manner similar to that described previously, the winding 676 controls the operation of station 85 of FIGURE 1 either as an input station for the transfer of cards from the station or as an output station for the transfer of cards into the station. The control exerted by the winding 676 over the operation of the station 85 may be seen from the discussion hereafter in connection with FIGURE 13 and is also described in detail in co-pending application Serial No. 646,639. However, and in the manner described in copending application Serial No. 699,132 mentioned above, the control of the station by the winding 676 is such that when the triode 1020 is conductive so that current flows through the winding, the station is conditioned to its feeding mode. On the other hand, when the triode 1020 is not conductive, the station is conditioned to its stacking mode.

The output terminal of the differentiator 1014 is further connected to the right input terminal of a flip-flop 1026 and to the left input terminal of a flip-flop 1028. The left output terminal of the flip-flop 1028 is connected to an input terminal of the "and" network 1000, and the left output terminal of the flip-flop 1026 is connected to an input terminal of the "and" network 1004. A delay line 930 is connected between the output terminal of the compare network 948 and an input terminal of each of the "and" networks 1000, 1002 and 1004.

The differentiator 1014 is also connected to an "or" network 1032. This "or" network is connected to the left input terminal of a flip-flop 1034. The left output terminal of the flip-flop 1034 is connected to the control grid of a triode 1036. A resistor 1038 is connected to this control grid and to the negative terminal of the source of direct voltage 426. The cathode of the triode 1036 is grounded, and the anode of the triode is connected to the energizing winding of the solenoid 34 associated with the gate 32. The other side of this energizing winding is connected to the positive terminal of the source of direct voltage 426.

The differentiator 1014 is also connected to an "or" network 1043, and the "or" network 1043 is connected to the right input terminal of a flip-flop 1042. The left output terminal of the flip-flop 1042 is connected to the control grid of a triode 1044. The cathode of the triode is grounded, and the control grid is connected to a resistor 1046. The other terminal of the resistor 1046 is connected to the negative terminal of the source 426. The anode of the triode 1044 is connected to one terminal of the energizing winding 518. The other terminal of this winding is connected to the positive terminal of the source 426. In like manner, when the winding 518 is energized, the station 80 is conditioned to its feeding mode. Alternately, when the triode 1044 is non-conductive and the winding 518 is not energized, the station is conditioned to a stacking mode.

The differentiator 1014 is also connected to an "or" network 1050. The output terminal of this "or" network is connected to the right input terminal of a flip-flop 1052. The left output terminal of the flip-flop 1052 is connected to the control grid of a triode 1054. The cathode of this triode is grounded, and a resistor 1056 is connected between its control grid and the negative terminal of the source of direct voltage 426. The energizing winding 520 associated with the station 94 is connected to the anode of the triode 1054 and to the source of direct voltage 426. As above, when the winding 520 is energized due to the conduction of the triode 1054, the station 94 is conditioned to its feeding mode. Alternately, when this winding is not energized, the station is conditioned to its stacking mode.

The differentiator 1014 is also connected to an "or" network 1060, and the output terminal of this "or" network is connected to the left input terminal of a flip-flop 1062. The left output terminal of the flip-flop 1062 is connected to the control grid of a triode 1064. This control grid is connected to one side of a resistor 1066. The other side of the resistor 1066 is connected to the negative terminal of the source 426, and the cathode of the triode 1064 is connected to ground. The anode of the triode 1064 is connected to one terminal of the energizing winding of the solenoid valve 54 associated with the gate 50, and the other terminal of this winding is connected to the positive terminal of the source 426.

In the manner described, the station 85 includes a switch 1069 which closes when the last card leaves that station. One side of the switch 1069 is connected to the positive terminal of the source 426, and the other side of the switch is connected to a capacitor 1070.

The capacitor 1070 is connected to an input terminal of a differentiator 1072. The output terminal of the differentiator 1072 is connected to a delay line 1074, and the delay line is connected to the right input terminal of the flip-flop 1018 and to the right input terminal of the flip-flop 1034. The delay line 1074 is also connected to an input terminal of an "and" network 1076. The output terminal of the "and" network 1076 is connected to an "or" network 1078 which, in turn, is connected to the left input terminal of the flip-flop 1042. The "and" network 1076 is also connected to the right input terminal of the flip-flop 1028 and to the left input terminal of the flip-flop 1080. The left output terminal of the flip-flop 1080 is connected to an input terminal of the "and" network 1002.

The "and" network 1076 is also connected to the right input terminal of the flip-flop 1062, and this "and" network is connected to an "or" network 1082. The output terminal of the "or" network 1082 is connected to the left input terminal of a flip-flop 1084. The left output terminal of the flip-flop 1084 is connected to the control grid of a triode 1086. The cathode of the triode 1086 is grounded, and a resistor 1088 is connected between the control grid and the negative terminal of the source 426. The anode of the triode 1086 is connected to the energizing coil of the solenoid valve 42 associated with the gate 40. The other side of this energizing coil is connected to a positive terminal of the source 426.

The signals from the "and" network 1076 are also introduced through an "or" network 1091 to the left input terminal of a flip-flop 1092. The left output terminal of the flip-flop 1092 is connected to the control grid of a triode 1094. This control grid is connected to a resistor 1096 which is connected to the negative terminal of the source 426. The cathode of the triode 1094 is grounded, and the anode is connected to one side of the energizing winding of the solenoid valve 38 associated with the gate 36. The other side of this winding is connected to the positive terminal of the source 426.

The "and" network 1076 is also connected to the right input terminal of a flip-flop 1100. The left output terminal of the flip-flop 1100 is connected to the control grid of a triode 1102. The cathode of the triode is grounded, and the control grid of the triode is connected to a resistor 1104, this resistor being connected to the negative terminal of the source 426. The anode of the triode 1102 is connected to the energizing winding 522 which controls the operational mode of the station 89. The other side of this winding is connected to the positive terminal of the source 426. When the triode 1102 is rendered conductive to energize the winding 522, the station 89 is conditioned to its feeding mode. Otherwise this station is conditioned to a stacking mode.

In like manner, the station 80 includes a switch 1107 which closes when the last card leaves that station. One side of the switch 1107 is connected to the positive terminal of the source 426, and the other side of this switch is connected to a capacitor 1108. The capacitor 1108 is connected to the left output terminal of the flip-flop 1080 and the differentiator is connected to a delay line 1112. The delay line 1112 is connected to one input terminal of an "and" network 1113 having another input terminal conected to the left output terminal of the flip-flop 1080 in FIGURE 8a. The signals from the "and" network 1083 are introduced to the left input terminal of a flip-flop 1114. The left output terminal of the flip-flop 1114 is connected to the control grid of a triode 1116. The cathode of this triode is grounded, and its control grid is connected to one terminal of a resistor 1118, the resistor being connected to the negative terminal of the source 426. The energizing winding of the solenoid valve 52 associated with the gate 48 is connected to the anode of the triode 1112 and to the positive terminal of the source 426.

The output terminal of the delay line 1112 is also connected to the left input terminal of the flip-flop 1052 and to an input terminal of an "or" network 1083, the output signals from which are applied to the right input terminal of the flip-flop 1084.

The station 94 includes a switch 1121 which closes when the last card leaves this station. One side of this switch is connected to the positive terminal of the source 426, and the other side is connected to a capacitor 1123. The capacitor 1123 is connected to a differentiator 1124, and the differentiator is connected to a delay line 1126. The output terminal of the delay line 1126 is connected to the left input terminal of the flip-flop 1026 and to the right input terminal of the flip-flop 1080. The delay line 1126 is connected to the "or" network 1043, to the right input terminal of the flip-flop 1114, and to the "or" networks 1050 and 1060. In addition, the output terminal of the delay line 1126 is connected to the right input terminal of the flip-flop 1092, to the left input terminal of the flip-flop 1100, and to the left input terminal of the flip-flop 1128.

The left output terminal of the flip-flop 1128 is connected to the control grid of a triode 1130. This control grid is connected to a resistor 1132, the resistor being connected to the negative terminal of the source 426. The cathode of the triode 1130 is grounded, and the energizing winding of the solenoid valve 62 associated with the gate 60 is connected to the anode of this triode and to the positive terminal of the source 426.

The station 89 includes a switch 1135 which closes when the last card leaves the station. One side of this switch is connected to a capacitor 1136. The capacitor 1136 is connected to a differentiator 1138, and the differentiator is connected to a delay line 1140. The output terminal of the delay line 1140 is connected to an input terminal of the "or" network 1016 and to an input terminal of the "or" network 1032. The delay line 1140 is also connected to the right input terminal of the flip-flop 1128.

The "or" network 1006 is connected to the input terminal of a delay line 1142. The output terminal of the delay line is connected to an input terminal of an "and" network 1144 and to the input terminal of an "and" network 1146.

The output terminal of the "and" network 1144 is connected to the left input terminal of a flip-flop 1147 and to the input terminal of a delay line 1148. The output terminal of the delay line 1148 is connected to the right input terminal of the flip-flop 1147. The left output terminal of the flip-flop 1147 is connected to the control grid of a triode 1151. A resistor 1153 is connected to the control grid and to the negative terminal of the source 426. The energizing coil of the solenoid valve 46 associated with the gate 44 has one terminal connected to the anode of the triode 1151, and the other terminal of this coil is connected to the positive terminal of the source 426. The cathode of the triode 1151 is connected to ground.

The "and" network 1146 is connected to the left input terminal of a flip-flop 1159 and to the input terminal of a delay line 1160. The output terminal of the delay line 1160 is connected to the right input terminal of the flip-flop 1159. The left output terminal of the flip-flop 1159 is connected to the control grid of a triode 1162. The cathode of this triode is grounded, and a resistor 1164 is connected from its control grid to the negative terminal of the source 426. The anode of this triode is connected to one terminal of the energizing winding of the solenoid valve 58 associated with the gate 56, the other terminal of this winding being connected to the positive terminal of the source 426.

The output terminal of the delay line 1126 is connected to one input terminal of an "or" network 1166, and the differentiator 1014 is connected to another input terminal of this "or" network. The output terminal of the "or" network 1166 is connected to the left input terminal of a flip-flop 1168.

The output terminal of the "and" network 1076 is connected to the right input terminal of the flip-flop 1168. The left output terminal of the flip-flop 1168 is connected to the other input terminal of the "and" network 1144, and the right output terminal of the flip-flop 1168 is connected to the other input terminal of the "and" network 1146.

The left output terminal of the flip-flop 1026 is connected to an input terminal of an "and" network 1170. The output terminal of the delay line 1074 is connected to another input terminal of the "and" network 1170. The output terminal of the "and" network 1170 is connected to an input terminal of the "or" network 1078 and to an input terminal of the "or" network 1050, to an input terminal of the "or" network 1091, and to an input terminal of the "or" network 1082.

The signal passing through the "and" network 1170 is also introduced to the left input terminal of a flip-flop 1171, the right output terminal of which is connected to an input terminal of the "and" network 1004. The voltage on the left output terminal of the flip-flop 1171 controls the passage of signals through an "and" network 1173 (FIGURE 8b) from the delay line 1112. The signals passing through the delay line 1112 are introduced through a delay line 1175 to the "or" networks 1016, 1032, 1060 and 1083.

To place the system in operation, the cards to be sorted are placed in a stacked condition in the station 85, as noted above, and the selector 950 is adjusted so that the cards will be sorted in accordance with the binary data at a particular position on each card. Then, the start switch 1008 is manually depressed and released to initiate the binary sorting operation.

The actuation of the switch 1008 causes a pulse of current to flow into the capacitor 1012, which in turn causes the differentiator 1014 to produce a sharp output pulse. This output pulse from the differentiator is introduced to the left input terminal of the flip-flop 1028 and is operative to trigger that flip-flop to a true state, as represented by a relatively high voltage on the left output terminal of the flip-flop and a relatively low voltage on the right output terminal of the flip-flop. The triggering of the flip-flop 1028 to a true state causes the "and" network 1009 to be conditioned for translation. It will be remembered that this is desired for the first pass, because only the least significant bits of binary information on the cards at the selected position are to be sensed for this pass, and the operational state of the flip-flop 936 for successive cards is indicative of this bit.

The output pulse from the differentiator 1014 is also introduced to the right input terminal of the flip-flop 1026 to trigger that flip-flop to its false state. As will become evident, the flip-flop 1080 is in a false state from the preceding operation of the system. The fact that both the flip-flops 1026 and 1080 are in their false states causes both the "and" networks 1002 and 1004 to be rendered non-conductive. This is desired for the reasons described above, that is, because for the first pass only the least significant bit of binary data at the selected position of each card is to be processed.

Therefore, for the reasons described above, as each card passes the transducer heads 301a, 301b, 301c and 301d; the "or" network 1006 produces an output pulse for each card that has a "0" binary bit at its selected position, and the "or" network 1006 produces no output pulse for each card having a unity binary bit at its selected position. The reason for this is that the flip-flop 936 has its right output terminal connected to an input terminal of the "and" network 1000. Therefore, even though the "and" network 1000 may have been prepared for activation by the relatively high voltage on the left output terminal of the flip-flop 1028, the flip-flop 936 must be in a false state as represented by a relatively high voltage on its right output terminal in order for the "and" network 1000 to pass a signal.

The pulses are introduced by the delay line 930 to the third input terminal of the "and" network 1000 and to corresponding respective terminals of the "and" networks 1002 and 1004. The relay line 930 produces such a pulse a selected time after the compare network 948 produces a pulse indicative of the selected position on the card being processed. Therefore, when the card being processed indicates a "0" at the position of its least significant binary bit and at the selected position on the card, the pulse from the delay line 930 is translated by the "and" network 1000 to the "or" network 1006. However, when the card being processed exhibits a "1" at the least significant position, the resulting true state of the flip-flop 936 does not permit the "and" network 1000 to pass the pulse from the delay line 930 to the "or" network 1006.

It should be pointed out, that for the other binary bits of increasing significance, a like output pulse from the delay line 930 will be translated to the "or" network 1006 by either the "and" network 1002 or by the "and" network 1004 when such networks are conditioned for conductivity by the respective flip-flops 1080 and 1026, and when the flip-flops 938 and 940 are in their false state. In short, therefore, the "or" network 1006 produces an output pulse only when the card being processed has a "0" binary bit recorded at the selected level of significance being processed during any particular pass.

The output pulse from the differentiator 1014 is also passed through the "or" network 1016 to the left input terminal of the flip-flop 1018. This pulse triggers the flip-flop 1018 to a true state as represented by a relatively high voltage on the left output terminal of the flip-flop so as to cause the triode 1020 to become conductive and thereby energize the winding 676 of the station 85. As described above, this energizing of the winding 676 conditions the station 85 to its feeding mode, and the cards placed in that station are successively fed to the periphery of the drum 12 for subsequent processing by the heads 301a, 301b, 301c and 301d as described in the preceding paragraphs.

The output pulse from the differentiator 1014 is also translated by the "or" network 1032 to the left input terminal of the flip-flop 1034. The flip-flop 1034 is, therefore, triggered to its true state to render the triode 1036 conductive so as to energize the solenoid valve 34 associated with the gate 32. This causes the gate 32 to become effective so that the cards fed from the station 85 to the drum 12 are transferred one after another to the central drum 10. The central drum now carries the cards in succession past the heads 301a, 301b, 301c and 301d.

The output pulse from the differentiator 1014 is also introduced through the "or" network 1043 to the right input terminal of the flip-flop 1042 to trigger that flip-flop to a false state. This causes the triode 1044 to be non-conductive so that the station 80 is conditioned as described to its stacking mode. Likewise, the output pulse from the differentiator 1014 is introduced through the "or" network 1050 to the right input terminal of the flip-flop 1052 to trigger that flip-flop to its false state. The triode 1054 is therefore rendered non-conductive and the station 94 is also conditioned to a stacking mode.

The output pulse from the differentiator 1014 is also introduced through the "or" network 1060 to the left input terminal of the flip-flip 1062. This causes the flip-flop 1062 to be triggered to a true state as represented by a relatively high voltage on the left output terminal of the flip-flop and a relatively low voltage on the right output terminal of the flip-flop, so that the triode 1064 is rendered conductive to activate the gate 50 continually for the duration of this pass.

Finally, the output pulse from the differentiator 1014 is introduced through the "or" network 1166 to the left input terminal of the flip-flop 1168. This causes the flip-flop 1168 to be triggered to a true state as represented by a relatively high voltage on the left output terminal of the flip-flop and a relatively low voltage on the right output terminal of the flip-flop. Because the flip-flop 1168 is in a true state, the "and" network 1144 is conditioned for conduction. Therefore, each time an output pulse is delivered by the "or" network 1006, and after such pulse is delayed a short interval by the delay line 1142, the pulse is introduced through the "and" network 1144 to the left input terminal of the flip-flop 1147 to trigger that flip-flop to its true state as represented by a relatively high voltage on the left output terminal of the flip-flop and a relatively low voltage on the right output terminal of the flip-flop. Then, after a delay established by the delay line 1148, the pulse is introduced to the right input terminal of the flip-flop 1147 to return the flip-flop to its false state.

The delay produced by the delay line 1142 is sufficient so that the card which gave rise to the pulse upon being processed by the heads 301a, 301b, 301c and 301d, has had an opportunity to come to the vicinity of the gate 44. Then the gate is activated for a time determined by the delay line 1148 and which time is sufficient to cause the card to be transferred to the drum 20.

Therefore, the cards fed from the station 85 to the drum 12 are all transferred in sequence by the gate 32 to the central transporting drum 10. These cards are then carried in succession past the transducer heads 301a, 301b, 301c and 301d. Each card whose least significant binary bit at the selected position is "0" activates the gate 44 due to the fact that such a card causes a pulse to be produced by the "or" network 1006, and each such card is transferred by that gate to the drum 20. The station 80 is conditioned to its stacking mode, so that all the cards transferred to the drum 20 are deposited in the station 80, and all such cards have binary bits representative of "0" recorded at its least significant position and at the selected position on that card.

All the other cards transferred from the drum 12 to the drum 10 during this first pass are transported by the drum 10 past the gate 44 until they come under the influence of the continually activated gate 50. These latter cards which should all have "unity" bits of binary data at the least significant level of the selected position are all transferred to the drum 18. The station 94 is conditioned to its stacking mode, as described above, so that all the least significant "unity" bit cards are deposited in the station 94.

When the last card leaves the station 85, the switch 1069 closes. This causes a current pulse to flow into the capacitor 1070 so that the differentiator 1072 develops an output pulse. The delay line 1074 delays this output pulse for a time sufficient to allow the last card from the station 85 to be stacked either in the station 80 or in the station 94 depending upon whether its least significant binary bit at the selected position is "1" or "0." Then, the delay line 1074 develops an output pulse.

The output pulse from the delay line 1074 is introduced to the right input terminal of the flip-flop 1018 to return the station 85 to its stacking mode in the described manner. Likewise, this output pulse is introduced to the right input terminal of the flip-flop 1034 to de-activate the gate 32. The output pulse from the delay line 1074 is also introduced to an input terminal of the "and" network 1076. Due to the fact that the flip-flop 1028 is still in its true state, this "and" network is conditioned for translation, so that the output pulse from the delay line 1074 passes through the "and" network 1076 to the right input terminal of the flip-flop 1028 and to the left input terminal of the flip-flop 1080. The resulting operational states of the flip-flops 1028 and 1080 now cause the "and" network 1000 to be non-conductive, and these states further condition the "and" network 1002 to be rendered conductive to a pulse from the delay line 1030 whenever the flip-flop 938 is in its false state as represented by a relatively high voltage on the right output terminal of the flip-flop and a relatively low voltage on the left output terminal of the flip-flop.

The above is the desired condition for the second pass of the system during which the binary bits of the next higher significance at the selected position are to be processed. The "and" network 1004 is still non-conductive because of the fact that the flip-flop 1026 has previously been placed in a false state as described above and is still in that false state.

The output pulse from the delay line 1074, as translated by the "and" network 1076, is also introduced through the "or" network 1078 to the left input terminal of the flip-flop 1042. This triggers the flip-flop 1042 to its true state to render the triode 1044 conductive and to place the station 80 in its feeding mode. Therefore, the cards having the "0" least significant binary bits at the selected position are fed from the station 80 in succession to the periphery of the drum 20.

The output pulse from the "and" network 1076 is also introduced through the "or" network 1082 to the left input terminal of the flip-flop 1084. This causes the flip-flop 1084 to render the triode 1086 conductive and thereby activate the gate 40. This activation of the gate 40 causes the cards so fed from the station 80 to the drum 20 to be transferred to the central drum 10.

The cards are carried by the central drum past the gate 50 which is now de-activated due to the fact that the output pulse from the "and" network 1076 is introduced to the right input terminal of the flip-flop 1062 to trigger that flip-flop to its false state, and such cards are carried by the drum 10 past the transducer heads 303a, 303b, 303c and 303d. The cards from the station 80 are, therefore, processed by these transducer heads, and the "or" network 1006 develops pulses indicative of the "0" binary bits at the next higher level and at the selected position.

The output pulse from the "and" network 1076 is also introduced to the left input terminal of the flip-flop 1092 to trigger that flip-flop to a true state and activate the gate 36 continually throughout this second pass. In addition, this output pulse is introduced to the right input terminal of the flip-flop 1100 to trigger that flip-flop to its false state and thereby condition the station 89 to a stacking mode.

The output pulse from the "and" network 1076 is additionally introduced to the right input terminal of the flip-flop 1168 to trigger that flip-flop to its false state. This causes the "and" network 1146 rather than the "and" network 1144 to be conditioned for conduction, so that the output pulse from the "or" network 1006 causes the gate 56 rather than the gate 44 to be activated each time a processed card exhibits a "zero" at the second level.

Therefore, the cards processed by the transducer heads 303a, 303b, 303c and 303d which have "0" binary bits at the next significant level and at the selected position are transferred by the gate 56 to the drum 14 to be deposited in the station 89. The other cards, which should have "unity" bits at the next significant level, are carried past the gate 56 by the drum 10 and these are transferred by the continually activated gate 36 to the drum 12. These latter cards are then deposited in the station 85.

When the last card leaves the station 80, the switch 1107 closes to cause a current pulse to be developed through the capacitor 1108 which, in turn, causes the differentiator 1110 to develop a sharp output pulse. The delay line 1112 delays the output pulse from the differentiator 1110 a sufficient time to allow the last card from the station 80 to be deposited in either the station 89 or in the station 85. Then the delay line 1112 develops an output pulse which triggers the flip-flop 1114 to its true state to activate the gate 48, and which triggers the flip-flop 1052 to its true state to condition the station 94 to its feeding mode. The output pulse from this delay line is also introduced to the right input terminal of the flip-flop 1084 to trigger that flip-flop to its false state and to de-activate the gate 40.

Therefore, after the last card has left the station 80 and has been deposited in either the station 89 for "0's" or in the station 85 for "1's," the station 94 is conditioned to feed cards sequentially to the periphery of the drum 18. Such cards are transferred by the activated gate 48 to the central drum 10. These cards, as in the previous pass, are transferred by the gate 56 to the drum 14 if they exhibit a "0" at the second significant level and at the selected position and are stacked in station 89, and such cards are transferred by the gate 36 to the drum 12 and deposited in the station 85 when they exhibit a "unity" binary bit at the second significant level.

When the last card leaves the station 94, the switch 1121 closes. This causes the differentiator 1124 to develop an output pulse from the capacitor 1123, and the output pulse from the differentiator 1124 is delayed by the delay line 1126 a sufficient time to enable the last card from the station 94 to be deposited in either the station 89 or in the station 85. Then, the output pulse from the delay line 1126 triggers the flip-flop 1026 to its true state and it triggers the flip-flop 1080 to its false state. The "and" network 1102 is now rendered non-conductive, and the "and" network 1004 is conditioned to be rendered conductive. The "and" network 1000 is non-conductive because of the false state of the flip-flop 1028. Therefore, the system is conditioned so that the cards may be processed at the selected position and with respect to the binary bits at the third significant level.

The output pulse from the delay line 1126 is also used to trigger the flip-flop 1114 to its false state and de-activate the gate 48. This pulse is also introduced through the "or" network 1166 to the left input terminal of the flip-flop 1168 to trigger that flip-flop to its true state. This returns the "and" network 1144 to a conductive condition and renders the "and" network 1146 non-conductive. Therefore, the pulses from the "or" network 1006 representative of "0" bits at the third significant level and at the selected position of each card activate the gate 44 to transfer such cards to the drum 20, rather than the gate 56.

The output pulse from the delay line 1126 is also introduced through the "or" network 1060 to the left input terminal of the flip-flop 1062 to activate the gate 50 continually throughout the pass. In like manner, the output pulse from the delay line 1126 triggers the flip-flop 1092 to a false state to de-activate the gate 36, and it triggers both the flip-flops 1100 and 1128 to a true state to condition the station 89 to its feeding mode and to activate the gate 60.

Therefore, the cards in the station 89 are fed in sequence to the drum 14, and such cards are transferred to the central drum 10 for processing by the transducer heads 301a, 301b, 301c and 301d. As will be seen in FIGURE 8a, the signals on the left output terminal of the flip-flop 940 are to be introduced to the "and" network 1004. This causes the cards having "0" binary bits at the third selected level and at the selected position cause the gate 44 to be activated so that such cards are transferred to the drum 20 to be deposited in the station 80. This station is conditioned to its stacking mode by the introduction of the output pulse from the delay line 1126 to the right input terminal of the flip-flop 1042 and through the "or" network 1043.

Also, the cards having "unity" binary bits at the third significant level and at the selected position move past the gate 44 and come under the influence of the activated gate 50 to be transferred to the drum 18 and deposited in the station 94. This station likewise is conditioned to its stacking mode by the introduction of the pulse from the delay line 1126 through the "or" network 1050 to the right input terminal of the flip-flop 1052.

The above process continues until the last card leaves the station 89. When this occurs, the switch 1135 closes to cause in the previously described manner the delay line 1140 to generate a pulse. This pulse is generated after the last card out of the station 89 is deposited in either the station 80 or in the station 94. Then, the pulse from the delay line 1140 is introduced through the "or" network 1016 to the left input terminal of the flip-flop 1018 to condition the station 85 to its feeding mode. This card is also introduced through the "or" network 1032 to the left input terminal of the flip-flop 1034 to activate the gate 32. In like manner, the pulse from the delay line 1140 is introduced to the right input terminal of the flip-flop 1128 to de-activate the gate 60.

Now, the cards previously deposited in the station 85 are fed to the drum 12 and are transferred from that drum by the activated gate 32 to the central drum 10 of FIGURE 1. These cards are deposited in the manner described above in either the station 80 or in the station 94 depending upon whether their binary bits at the third significant level and at the selected position are "0" or "1."

When the last card leaves the station 85 and is deposited in either the stations 80 or 94, the sorting process is complete. It should be mentioned again that the passes are continued until each significant level has been processed. In the illustrated embodiment, three significant levels are shown so that three passes achieve the complete sorting process. For additional levels of significance, additional transducer heads and associated equipment, and additional passes, are required.

It is now necessary to transfer the cards from the station 80 to the station 94, so that all the cards in the station 94 may be properly sorted insofar as the binary data at the selected position is concerned. However, as will be described, the cards in the station have to be first inverted in order by first passing the cards from the station 80 to either the station 85 or the station 89 and then passing the cards to the station 94. Then, for further sorting, this stack of cards is placed in the station 85 and the sorting process allowed to proceed at a different selected position on each card by adjustment of the selector 950 or this may be accomplished automatically such as described in co-pending application Serial No. 699,132.

The return of the cards from the station 80 to the station 94 is achieved in the following manner. The last card out of the station 85 again causes the switch 1069 to close. This closure of the switch causes the delay line 1074 to develop an output pulse after this card has been deposited in either the station 80 or in the station 94. This output pulse is introduced to the right input terminal of the flip-flop 1018 to return the station 85 to its stacking mode. The pulse is also introduced to the right input terminal of the flip-flop 1034 to de-activate the gate 32. The pulse is further introduced to the left input terminal of the flip-flop 1092 through the "or" network 1091 to activate gate 36. Due to the fact that the flip-flop 1028 is in its false state, the "and" network 1076 is non-conductive and does not translate the output pulse from the delay line 1074 to the components connected to the output terminal of the "and" network 1076.

However, because the flip-flop 1026 is in its true state for the last pass, the "and" network 1170 is conductive and translates the output pulse from the delay line 1074 through the "or" network 1078 to the left input terminal of the flip-flop 1042, to condition the station 80 to its feeding mode. The pulse from the "and" network 1170 is also introduced through the "or" network 1050 to the right input terminal of the flip-flop 1052 to assure that the station 94 is in its stacking mode. The pulse from the "and" network 1170 is also introduced through the "or" network 1082 to the left input terminal of the flip-flop 1084 to activate the gate 40.

Therefore, the cards in the station 80 are fed to the drum 20, and such cards are transferred to the drum 10 and carried by that drum to the gate 36. This latter gate transfers the cards to the drum 12 and the latter drum carries them to the station 85. Therefore, all the cards become stacked in the station 85 in reverse order with respect to their previous disposition in the station 80. The cards are now in proper order to become transferred from the station 85 to the station 94 for disposition in proper relationship to the cards already in the station 94.

As previously described, a signal passes through the "and" network 1170 at the time that the sorting operation has been completed and the cards are about to be transferred from the station 80 to the station 85. This signal triggers the flip-flop 1171 to the true state, thereby causing a low voltage to be introduced from the flip-flop to the "and" network 1004 to close the "and" network against the passage of any information read on the cards. The triggering of the flip-flop 1171 to the true state also prepares the "and" network 1173 for the passage of a signal.

When the "and" network 1173 becomes prepared, a signal passes through the "and" network from the delay line 1112 at the time that the last card passes out of the station 80. After a delay provided by the line 1175, this signal is introduced through the "or" network 1016 to the flip-flop 1018 to condition the station 85 to the feeding mode. The signal is also introduced through the "or" network 1032 to the flip-flop 1034 to activate the gate 32 for the transfer of cards from the drum 12 to the drum 10. The signal also passes through the "or" network 1060 to the flip-flop 1062 to activate the gate 50 for the transfer of cards from the drum 10 to the drum 18 and then into the station 94. At the same time, the gate 40 becomes deactivated by the passage of a signal from the "and" network 1173 through the "or" network 1083 to the right input terminal of the flip-flop 1084.

As indicated in the introductory paragraphs, the apparatus of the invention is also capable of performing different collating operations on the information cards. The control system of FIGURES 9a and 9b may be coupled to the apparatus to enable it to perform a particular collating operation. It is to be understood, however, that by means of other equivalent control systems, the apparatus can be made to perform other types of collating operations.

The particular collating operation which the apparatus is caused to perform by the control system of FIGURES 9a and 9b is one in which certain cards are selected from one sorted stack of cards and placed in the proper order in a second sorted stack. For example, two individual stacks of cards may be provided, with the cards being already sorted in each of the stacks with respect to the data at a selected position on each card in the stacks. It will be assumed that the cards are sorted in each stack in an ascending sequence with respec to the decimal numbers represented by the data at the particular position. As noted previously, this data may be in a binary code, so that the selected position on each card represents a decimal number. With this condition, the decimal numbers at the selected position on successive cards in the individual stacks will be in an ascending order in each stack. Then, the apparatus of the invention is controlled to feed the cards from the individual stacks into a pair of corresponding stacks in which the cards also appear in an ascending order with respect to the decimal numbers at the selected position. The control is such, for example, that all the cards from one stack, and any cards from the other stack having a decimal number corresponding to a number represented by any one or more of the cards in the first stack, are fed in sequence to a first output stack; the remaining cards in the other stack which do not have a decimal number corresponding to one on any card in the first stack being fed in sequence to a second output stack.

The control system of FIGURES 9a and 9b may, as was the case with the other control systems, be switched into circuit with the apparatus of FIGURE 1 by any appropriate switching means. The control system is similar in some respects to the control system of FIGURES 5a and 5b, and like components have been designated by the same numbers.

To perform the desired collating operation, the first stack of sorted cards is placed in the station 94 and the second stack of sorted cards is placed in the station 80. A card from the station 94 is released and fed to the drum 16 on which it circulated. Then, a card from the station 80 is released and processed. Should the decimal number at the selected position on the latter card be less than the number on the card on the drum 16, the latter card is deposited in the station 89.

A second card from the station 80 is then released, and it also is deposited in the station 89 if its decimal number at the selected position is less than the decimal number represented by the card from the station 94 which is being circulated on the drum 16.

This operation proceeds, with cards from the station 80 being deposited in ascending order in the station 89. This continues until a card is reached in the station 80 that is equal or greater than the card being circulated on the drum 16. Should an equal card in the station 80 be reached, the card on the drum 16 is deposited in the station 89, and the equal card is placed on the drum 16.

A new card is now released from the station 94. If this latter card from the station 94 is equal to the card from the station 80 which is now on the drum 16, the card on the drum 16 is deposited in the output station 89 and the last card from the station 94 is placed on the drum 16, and so on.

However, if the last card from the station 94 is greater than the circulated station 80 card on the drum 16, the card from the station 94 is put on the drum 16 and the circulated card is returned to the drum 14 and deposited in the station 89. A new card is now released from the station 80, and if this card is greater than the card being circulated on the drum 16, the card from the station 80 is put on the drum 16, and the previous card from the station 94 is transferred from the drum 16 to the drum 12 to be deposited in the station 85.

In the manner outlined above, and by the control system to be described, all the cards from the station 80 and cards from the station 94 having the same decimal number at the selected position are fed to the station 89. All the remaining cards from the station 94 are fed to the station 85. The cards originally placed in the stations 89 and 85 are properly arranged in an ascending sequence insofar as the decimal numbers represented by the binary data at the selected position on each card is concerned.

The connections from the transducer heads 303a, 303b, 303c and 303d to the comparator 402 are shown in FIGURE 9a, and these connections are essentially similar to the connections of FIGURE 5a. The leads controlling the flip-flop 390 have been designated as 391 and 393 in FIGURE 9a; the lead 391 being connected to the right input terminal of the flip-flop 390, and the lead 393 being connected to the left input terminal of that flip-flop. Also, a lead 391a is shown in FIGURE 9a which is connected to the right output terminal of the flip-flop 390, and a lead 393a is illustrated in FIGURE 9a which is connected to the left output terminal of the flip-flop 390.

It will be remembered that the flip-flop 390 controls the introduction of signals either to the register made up of the flip-flops 392, 394 and 395 or the register made up of the flip-flops 396, 398 and 400. As will be described, the flip-flop 390 is triggered to its false state when cards from the station 94 are being processed so that the data at the selected position on such cards may be set up in the register of the flip-flops 392, 394, and 395. During such time, and when the flip-flop 390 is in its true state, these cards from the station 94 are compared with a card from the station 80, the latter card being circulated on the drum 16. Alternately, the flip-flop 390 is triggered to its true state when the cards from the station 80 are being processed, and when such cards are being compared with a card from the station 94 on the drum 16. This enables the data at the selected position on the processed cards from the station 80 to be registered in the register of the flip-flops 396, 398 and 400. During the latter condition, and when the flip-flop 390 is in a true state, a card from the station 94 is being circulated on the drum 16, as noted above.

In FIGURE 9b the leads 404, 406 and 408 from the comparator 402 are connected respectively to a group of "and" networks 1200, 1202 and 1204. These "and" networks each have a second input terminal connected to the left output terminal of the flip-flop 540. It will be remembered that the flip-flop 540 is controlled when the start switch is depressed to be triggered to its false state. This renders the "and" networks 1200, 1202 and 1204 non-conductive for an interval sufficient to enable the data on the first card from the station 80 to be set up in the register of the flip-flops 392, 394 and 395. This precludes any false control sequences due to spurious comparison between the data on the first card from the station 80 and whatever data may be inadvertently registered by a card in a previous operational cycle in the register comprising the flip-flops 396, 398 and 400 of FIGURE 9a.

As in the system of FIGURE 5, the output terminal of the differentiator 512 is connected to the control grid of the triode 514, and the control windings 518, 520, 522 and 676 of the various card holding stations are all included in the anode circuit of the triode. The arrangement here is such that when the differentiator 512 develops a pulse in response to the actuation of the starting switch 508, the stations 80 and 94 will be actuated to their feeding mode and the stations 85 and 89 will be actuated to their stacking mode. This results from the momentary energizing of the windings 518, 520, 522 and 676 by the instantaneous flow of current through the triode 514. The momentary energizing of the windings 518, 520, 522 and 676 to obtain an operation of the stations 80 and 94 in the feeding mode and the stations 85 and 89 in the stacking mode may be seen from the discussion hereafter with respect to FIGURE 13 and may also be seen from the discussion in co-pending application Serial No. 645,639.

The output pulse from the differentiator is also introduced to the flip-flop 490 through the "or" network 482 to control the feed head 96 associated with the station 94 and thereby release a card from that station when such is desired. The output pulse from the differentiator 512 triggers the flip-flop 490 to the true state as represented by a relatively high voltage on the left output terminal of the flip-flop. This high voltage causes the tube 494 to become conductive so that current flows through the winding 98. When the winding 98 becomes energized, the production of a vacuum pressure in the feed head 96 becomes interrupted so that a card becomes transferred from the station 94 to the drum 18. The operation of the winding 98 and the feed head 96 in controlling the transfer of cards from the station 94 is fully set forth in co-pending application Serial No. 552,506.

The differentiator 512 is also connected to the delay line 524, which, in turn, is connected to the "or" network 498 to control the operation of the flip-flop 500. The flip-flop 500, as before, controls the activation of the gate 48 between the drums 10 and 20. In like manner, the differentiator 512 is connected to the delay line 526 to control the gate 56 at the proper time and thus control the transfer of cards from the drum 10 to the drum 14. The delay line 528, as before, produces a second control on the gate 56 to obtain the transfer of the card subsequently released from the station 80, as will be described.

Also, the transfer of the first card from the drum 14 to the drum 16 is controlled by the connection of the differentiator 512 to the delay line 530. Likewise, the differentiator 512 is connected to the delay line 532 and to the delay line 534 so that a card may be released from the station 80, and so that such card may be transferred from the drum 20 to the drum 10 at the proper time.

The triode circuits associated with the elements described above, and the various flip-flops and delay lines for controlling the triodes in these circuits, are connected in the same manner as in the control system of FIGURE 5. For that reason, there is no need at this time to repeat the description of the connections between these circuit elements.

The differentiator 512 is also connected to the delay lines 536 and 538 so that the flip-flop 390 may be triggered to its false state for the first card released from the station 94 and then may be triggered to its true state for the card subsequently released from the station 80. This enables the data at the selected position on the card from the station 94 to be set up in the register consisting of the flip-flops 392, 394 and 395 in FIGURE 9a, and it enables the data at the selected position on the card from the station 80 to be set up in the register comprising the flip-flops 396, 398 and 400.

The output terminal of the "and" network 1200 is connected to an "or" network 1206. The "or" network 1206 is connected to the delay line 412 which, as before, is connected to the "or" network 416 associated with the flip-flop 418 controlling the gate 56.

The output terminal of the "and" network 1200 is also connected to the delay line 446 whose output terminal is connected to the "or" network 450. This connection enables the flip-flop 390 to be triggered to its true state whenever a pulse appears on the lead 404 indicating that the data on the card from the station 94 is greater than the data on the compared card from the station 80.

The output terminal of the "and" network 1200 is also connected to an "or" network 1208 which is connected to the input terminal of the delay line 414. The delay line 414 is, as before, connected to the "or" network 426 to control the operation of the flip-flop 428 which, in turn, controls the gate 40. Finally, the "and" network 1200 is connected to an "and" network 1220. The "and" network 1200 is connected to an "or" network 1221. The "or" network 1221 is connected to the left input terminal of the flip-flop 454. This flip-flop 454, as before, controls the gate 64.

The output terminal of the "and" network 1204 is connected to the delay line 462. This delay line, as in the embodiment of FIGURE 5, is connected to the "or" network 466. The "or" network 466 is connected to the right input terminal of the flip-flop 390 to trigger that flip-flop to its false state. This occurs when the data on a card released from the station 80 is greater than the data on a card from the station 94 being circulated on the drum 16.

The "or" network 466 is connected to the right input terminal of the flip-flop 390 over the lead 391, and the "or" network 450 is connected to the left input terminal of the flip-flop 390 over the lead 393.

The "and" network 1204 is also connected to the "or" network 482 associated with the flip-flop 490 controlling the feed from the station 94, and the "and" network 1204 is further connected to an "or" network 1210. The "or" network 1210 is connected to the delay line 484 which, in turn, is connected to the "or" network 498 to control the flip-flop 500 which, in turn, controls the gate 48.

The "and" network 1204 is further connected to a delay line 1212, and the delay line 1212 is connected to the left input terminal of a flip-flop 1214 and to the input terminal of a delay line 1216. The output terminal of the delay line 1216 is connected to the right input terminal of the flip-flop 1214.

The left output terminal of the flip-flop 1214 is connected to the control grid of a triode 1216. A resistor 1218 is connected to the control grid of the triode 1216 and to the negative terminal of the source 426 of direct voltage.

The energizing winding of the solenoid valve 38 is incorporated in the anode circuit of the triode 1216. This solenoid valve, as shown in FIGURE 1, controls the gate 36, which, in turn, controls the transfer of cards from the drum 10 to the drum 12.

The "and" network 1204 is further connected to an "and" network 1222. The "and" network 1222 is connected to the left input terminal of a flip-flop 1224 and to the input terminal of a delay line 1226. The output terminal of the delay line 1226 is connected to the right input terminal of the flip-flop 1224.

The left output terminal of the flip-flop 1224 is connected to the control grid of a triode 1228. The cathode of the triode 1228, as are the cathodes of all the other triodes, is connected to ground. A resistor 1230 has one terminal connected to the control grid of the triode 1228, and the other terminal of this resistor is connected to the negative terminal of the source 426. The anode of the triode 1228 is connected to one terminal of the energizing coil associated with the solenoid valve 78. The other terminal of this coil is connected to the positive terminal of the source 426. The solenoid valve 78 controls the activation of the gate 74, as shown in FIGURE 1, and this controls the transfer of cards from the drum 16 to the drum 12.

The output terminal of the "and" network 1222 is also connected to a delay line 1232, and the output terminal of this delay line is connected to the "or" network 472 associated with the flip-flop 474 of the gate 66. The output terminal of the "and" network 1222 is also connected to a delay line 1234. The output terminal of this latter delay line is connected to an input terminal of the "or" network 416 associated with the flip-flop 418 of the gate 56.

The right output terminal of the flip-flop 390 of FIGURE 9a is connected by way of the lead 391a to the "and" network 1220. The left output terminal of the flip-flop 390 is connected by the lead 393a to an input terminal of the "and" network 1222.

The output terminal of the "and" network 1202 is connected to an "and" network 1236 and to an "and" network 1238. The "and" network 1236 is connected to the "or" network 482 associated with the flip-flop 490 of the station 94 and to the "or" network 1210. The "and" network 1238, on the other hand, is connected to the "or" network 536 associated with the flip-flop 438 of the station 80 and to the "or" network 1208. The right output terminal of the flip-flop 390 of FIGURE 9a is connected by the lead 391a to the "and" network 1236. The left output terminal of the flip-flop 390 is connected by the lead 393a to the "and" network 1238.

The "and" network 1202 is further connected to the "or" network 1221. The output terminal of the "and" network 1220 is also connected to a delay line 1227. This delay line is connected to the "or" network 472 associated with the flip-flop 474 of the gate 66.

As stated above, the two stacks of cards to be collated are placed respectively in the stations 80 and 94. The successive cards in each of the stacks are arranged to be in an ascending order with respect to the decimal numbers at the selected position on each card.

The selector 356 of FIGURE 9a is adjusted so that the selected position on each card will be processed in the described manner, and the start switch 508 of FIGURE 9b is depressed and released to start the operational cycle. The resulting pulse from the differentiator 512 causes the triode 514 to be momentarily conductive so that a pulse of current flows through each of the control windings 518, 520, 522 and 676. This, in the previously described manner, causes the stations 80 and 94 to be conditioned to a feeding mode, and it causes the stations 85 and 89 to be conditioned to a stacking mode.

The output pulse from the differentiator 512 triggers the flip-flop 490, so that a card is released from the station 94 to the drum 18. At the proper time, the delay line 524 produces an output pulse so that the gate 48 is activated to transfer the released card to the central drum 10 for processing by the transducer means 303. The binary data at the selected position of the card is set up in the register of the flip-flops 392, 394 and 395, the output pulse from the differentiator 512 causing the delay line 536 to develop a pulse at the proper time for passage through the "or" network 466 to trigger the flip-flop 390 to its false state so that the data from the first card is fed to that register. The false state of the flip-flop 390 is represented by a relatively high voltage on the right output terminal of the flip-flop and a relatively low voltage on the left output terminal of the flip-flop. The delay line 526 now develops a pulse to activate the gate 56 at the proper time to transfer the first card to the drum 14. Then, the delay line 530 develops a pulse in response to the start pulse so that the gate 66 is energized and the first card is transferred to the drum 16 to be circulated on that drum.

The delay line 532 then develops an output pulse to release a card from the station 80. This latter card is carried by the drum 20 to the gate 40, and the delay line 534 develops a pulse at the proper time to energize this gate and transfer the card to the drum 10 for processing by the transducer means 303.

The delay line 538 develops an output pulse a proper time after the passage of the pulse through the delay line 536 so that the flip-flop 390 is triggered to its true state and the data on the card from the station 80 is registered in the register of the flip-flops 396, 398 and 400 to be compared with the data on the circulated card from the station 94. Then the delay line 528 produces a pulse to activate the gate 56 and transfer the card to the drum 14.

Assuming that the data on the card from the station 80 is less than that on the first circulated card, the "and" network 1200 will develop an output pulse. The gate 66 is not energized by this output pulse so that the card from the station 80 is carried by the drum 14 to the station 89 and deposited in that station. The pulse from the "and" network 1200 is introduced to the "or" network 536 so that a second card may be released from the station 80. Now the second card from the station 80 approaches the gate 40, and the delay line 414 develops a pulse at the proper time to activate this gate and transfer the second card to the drum 10 for processing by the transducer means 303. The delay line 446 develops an output pulse which is ineffective because the flip-flop 390 of FIGURE 9a is already in its true state. The data on the second card therefore replaces the data on the previous card in the register of the flip-flops 396, 398 and 400. Then the delay line 412 develops an output pulse to transfer the last card to the drum 14. Assuming that the data on this last card from the station 80 is still less than the data on the card from the station 94 which is being circulated on the drum 16, this latter card from the station 80 is also carried by the drum 14 and deposited in the station 89, Therefore, cards are successively released from the station 80 and deposited in ascending order in the station 89 as long as the data on these cards is less than that on the circulated card from the station 94.

Should a card selected from the station 80 now have data equal to the data on the circulated card, the "and" network 1202 will develop an output pulse. This output pulse is introduced first through the "or" network 1221 to the flip-flop 454 to activate the gate 64. This gate is so activated for a time sufficient to transfer the circulated card from the station 94 to the drum 14 so that the card may be deposited in the station 89. Also, the last card from the station 80 is transferred to the drum 14 due to the activation of the gate 56 through the delay line 412, and this last card is then deposited in the station 89, as is desired.

The output pulse from the "and" network 1202 is also translated by the "and" network 1238 because the flip-flop 390 is in its true state. This causes a pulse to be applied to the "or" network 536 to release a further card from the station 80, and it also causes a pulse to be applied to the "or" network 1208 so that the delay line 414 may control the flip-flop 428 to activate the gate 40 at the proper time to transfer this latter card to the drum 10.

Now, should the last card from the station 80 be greater than the card from the station 94 which was previously circulated on that drum 16, the "and" network 1204 develops an output pulse. This output pulse from the "and" network 1204 is introduced to the "and" network 1222, and this "and" network is conductive because the flip-flop 390 is in its true state. Therefore, the flip-flop 1224 is actuated. This would normally cause the card circulated on the drum 16 to be transferred by the gate 74 to the drum 12 and deposited in the output station 85. However, the circulated card was previously deposited in the station 89 as described, this being desired because it was an "equal" card.

Therefore, should a card from the station 94 be circulating on the drum 16 and an equal card be drawn from the station 80, the resulting output pulse from the "and" network 1202 is translated by the "and" network 1238 to release another card from the station 80 and cause that card to be transferred to the drum 10 for processing. Also, the card from the station 94 circulating on the drum 16 is transferred to the drum 14 to be deposited in the station 89 due to the pulse through the "or" network 1221 and the resulting activation of the gate 64. Also, the equal card from the station 80 is transferred to the drum 14 due to the activation of the gate 56 through the "or" network 1206 and the delay line 412, and this latter card is also deposited in the station 89.

On the other hand, should a card from the station 80 be circulating on the drum 16, and an equal card from the station 94 be reached, the resulting output pulse from the "and" network 1202 is translated to the "or" network 1221 to activate the gate 64 so that the circulated card may be transferred to the drum 14 to be deposited in the station 89. Also, the pulse from the "and" network 1202 is introduced to the "or" network 1206 so that the gate 56 may be actuated at the proper time to transfer the last card from the station 94 to the drum 14 so that it too may be deposited in the station 89, as is desired. Also, the "and" network 1236 is now conditioned for translation, and the pulse from the "and" network 1202 is passed to the "or" network 482 to release another card from the station 94. The pulse is also passed to the "or" network 498 through the delay line 484 so that the released card may be properly transferred to the drum 10.

In the manner described above, therefore, all the equal cards are deposited in the station 89, regardless of whether these equal cards are drawn from the station 94 or from the station 80. However, so long as a card from the station 94 is being circulated on the drum 16, and so long as the cards drawn from the station 80 are less than the circulated card, the "and" network 1200 develops an output pulse which causes the delay line 412 to activate the gate 56 at the proper time to transfer these lesser cards to the drum 14 to be deposited in the station 89. At this time, the "and" network 1220 is non-conductive so that the gate 64 is not activated and the card from the station 94 remains on the drum 16. However, when a card from the station 80 is reached which exceeds the circulated card from the station 94, the "and" network 1204 develops an output pulse. This latter pulse is translated by the "and" network 1222 to activate the gate 74 to transfer the circulated card from the drum 16 to the drum 12. This causes the circulated card to be deposited in the station 85, which is desired because it is not equal to a card from the station 80. Also, the resulting pulse from the "and" network 1204 activates the gate 56 through the "and" network 1222 and through the delay line 1234. In like manner and at the proper time, the pulse passes through the delay line 1232 to activate the gate 66 and place this last card on the circulating drum 16.

Therefore, the card from the station 80 is now circulated on the drum 16 and cards are successively drawn from the station 94. So long as these latter cards are less than the circulated card, the "and" network 1204 develops an output pulse which is translated through the delay line 1212 to activate the gate 36. This causes the cards from the station 94 to be transferred to the drum 12 and deposited in ascending order in the station 85. This is desired because these cards are unequal to any cards from the station 80.

When a card is reached in the station 94 which is greater than the circulated cards from the station 80, the "and" network 1200 develops an output pulse. This pulse is translated by the "and" network 1220 to activate the gate 64 so that the circulated card may be transferred to the drum 14 to be deposited in the station 89. This is desired because the circulated card was withdrawn from the station 80, and all cards from the station 80 are to be deposited in the station 89.

The pulse from the "and" network 1200 is also applied to the delay line 412. This causes the gate 56 to be activated at the proper time to transfer the last card to the drum 14. The output pulse from the "and" network 1220 is also introduced to the delay line 1227 so that the gate 66 may be activated at the proper time to transfer the last card from the drum 14 to the drum 16. The last card from the station 94, therefore, is now circulated on the drum 16.

It will be appreciated, therefore, that cards are drawn from the station 80 and from the station 94 and circulated on the drum 16 or deposited in the appropriate output stations. When a card from the station 94 is circulated on the drum 16, cards are successively drawn from the station 80 and deposited in the station 89 until they equal or exceed the circulated card. When this occurs, the first card to exceed the circulated card is placed on the drum 16, and the previously circulated card from the station 94 is deposited in the station 85. Then, cards are successively drawn from the station 94 and deposited in the station 85 until they equal or exceed the circulated card. An equal card from the station 94 is deposited in the station 89, whereas an exceeding card replaces the circulated card on the drum 16, and the previously circulated card is deposited in the station 89.

In the manner described above, all the cards from the station 80 are deposited in an ascending sequence in the station 89. Also, cards from the station 94 which have corresponding equal cards from the station 80 are also deposited in the proper order in the station 89. The other cards from the station 94 are deposited in an ascending sequence in the station 85.

The above collating operation is often required in data processing systems. It renders it possible to draw from a sorted stack a group of cards having information bearing on related cards in another stack and causing the withdrawn cards to be properly placed in the latter stack.

It will be appreciated from the foregoing description that the apparatus of the present invention has universal application in that it is capable of performing many different types of sorting, merging and collating operations on one or more stacks of cards. Those control systems have been described which render the apparatus capable of performing some of these functions. It will be appreciated that the universal application of the apparatus is not limited to the particular types and kinds of operations specifically described. Other operations may also be performed by the apparatus. In each instance, the appropriate control systems for the apparatus to cause it to perform a particular function may be selectively switched into circuit with the apparatus by any appropriate switching means. This fact was pointed out previously in the description.

Therefore, by a single apparatus, and associated control and switching systems, all the many desired sorting and other operations on a plurality of cards in a data processing system may be carried out.

Apparatus is shown somewhat schematically in FIGURE 11 for controlling the different types of operations to be performed such as the merging operation of FIGURES 5a and 5b, the sorting-by-merging operations of FIGURES 6a, 6b, 7a and 7b, the sorting operation of FIGURES 8a and 8b and the collating operation of FIGURES 9a and 9b. The circuitry shown in FIGURE 11 includes a pair of flip-flops 1350 and 1352. These flip-flops receive signals through "or" networks from switches 1354, 1356, 1358 and 1360, all of which may be manually and individually operated. The movable contacts of the switches 1354, 1356, 1358 and 1360 may be connected to a pulse source 1362.

The stationary contact of the switch 1354 is connected to input terminals of "or" networks 1364 and 1366 respectively having their output terminals connected to the left input terminals of the flip-flops 1350 and 1352. The signals passing through the switch 1356 are respectively applied to the "or" network 1364 and an input terminal of an "or" network 1368, the output terminal of which is connected to the right input terminal of the flip-flop 1352. The signals passing through the switch 1358 are applied to the "or" network 1366 and to an "or" network 1370 having its output terminal connected to the right terminal of the flip-flop 1350. The "or" networks 1368 and 1370 receive the signals passing through the switch 1360.

The operation of an "and" network 1372 is controlled by the voltages on the left output terminals of the flip-flops 1350 and 1352. The signals from the "and" network 1372 may be applied to the "and" networks shown in FIGURES 5a and 5b to prepare these "and" networks for activation. The connections from the "and" network 1372 to the "and" networks of FIGURES 5a and 5b are not shown for purposes of simplification. Similarly, an "and" network 1374 is adapted to pass a signal upon the simultaneous introduction of high voltages from the left output terminal of the flip-flop 1350 and the right output terminal of the flip-flop 1352. The signals from the "and" network 1374 may be applied to the "and" networks of FIGURES 6a and 6b and the "and" networks of FIGURES 7a and 7b to prepare these networks for activation. Such connections are not shown for purposes of simplification.

An "and" network 1376 has signals applied to it from the left output terminal of the flip-flop 1352 and the right output terminal of the flip-flop 1350. The signals passing through the "and" network 1376 may be applied to the "and" networks of FIGURES 8a and 8b. An "and" network 1378 receives the voltages on the right output terminals of the flip-flops 1350 and 1352. The signals from the "and" network 1378 may pass to the "and" networks of FIGURES 9a and 9b.

When the switch 1354 is closed, the signals from the pulse source 1362 trigger the flip-flops 1350 and 1352 to the true states. This causes the "and" network 1372 to become opened so as to prepare the "and" networks of FIGURES 5a and 5b for activation. In this way, the closure of the switch 1354 causes a merging operation to be performed. This is illustrated in FIGURE 12 by simultaneous indications of "1" for the flip-flops 1350 and 1352 to represent true states of operation of these flip-flops.

In like manner, the closure of the switch 1358 in FIGURE 11 causes the flip-flop 1350 to be triggered to the false state and the flip-flop 1352 to be triggered to the true state. This initiates a sorting operation, as may be seen from the table shown in FIGURE 12. It is believed that the initiation of the other operations will be apparent from the subsequent discussions.

In order to initiate an operation, the proper one of the switches 1354, 1356, 1358 and 1360 should initially be closed. Subsequently the proper switch in the circuits shown between FIGURES 5 and 9 should be closed. For example, the switch 508 in FIGURE 5b should be closed to initiate a merging operation. It should be appreciated that the switches 1354 and 508 can be ganged so that they simultaneously close. Actually both switches can be combined in a single switch which would select the sorting operation as well as initiate this operation.

The controls for converting the stations in FIGURES 5 to 9, inclusive, between their feeding and stacking modes are shown somewhat schematically in these figures for purposes of simplification. FIGURE 13 illustrates in further detail the controls for converting the input station 80 in FIGURE 8b between the feeding and stacking modes. It will be appreciated that similar circuitry can be used for the other stations in the various figures. A complete system for controlling the operation of these stages is also shown and fully disclosed in copending application Serial No. 645,639.

In the control system of FIGURE 13, the energizing winding 518 for the station 80 is shown as a relay winding controlling the operation of a single-pole, double-throw switch 1400. The armature of the switch 1400 is connected to the positive terminal of the source of direct voltage 426. The right stationary contact of the switch 1400 is connected to the first terminal of a capacitor 1402 and the left stationary contact of the switch 1402 is connected to the first terminal of a capacitor 1404. The second terminal of the capacitors 1402 and 1404 are connected to respective input terminals of an "or" network 1406. The output terminal of the "or" network 1406 is connected to one terminal of a solenoid 1408 having its other terminal grounded.

Whenever the tube 1044 is rendered conductive so as to energize the relay winding 518, the relay winding acts on the armature of the switch 1400 to produce an engagement between the armature and the left stationary contact of the switch. This causes the capacitance 1404 to be charged by a current pulse which also flows through the "or" network 1406 and the solenoid 1408. This current pulse is of a transient nature and it persists until the capacitor 1404 becomes charged. The circuit parameters including those for the capacitor 1404 are chosen so that the pulse persists just long enough to cause the solenoid 1408 to actuate a clutch in the reversible station. This clutch engages mechanisms (not shown) which condition the station 80 to the feeding mode.

Subsequently, when the tube 1044 is rendered non-conductive, the resulting de-energizing of the winding 518 causes the armature of the switch 1400 to shift into engagement with the right stationary contact. This causes a transient current pulse to flow through the capacitor 1402 and the energizing winding of the solenoid 1408. When the winding of the solenoid 1408 again becomes energized, it actuates the clutch (not shown) in the reversible station. The clutch then engages mechanisms for returning the station of the stacking mode.

A resistance 1410 is shown in FIGURE 13 as being connected across the capacitor 1404 to provide a discharge path for the capacitor when the armature of the switch 1400 shifts into position to engage the right stationary contact. The resistance 1410 has a sufficiently high value to prevent the winding of the solenoid 1408 from being energized after the capacitor 1404 has become charged during the time that the armature of the switch 1400 is engaging the left stationary contact in FIGURE 13. However, the resistance 1410 has a sufficiently low value to discharge the capacitor 1404 in a relatively short time when the armature of the switch 1400 engages the right stationary contact. In this way, the capacitance 1404 will become quickly prepared to receive another charging pulse.

A resistance 1412 having a value corresponding to that of the resistance 1410 may be connected in parallel with the capacitance 1402 to perform a function similar to that of the resistance 1410. Therefore, each time that the winding 518 is energized, the transfer control mechanism is actuated to condition the station 80 into the feeding mode. Alternately, each time that the winding 518 is de-energized, the station 580 is controlled to function in its stacking mode.

We claim:

1. In apparatus for processing a plurality of information storage cards in a number of different individual operations such as sorting and various types of collating and for obtaining only one of the different individual operations at any instant, the combination of: control means including electrical circuitry for providing signals representing the different individual types of operations to be performed, transport means constructed to obtain a controlled movement of the cards, means including at least a first pair of card holders and including first transfer members coupled to the first pair of card holders and disposed relative to the transport means for obtaining a controlled transfer of cards from the first pair of card holders to the transport means, means including at least a second pair of card holders and including second transfer members coupled to the second pair of card holders and disposed relative to the transport means for obtaining a controlled transfer of cards from the transport means to the second pair of card holders, transducing means responsive to particular information on the transported cards to sense such particular information, electrical circuitry coupled to the transducing means and responsive to the signal indications from the control means for processing the particular information on the cards in accordance with the type of operation being performed, and means including electrical circuitry coupled to the processing means and responsive to the signals from the control means for obtaining a controlled operation of the first transfer members and the second transfer members to obtain a controlled transport of the cards in paths dependent upon the processed information on the cards and upon the type of operation being performed.

2. In apparatus for processing a plurality of information storage cards in a number of different individual operations such as sorting and various types of collating and for obtaining only one of the different individual operations at any instant, the combination of: control means for providing signal indications representing the different individual types of operations to be performed, transport means constructed to provide a movement of cards, transducing means disposed relative to the transport means for sensing particular information on the cards transferred to the transport means, means including a plurality of card holders each disposed relative to the transport means for providing a transfer of cards between the transport means and the card holders and each constructed to hold the cards in stacked relationship in the card holders and each including transfer members operative in a first relationship to obtain a transfer of cards from the transport means to an associated one of the card holders in the plurality and operative in a second relationship to obtain a transfer of cards from the associated card holder in the plurality to the transport means, means including first electrical circuitry responsive to the particular information sensed on the cards by the transducing means and responsive to the signals from the control means for processing the cards in accordance with the particular information on the cards and the type of operation to be performed, means including second electrical circuitry coupled to the first electrical circuitry and to the control means for obtaining an operation of first particular transfer members in the plurality in the first relationship and an operation of second particular transfer members in the plurality in the second relationship to obtain first individual paths of movement of the cards in accordance with the processed information and the particular type of operation being performed, and means responsive to each transport of the cards from the card holders associated with the first particular transfer members in the plurality to the card holders associated with the second particular transfer members in the plurality in the particular type of operation being performed for obtaining an operation of the first particular transfer members in the second relationship and an operation of the second particular transfer members in the first relationship to provide second individual paths of movement of the cards in accordance with the information processed on the cards and with the particular type of operation being performed.

3. In apparatus for processing a plurality of information storage cards in a number of different individual operations such as sorting and various types of collating and for obtaining only one of the different operations at any instant, the combination of: a plurality of transport means constructed to provide a movement of the cards and disposed in paired relationship, means including a plurality of card holders each disposed relative to the transport means to obtain a transfer of cards between the transport means and the card holder and each constructed to hold cards in stacked relationship and each including an input transfer member coupled to the cards in the card holder to obtain a controlled transfer of cards from the card holder to the transport means and each including an output transfer member coupled to cards on the transport means to obtain a controlled transfer of cards from the transport means to the card holder, control means including electrical circuitry for providing signal indications having distinctive characteristics for each different type of operation to be performed, transducing means coupled to the cards on the transport means for producing signal indications representing particular information on such cards, means including a plurality of gate transfer members coupled to different pairs of the transport means in the plurality and each operative upon actuation to obtain a transfer of cards from one of the transport means in the associated pair to the other transport means in the associated pair, and means including electrical circuitry responsive to the signals from the transducing means and from the control means and coupled to the input transfer members associated with particular card holders in the plurality and to the output transfer members associated with other card holders in the plurality and coupled to the gate transfer members in the plurality for operating upon the input transfer members associated with the particular card holders and for operating upon the output transfer members associated with the other card holders in the plurality and for operating upon particular ones of the gate transfer members in the plurality to obtain an individual transport of the cards along first individual paths from the particular card holders in the plurality to the other card holders in the plurality in accordance with the type of operation being performed and in accordance with the signal indications from the transducing means, and means responsive to the transfer of the cards from the particular card holders in the plurality to the other card holders in the plurality for operating upon the input transfer members associated with the other card holders in the plurality and for operating upon the output transfer members associated with the particular card holders in the plurality and for operating upon particular gate transfer members in the plurality to obtain an individual transport of the cards in second individual paths from the other card holders to the particular card holders in accordance with the type of operation being performed and in accordance with the signal indications from the transducing means.

4. In apparatus for processing a plurality of information storage cards in a number of different individual operations such as sorting and various types of collating and for obtaining only one of the different operations at any instant, the combination of: a central transport member constructed to obtain a guided transport of the cards in accordance with the configuration of the transport member, means including a plurality of auxiliary transport members disposed in paired relationship to the central transport member and to one another to provide a transfer of cards between the central transport member and the auxiliary transport members in the plurality and between different auxiliary members in the plurality, means including at least a pair of input card holders disposed in coupled relationship to first particular ones of the auxiliary transport members in the plurality and including input transfer members disposed in coupled relationship to the input card holders for providing a controlled transfer of cards from the input card holders to the first particular transport members, means including at least a pair of output card holders disposed in coupled relationship to second particular ones of the auxiliary transport members in the plurality and including output transfer members disposed in coupled relationship to the second particular auxiliary transport members and the output card holders for obtaining a controlled transfer of cards from the second particular transport members to the output card holders, a plurality of gate transfer means disposed between the paired transport members for obtaining a controlled transfer of cards between the paired transport members, control means including electrical circuitry for providing signals having distinctive characteristics representing the different types of processing operations to be performed, means including electrical circuitry responsive to the signals from the control means for processing particular information on the cards transferred to the central transport member in accordance with the type of operation being performed, and means including electrical circuitry coupled to the control means and the processing means for activating particular ones of the input transfer members, particular ones of the gate transfer means in the plurality and particular ones of the output transfer members to obtain an individual movement of the cards in different paths from the input card holders to the first particular auxiliary transport members in the plurality, the central transport member, the second particular transport members in the plurality and the output card holders and to obtain such individual movements of the cards in the different paths in accordance with the type of operation being performed and the information processed on the transported cards.

5. In apparatus for processing a plurality of information storage cards in a number of different individual operations such as sorting and various types of collating and for obtaining only one of the different operations at any instant, the combination of: control means for providing signal indications representing the different types of operations to be performed, a plurality of movable transport means each constructed to provide a movement of cards with the transport means, the transport means in the plurality being disposed in paired relationship, a plurality of gate transfer means each disposed between a different pair of transport means in the plurality for providing a transfer of cards between one of the transport means in the pair and the other transport means in the pair, a plurality of card holders disposed in coupled relationship to the different transport means and constructed to hold cards in stacked relationship and to provide a transfer of cards between the card holders and the transport means coupled to the card holders, transfer means disposed in cooperative relationship with the transport means and the card holders and operative in a first relationship to obtain a controlled transfer of cards from the card holders to the transport means and operative in a second relationship to obtain a controlled transfer of cards from the transport means to the card holders, processing means coupled to the control means for processing selected information on the transported cards in accordance with the type of operation to be performed, means including electrical circuitry responsive to the signals from the processing means and the control means for operating upon different gate transfer means in the plurality and upon the transfer means for the different card holders in the plurality to obtain first movements of the cards in different and individual paths from first particular card holders in the plurality to second particular card holders in the plurality in accordance with the type of operation being performed and the information processed on the transported cards, and means including electrical circuitry responsive to the movement of the cards from the first card holders in the plurality to the second card holders in the plurality for operating upon different gate transfer means in the plurality and upon the transfer means to obtain second movements of the cards in different and individual paths from the second particular card holders in the plurality to the first particular card holders in the plurality in accordance with the type of operation being performed and the information processed on the cards.

6. In apparatus for processing a plurality of information storage cards in a number of different individual operations such as sorting and various types of collating and for obtaining only one of the different operations at any instant, means including a plurality of transport members disposed in paired relationship to one another and constructed to provide a movement of cards along paths defined by the transport members, gate transfer means disposed in coupled relationship to the different pairs of transport members in the plurality to provide a controlled transfer of cards between the paired transport members, at least a pair of input card holders disposed relative to first particular transport members in the plurality to obtain a transfer of cards from the input card holders to the first particular transport members, input transfer means disposed relative to the cards in the input card holders for providing a controlled transfer of cards from the input card holders to the first particular transport members in the plurality, at least a pair of output card holders disposed relative to second particular transport members in the plurality to obtain a transfer of cards from the second particular transport members to the output card holders, output transfer means disposed in coupled relationship to the cards on the second transport members in the plurality for providing a controlled transfer of cards from the second particular transport members in the plurality to the output card holders, transducing means disposed relative to the transport members in the plurality for sensing particular information on the cards transferred to the transport members, selection means including electrical circuitry for controlling the selection of the different processing operations, means including electrical circuitry coupled to the selection means and responsive to the particular information sensed by the transducing means for processing the particular information in accordance with the type of operation to be performed, and means including electrical circuitry coupled to the selection means and to the processing means and operative upon the gate transfer means and upon the input transfer means and the output transfer means to obtain a controlled transfer of cards from the different input card holders and to obtain movements of the transferred cards along different paths dependent upon the operation of the gate transfer means and to obtain the transfer of cards to the different output card holders in accordance with the type of operation being performed and the processing of the particular information on the transported cards.

7. In apparatus for processing a plurality of information storage cards in a number of different individual operations such as sorting and various types of collating and for obtaining only one of such different individual operations at any one time, the combination of: means including a central transport member constructed to provide a transport of the cards, means including a plurality of auxiliary transport members disposed relative to the central transport member for providing a transfer of cards between the central transport member and the auxiliary transport members and constructed to provide a transport of the cards, a plurality of gate transfer means each disposed relative to the central transport member and a particualr one of the auxiliary transport members to obtain a transfer of cards between these members, a plurality of card holders each disposed relative to an individual one of the auxiliary transport members in the plurality to obtain a transfer of cards between that card holder and the individual auxiliary transport member and constructed to hold cards in stacked relationship, a plurality of transfer means each associated with a different one of the card holders in the plurality and with a different one of the auxiliary transport members in the plurality and operative in one relationship to obtain a transfer of cards from the associated auxiliary transport member to the associated card holder and operative in a second relationship to obtain a transfer of cards from the associated card holder to the associated auxiliary transport member, transducing means coupled to the cards on the central transport member for sensing particular information on such cards during each movement of the cards past the transducing means, control means including electrical circuitry for providing signal indications individually representing the different types of operation to be performed, and means responsive to the signal indications representing the operation being performed and responsive to the particular information sensed by the transducing means for activating particular ones of the gate transfer means in the plurality and the different transfer means for the card holders in particular ones of the first and second relationships to control the particular paths of movement of the cards in accordance with the particular operation being performed and in accordance with the particular information sensed by the transducing means.

8. In apparatus for processing a plurality of information storage cards in a number of different individual operations such as sorting and various types of collating and for obtaining only one of such different individual operations at any one time, the combination of: means including a transport member for providing a movement of cards in a path defined by the transport member, a card holder disposed relative to the transport member to provide a transfer of cards between the transport member and the card holder and constructed to hold a plurality of cards in stacked relationship, transfer means operative in a first relationship to obtain a transfer of cards into the card holder from the transport member and operative in a second relationship to obtain a transfer of cards from the card holder to the transport member, control means for providing signals having distinctive characteristics representing the different individual types of operations to be performed, and means including electrical circuitry responsive to the signals from the control means for operating upon the transfer means to convert the card holder into an input card holder for the transfer of cards into the card holder at particular times in accordance with the type of operation to be performed and to convert the card holder into an output card holder at other times for the transfer of cards from the card holder in accordance with the particular type of operation being performed.

9. In apparatus for processing a plurality of information storage cards in a number of different individual operations such as sorting and various types of collating and for obtaining only one of such different individual operations at any one time, the combination of: a plurality of transport means each constructed to provide a movement of the cards, the transport means in the plurality being disposed in paired relationship to provide a transfer of cards from each of the transport means in each pair to the other, a plurality of gate transfer means each disposed in coupled relationship to the transport means in a different pair and operative upon activation to obtain a transfer of cards from a particular one of the transport means in the pair to the other, control means for providing signal indications having distinctive characteristics to represent the different types of operations to be performed, transducing means disposed in coupled relationship to the cards on particular transport means in the plurality for sensing particular information on the cards being transported at any instant, and means including electrical circuitry responsive to the particular information sensed on the transported cards by the transducing means and responsive to the signal indications from the control means for obtaining a controlled operation of different gate transfer means in the plurality to produce different paths of movement of the cards in accordance with the particular information sensed on the cards and in accordance with the particular type of operation being performed.

10. In apparatus for processing a plurality of information storage cards in a number of different operations such as sorting and various types of collating and for obtaining only one of such different individual operations at any one time, the combination of: a plurality of transport means each constructed to provide a movement of the cards, the transport means in the plurality being disposed in paired relationship to provide a transfer of cards from one of the transport means in each pair to to the other transport means in the pair, a plurality of gate transfer means each disposed between the transport means in a different pair and operative upon actuation to obtain a transfer of cards from a particular one of the transport means in the pair to the other, control means for providing signal indications individually representing the different types of operation to be performed, transducing means responsive to particular information on the cards on the transport means in the plurality for sensing such particular information, and means responsive to the signal indications from the control means and responsive to the particular information sensed on the transported cards for activating particular ones of the gate transfer means to obtain distinctive paths of movement of the cards between the different transport means in the plurality in accordance with the type of operation to be performed and in accordance with the particular information.

11. In apparatus for processing a plurality of information storage cards in a number of different operations such as sorting and various types of collating operations and for obtaining only one of such different individual operations at any one time, the combination of: transport means constructed to provide a transport of the cards, at least a first card holder constructed to hold cards in stacked relationship, first input transfer means coupled to the card in the first card holder for obtaining a controlled transfer of cards from the card holder to the transport means, first output transfer means coupled to the cards on the transport means for obtaining a controlled transfer of cards into the first card holder from the transport means, at least a second card holder constructed to hold cards in stacked relationship, second input transfer means coupled to the cards in the second card holder for obtaining a controlled transfer of cards from the second card holder to the transport means, second output transfer means coupled to the cards on the transport means for obtaining a controlled transfer of cards into the second card holder from the transport means, control means for providing signal indications individually representing the different types of operation to be performed, and means responsive to the signal indications from the control means for activating a particular one of the first input and output transfer means and a particular one of the second input and output transfer means to obtain the transfer of cards from a particular one of the first and second card holders and a transfer of cards into the other one of the first and second card holders in a particular relationship dependent upon the type of operation being performed.

12. In apparatus for processing a plurality of information storage cards, the combination of: central transport means constructed to provide a movement of the cards in a path defined by the transport means, a plurality of auxiliary transport means positioned in paired relationship to said central transporting means and constructed to provide a movement of cards in paths defined by the auxiliary transport means, a plurality of card holding means each disposed relative to a different one of said auxiliary transport means for providing a transfer of cards between said auxiliary means and said card holding means, a plurality of transfer means each disposed relative to a different one of the card holding means in the plurality and relative to a different one of the auxiliary transport means to obtain a controlled transfer of cards between the associated card holding means and the auxiliary transport means, first coupling transport means positioned adjacent first and second of said auxiliary transporting means in the plurality for providing a transfer of cards between said first and second auxiliary transport means, second coupling transport means positioned adjacent third and fourth of said auxiliary transporting means in the plurality for providing a transfer of cards between said third and fourth auxiliary transport means, transducer means positioned adjacent said central transport means for sensing particular information on the transported cards, a plurality of gate transfer means each coupled to the transport means in a different one of the pairs of transport means to obtain a transfer of cards between the transport means in the pair, and means responsive to the particular information sensed by the transducer means for obtaining a controlled operation of the gate transfer means in the plurality and the transfer means in the plurality to provide a transfer of cards between different ones of said transport means and different ones of the card holders in the plurality in accordance with such particular information.

13. In apparatus for processing information cards, the combination of: means including a central, rotatable, vacuum-pressure transporting drum for obtaining a movement of the cards; means including a plurality of auxiliary, rotatable vacuum-pressure transporting drums positioned in paired relationship to said central drum and to one another for obtaining a movement of the cards; reversible means including a plurality of card holders each coupled to a different one of said auxiliary drums for obtaining a controlled transfer of cards to the coupled card holder from the associated drum and for obtaining a controlled transfer of cards from the coupled card holder to the associated drum; means including at least one rotatable vacuum-pressure circulating transporting drum positioned relative to at least two of said auxiliary drums for providing a paired relationship with these auxiliary drums and for obtaining a transfer of cards between the auxiliary drums; transducer means positioned relative to said central drum for sensing particular information on the cards transported by the central drum; a plurality of gate transfer means each disposed relative to a different pair of said transporting drums for obtaining a controlled transfer of cards between the transporting drums in the pair; and means including electrical circuitry responsive to the particular information sensed by the transducing means for operating upon particular ones of the gate transfer means in the plurality and the reversible means to obtain a controlled transfer of cards between different pairs of the drums for an individual movement of the cards between different card holders in the plurality in accordance with the particular information sensed by the transducer means.

14. In apparatus for processing information cards, the combination of: means including a central, rotatable, vacuum-pressure transporting drum for obtaining a movement of the cards in accordance with the movement of the drum; means including a plurality of rotatable, vacuum-pressure, auxiliary transporting drums positioned in paired relationship to said central drum for obtaining a movement of the cards in accordance with the movements of the drums; means including a plurality of card holders each associated with a different one of said auxiliary drums in the plurality; a plurality of control means each disposed relative to a different one of the card holders in the plurality and to the associated one of the auxiliary drums in the plurality and operative in a first relationship to obtain a transfer of cards from the associated card holder to the associated auxiliary drum and operative in a second relationship to obtain a controlled transfer of cards from such associated auxiliary drum to the associated card holder; means including a first rotatable, vacuum-pressure, circulating transporting drum positioned relative to first and second of said auxiliary drums in the plurality for providing a transfer of cards between said first and second auxiliary drums; means including a second rotatable, vacuum-pressure, circulating transporting drum positioned relative to third and fourth of said auxiliary drums in the plurality for providing a transfer of cards between said third and fourth auxiliary drums, transducer means positioned relative to said central transporting drum for sensing particular information on the cards transported by the drum; gate transfer means disposed relative to the paired drums for controllably obtaining the transfer of cards between the transporting drums in the pairs; means for providing control signals representing the different types of operations to be performed such as sorting and various types of collating; and means including electrical circuitry responsive to the particular information sensed on the transported cards by the transducing means and responsive to the control signals for operating upon the gate transfer means and upon the control means for the different card holders in the plurality to obtain a controlled and individual movement of the cards between the different card holders in the plurality in accordance with the particualr information and the type of operation being performed.

15. In apparatus for processing information on a plurality of information storage cards, the combination of: transport means constructed to provide a movement of the cards, means including a pair of input card holders disposed relative to the transport means and constructed to hold cards in stacked relationship and to provide a transfer of cards from the input card holders to the transport means, means including a pair of output card holders disposed relative to the transport means and constructed to hold cards in stacked relationship and to provide a transfer of cards from the transport means to the output card holders, transducing means disposed relative to the transport means to sense particular information on the transported cards, and means including electrical circuitry coupled to the transducing means for comparing the particular information sensed on cards being concurrently transported from the pair of input card holders and for obtaining a transfer of these cards to a particular one of the output card holders until a particular result in the comparison and for subsequently obtaining a transfer of these cards to the other output card holder until the particular result in the comparison to simultaneously obtain a merging and sorting operation.

16. In apparatus for processing information on a plurality of information storage cards, the combination of: transport means constructed to provide a movement of the cards, means including first and second card holders constructed to hold cards in stacked relationship and disposed relative to the transport means to provide a transfer of cards between the card holders and the transport means, first and second transfer means associated with the first and second card holders and operative in a first relationship to obtain a transfer of cards from the card holders to the transport means and operative in a second relationship to obtain a transfer of cards from the transport means to the card holders, means including third and fourth card holders constructed to hold cards in stacked relationship and disposed relative to the transport means to obtain a transfer of cards between the third and fourth card holders and the transport means, third and fourth transfer means associated with the third and fourth card holders and operative in a first relationship to obtain a transfer of cards from the third and fourth card holders to the transport means and operative in a second relationship to obtain a transfer of cards from the transport means to the third and fourth card holders, transducing means disposed relative to the transport means to sense particular information on the transported cards, means including electrical circuitry coupled to the transducing means for comparing the information sensed on cards being concurrently transported to obtain control signals representing the results of the comparison, means including electrical circuitry coupled to the comparison means for operating on the first, second, third and fourth transfer means to obtain a merger of the cards from the first and second card holders into the third card holder until a first particular result in the comparison and then a merger of cards from the first and second card holders into the fourth card holder until the next occurrence of the first particular result in the comparison and subsequently into the third and fourth card holders in sequence until successive occurrences of the first particular result in the comparison, and means including electrical circuitry coupled to the comparison means and responsive to the transfer of all of the cards from the first and second card holders into the third and fourth card holders for operating upon the first, second, third and fourth transfer means to obtain a merger of the cards from the third and fourth card holders into the first card holder until a second particular result in the comparison and then a merger of cards from the third and fourth card holders into the second card holder until the next occurrence of the second particular result in the comparison and subsequently into the first and second card holders in sequence until successive occurrences of the second particular result in the comparison.

17. In apparatus for processing information on a plurality of information storage cards, a plurality of transport means each constructed to provide a movement of the cards, the transport means in the plurality being disposed in paired relationship, a pair of input card holders constructed to hold cards in stacked relationship and disposed relative to the transport means to obtain a controlled transfer of cards between the transport means and the card holders, input transfer means disposed relative to the cards in the input card holders to obtain a controlled transfer of cards from the input card holders to the transport means, a pair of output card holders constructed to hold cards in stacked relationship and disposed relative to the transport means to obtain a controlled transfer of cards between the transport means and the output card holders, output transfer means disposed relative to the cards on the transport means to obtain a controlled transfer of cards from the transport means to the output card holders, gate transfer means disposed between pairs of transport means in the plurality and operative upon activation to obtain a transfer of cards from each of the transport means in the pair to the other transport means in the pair, transducing means disposed in coupled relationship to the cards on the transport means to sense particular information on the cards transferred to the transport means, comparison means including electrical circuitry responsive to the information sensed by the transducing means for comparing the information on cards being concurrently transported to produce control signals in accordance with such comparison, and means including electrical circuitry responsive to the control signals from the comparison means for operating upon particular ones of the gate transfer means and upon the input transfer means and the output transfer means at each instant in accordance with the control signals from the comparison means to obtain a movement of cards from the input card holders to only a particular one of the output card holders between first alternate pairs of successive occurrences of a control signal representing particular results for the comparison of the cards being concurrently transported and to obtain a movement of the cards from the input card holders to the other output card holder between the other pairs of successive occurrences of a control signal representing the particular results for the comparison of the cards being concurrently transported.

18. In apparatus for processing information on a plurality of information storage cards, central transport means constructed to provide a transport of the cards, a plurality of auxiliary transport means disposed in coupled relationship to the central transport means to provide a paired relationship with the central transport means and constructed to provide a movement of the cards, a plurality of gate transfer means disposed between the coupled pairs of transport means and operative upon activation to provide a transfer of cards between the coupled transport means, first and second card holders constructed to hold a plurality of cards in stacked relationship and respectively disposed relative to first particular ones of the auxiliary transport means to provide a transfer of cards between the card holders and the transport means, first and second transfer means operative in a first relationship respectively to provide a transfer of cards from the first and second card holders to the first particular auxiliary transport means and operative in a second relationship to provide a transfer of cards from the first particular auxiliary transport means into the first and second card holders, third and fourth card holders constructed to hold a plurality of cards in stacked relationship and respectively disposed relative to second particular ones of the auxiliary transport means to obtain a transfer of cards between the third and fourth card holders and the second particular ones of the auxiliary transport means, third and fourth transfer means operative in a first relationship respectively to provide a transfer of cards from the third and fourth card holders to the second particular auxiliary transport means and operative in a second relationship to provide a transfer of cards from the second particular transport means into the third and fourth card holders, transducing means disposed in coupled relationship to the cards on the central transport means to sense particular information on the cards transferred to the transport means, comparison means responsive to the particular information sensed by the transducing means for comparing the particular information on successive cards transferred to the central transport means to produce control signals in accordance with such comparison, and means responsive to the control signals from the comparison means for operating upon the gate transfer means and the first, second, third and fourth transfer means to obtain a transfer of a sequence of cards in the plurality from the central transport means alternately to one of the third and fourth card holders and then alternately to the other one of the third and fourth card holders upon each occurrence of first control signals representing first particular results in the comparison between successive cards from the same one of the first and second card holders and to obtain a transfer of a sequence of cards in the plurality to the central transport means alternately from one of the first and second card holders and then alternately from the other one of the first and second card holders upon each occurrence of second control signals representing second particular results in the comparison between successive pairs of cards from the first and second card holders.

19. In apparatus as set forth in claim 18, means operative upon the transfer of the cards from the first and second card holders to the third and fourth card holders and responsive to the control signals from the comparison means for operating upon the gate transfer means and the first, second, third and fourth transfer means to obtain a transfer of a sequence of cards in the plurality from the central transport means alternately to one of the first and second card holders and then alternately to the other one of the first and second card holders upon each occurrence of third control signals representing third particular results in the comparison of the particular information on successive cards from the same one of the third and fourth card holders and to obtain a transfer of a sequence of cards in the plurality to the central transport means alternately from one of the third and fourth card holders and then alternately from the other one of the third and fourth card holders upon each occurrence of fourth control signals representing fourth particular results in the comparison of the particular information between successive pairs of cards from the third and fourth card holders, and means operative upon the transfer of all of the cards from one pair of the first and second card holders and the third and fourth card holders to the other pair of the first and second card holders and third and fourth card holders to initiate a further pass of cards in the plurality from the pair of card holders now holding the cards to the pair of empty card holders.

20. A system for processing information cards, including: transporting means for the cards, transducer means positioned relative to the cards on the transporting means for sensing particular information on the transported cards, first and second card holding means each constructed to hold cards in stacked relationship, means operatively coupled to the cards in the card holding means for obtaining a controlled transfer of cards from said first and second card holding means to the transporting means, third and fourth card holding means each constructed to hold cards in stacked relationship, means operatively coupled to the cards on the transport means for obtaining a controlled transfer of cards from said transporting means to said third and fourth card holding means, control means coupled to said transducer means and including a first comparator for comparing information on successive cards from said first and second card holding means to control the order of transfer of cards from the first and second card holding means to the transporting means, a second comparator coupled to the transducer means for comparing the particular information on successive cards from said first card holding means to produce signals in accordance with such comparison, a third comparator coupled to the transducer means for comparing the particular information on successive cards from said second card holding means to produce signals in accordance with such comparison, and further control means coupled to said second and third comparators for selecting the particular one of said third and fourth card holding means to receive cards from the transporting means at any particular time and for providing such selection in accordance with the signals from the second and third comparators.

21. A system for sorting information cards in accordance with information on the cards, including: a central vacuum pressure rotatable transporting drum constructed to hold the cards in fixed position on the drum during the drum rotation, transducer means positioned relative to the cards on said drum for sensing particular information on the transported cards, first and second card holding means constructed to hold cards in stacked relationship, means including a first pair of vacuum pressure rotatable auxiliary transporting drums adjacent said central drum and coupled respectively to said first and second card holding means for obtaining a controlled transfer of cards from said first and second card holding means to said central drum, third and fourth card holding means constructed to hold cards in stacked relationship, means including a second pair of vacuum pressure rotatable auxiliary transporting drums adjacent said central drum and disposed in coupled relationship to said third and fourth card holding means and including a vacuum pressure rotatable circulating drum adjacent said second pair of auxiliary drums for obtaining a controlled transfer of cards from said central drum to said third and fourth card holding means, the auxiliary drums in the first and second pairs and the circulating drum being constructed to hold cards in fixed position on the drum for rotation with the drum, control means coupled to said transducer means and including a first comparator for comparing data on successive cards from said first and second card holding means to control the order of transfer of cards to individual ones of said third and fourth card holding means, a second comparator coupled to the transducer means for comparing the particular information on successive cards from said first card holding means, a third comparator coupled to the transducer means for comparing the particular information on successive cards from said second card holding means, and further control means coupled to said second and third comparators for selecting the one of said third and fourth card holding means to receive cards at each instant in accordance with the operation of the second and third comparators.

22. A system for sorting information cards in accordance with information on the cards, including: transport means for the cards, transducer means positioned relative to the cards on said transport means for processing particular information on such cards, first reversible means including a first pair of card holding means for obtaining a controlled transfer of cards from the card holding means to said transport means in a first operating cycle and for obtaining a controlled transfer of cards from said transport means to the card holding means in a second operating cycle, second reversible means including a second pair of card holding means for obtaining a controlled transfer of cards to the card holding means from said transport means in said first operating cycle and for obtaining a controlled transfer of cards to said transport means from said card holding means in said second operating cycle, control means coupled to said transducer means for comparing particular information on successive cards transferred from said first pair of card holding means to said transport means during said first operating cycle to control the order of transfer of cards to the individual card holding means of said second pair and for comparing data on successive cards transferred from said second pair of card holding means to said transport means during said second cycle to control the order of transfer of the cards from the individual card holding means of said first pair, and further control means coupled to said transducer means for comparing data on successive cards from individual ones of said card holding means in said first pair to select an individual one of said card holding means in said second pair for the reception of successive cards during the first cycle and until the occurrence of a first particular result from the comparison by the further control means and for comparing data on successive cards from individual ones of the card holding means in said second pair to select individual card holding means of said first pair for the reception of successive cards during the second cycle and until the occurrence of a second particular result from the comparison by the control means, and means responsive to the transfer of cards from the card holding means in a particular one of the pairs to the card holding means in the other pair for operating upon the first and second reversible means to obtain a transfer of cards from the card holding means in the other pair to the card holding means in the particular pair.

23. A system for sorting information cards in accordance with information on the cards, including: transport means for the cards, transducer means positioned relative to said transport means for sensing particular information on the transported cards, first reversible means including a first pair of card holding means for obtaining a controlled transfer of cards to said transport means from the card holding means in a first operating cycle and for obtaining a controlled transfer of cards from said transport means to the card holding means in a second operating cycle, second reversible means including a second pair of card holding means for obtaining a controlled transfer of cards from said transport means to the card holding means in the second pair in said first operating cycle and for obtaining a controlled transfer of cards to said transport means from said card holding means in said second operating cycle, control means coupled to said transducer means and including a first comparator for comparing data on successive cards from said first pair of card holding means during said first cycle to control the transfer of cards to individual card holding means of said second pair in said first operating cycle and for comparing data on successive cards from said second pair of card holding means to control the transfer of cards to individual card holding means of said first pair in said second operating cycle, a second comparator coupled to said transducer means for comparing data on successive cards from a particular one of said first pair of card holding means during said first cycle and for comparing data on successive cards from a particular one of said second pair of card holding means during said second cycle, a third comparator coupled to said transducer means for comparing data on successive cards from the other of said first pair of card holding means during said first cycle and for comparing data on successive cards from the other of said second pair of card holding means during said second cycle, further control means coupled to said second and third comparators for selecting the one of said card holding means to receive cards at any particular time in accordance with the comparisons provided by the second and third comparators and in accordance with the particular operating cycle, and means responsive to the transfer of cards from the card holders in one of the pairs to the card holders in the other pair in each operating cycle for operating upon the first and second reversible means to initiate the next operating cycle.

24. A system for sorting information cards in accordance with particular information on the cards, including: means including a central rotatable vacuum pressure transporting drum for obtaining a movement of cards with the drum, transducer means disposed relative to the cards on said central drum for processing particular information on such cards, a first pair of card holders, means including a pair of auxiliary vacuum pressure rotatable transporting drums adjacent said central drum and said first pair of card holders and including a first vacuum pressure rotatable circulating drum adjacent said auxiliary drums for obtaining a controlled transfer of cards from said first pair of card holders to said central drum in a first operating cycle of the system and for obtaining a controlled transfer of cards from said central drum to said first pair of card holders in a second operating cycle, a second pair of card holders, means including a second pair of vacuum pressure auxiliary rotatable drums disposed relative to said central drum and said second pair of card holders and including a second vacuum pressure rotatable circulating drum adjacent said second pair of auxiliary drums for obtaining a controlled transfer of cards from said central drum to said second pair of card holders in said first operating cycle and for obtaining a controlled transfer of cards from said second pair of card holders to said central drum in said second operating cycle, control means coupled to said transducer means and including a first comparator for comparing data on successive cards from said first pair of card holders during said first cycle to control the transfer of cards to individual ones of said second pair of card holders and for comparing data on successive cards from said second pair of card holders during said second cycle to control the transfer of cards to individual card holders of said first pair, a second comparator coupled to said transducer means for comparing data on successive cards from one of said first pair of card holders during said first cycle and for comparing data on successive cards from one of said second pair of card holders during said second cycle, a third comparator coupled to said transducer means for comparing data on successive cards from the other of said first pair of card holders during said first cycle and for comparing data on successive cards from the other of said second pair of card holders during said second cycle, and further control means coupled to said second and third comparators for selecting the one of said card holders to receive cards at each instant in accordance with the comparisons provided by the second and third comparators and in accordance with the particular cycle of operation being performed.

25. Apparatus for collating information cards from first and second stacks into third and fourth stacks in accordance with particular information on the cards, including; central transport means constructed to obtain a transport of the cards, a plurality of auxiliary transporting means constructed to obtain a movement of the cards and disposed relative to the central transport means to obtain a transfer of cards between the central transport means and each of the auxiliary transporting means, first and second transfer means respectively associated with first and second auxiliary transporting means in the plurality for obtaining a controlled transfer of cards from the first and second stacks to respective ones of the first and second auxiliary transporting means, third and fourth transfer means respectively associated with third and fourth auxiliary transporting means in the plurality for obtaining a controlled transfer of cards from respective ones of said third and fourth auxiliary transporting means to the third and fourth stacks, circulating transporting means positioned relative to said first and second auxiliary transporting means for obtaining a transfer of cards between said auxiliary transporting means, transduced means positioned relative to the cards on said central transport means for processing particular information on such cards, a first plurality of gate transfer means disposed relative to the central transport means and to the first and second auxiliary transport means for obtaining a controlled transfer of cards from each of said first and second auxiliary transporting means to said central transport means, a second plurality of gate transfer means disposed relative to the central transport means and to the third and fourth auxiliary transport means for obtaining a controlled transfer of cards from the central transport means to each of the third and fourth auxiliary transporting means and between the circulating transporting means and each of the third and fourth auxiliary transporting means, processing means responsive to the signals from the transducer means for comparing the signal indications on the cards being concurrently transported by the drums to produce control signals in accordance with such comparisons, and means including electrical circuitry responsive to the control signals for activating particular ones of the gate transfer means in the first and second pluralities and particular ones of the first, second, third and fourth transfer means to obtain a controlled movement of each card from a particular one of the first and second stacks to a particular one of the third and fourth stacks in accordance with the production of the control signals.

26. Apparatus for collating information cards from first and second stacks into third and fourth stacks, including: central transport means movable in a closed loop and constructed to obtain a movement of the cards with the transport means, a plurality of auxiliary transport means each movable in a closed loop and constructed to obtain a movement of the cards with the transport means and positioned relative to the central transport means for obtaining a transfer of cards between the central transport means and the auxiliary transport means, first and second transfer means disposed relative to first and second auxiliary transport means in the plurality and relative to the first and second stacks for obtaining a controlled transfer of cards from the first and second stacks respectively to the first and second auxiliary transport means, third and fourth transfer means respectively disposed relative to third and fourth auxiliary transport means in the plurality and relative to the third and fourth stacks for obtaining a controlled transfer of cards from the third and fourth auxiliary transport means to the third and fourth stacks, coupling transport means movable in a closed loop and constructed to obtain a movement of cards with the transport means and positioned relative to the third and fourth auxiliary transport means for obtaining a transfer of the cards between said third and fourth auxiliary transport means, first and second gate transfer mechanisms respectively disposed relative to the first and second auxiliary transport means and the central transport means for respectively obtaining a controlled transfer of cards from the first and second auxiliary transport means to the central transport means, third and fourth gate transfer mechanisms respectively disposed relative to the third and fourth auxiliary transport means and the central transport means for obtaining a controlled transfer of cards from the central transport means to the third and fourth auxiliary transport means, fifth and sixth gate transfer mechanisms disposed relative to the third and fourth auxiliary transport means and the coupling transport means for obtaining a controlled transfer of cards between the third and fourth auxiliary transport means and the coupling transport means, transducing means disposed relative to the cards on the central transport means for sensing particular information on the cards transferred to the central transport means, and means including electrical circuitry responsive to the signals from the transducing means for comparing the signal indications on concurrent pairs of transported cards to obtain an operation of particular ones of the first, second, third, fourth, fifth and sixth gate transfer mechanisms and an operation of particular ones of the first, second, third and fourth transfer mechanisms to control the path of movement of the cards in accordance with the results of the comparison.

References Cited in the file of this patent

UNITED STATES PATENTS

| 2,379,828 | Rubidge et al. | July 3, 1945 |
| 2,795,328 | Tyler et al. | June 11, 1957 |

FOREIGN PATENTS

| 792,109 | Great Britain | Mar. 19, 1958 |